United States Patent [19]

Ardoin et al.

[11] Patent Number: 6,052,691
[45] Date of Patent: Apr. 18, 2000

[54] OBJECT RELATIONSHIP MANAGEMENT SYSTEM

[75] Inventors: Jean-Louis Ardoin, Clamart, France; Richard M. Eade, Madison; Robert Patience, Huntsville, both of Ala.; Alain Falasse, Paris, France; Dave L. Brann, Huntsville, Ala.; Gerard J. Attilio; Alfredo Arce, both of Madison, Ala.

[73] Assignee: Intergraph Corporation, Huntsville, Ala.

[21] Appl. No.: 08/937,147

[22] Filed: Sep. 24, 1997

Related U.S. Application Data

[63] Continuation of application No. 08/437,942, May 9, 1995, Pat. No. 5,692,184.

[51] Int. Cl.⁷ .................................................. G06F 17/30
[52] U.S. Cl. ............................. 707/102; 707/103
[58] Field of Search .................................. 707/102, 103

[56] References Cited

U.S. PATENT DOCUMENTS 5,649,190  7/1997  Sharif-Askary et al. ............... 707/101
5,692,184  11/1997  Ardoin et al. ........................... 707/103
5,706,506  1/1998  Jensen et al. ........................... 707/103
5,910,804  6/1999  Fortenbery et al. ..................... 345/169

FOREIGN PATENT DOCUMENTS 0 360 387 A3  3/1990  European Pat. Off. ........ G06F 15/40
0 422 877 A2  4/1991  European Pat. Off. ........ G06F 15/40

OTHER PUBLICATIONS

Strickland, T.M., "Intersection of Relational and Object", Proceedings AM/FM International Annual Conference XVII, Proceedings of AM/FM International Conference, Denver, Colorado, USA, Mar. 14–17, 1994, 1994, Aurora, Colorado, USA, AM/FM INT, USA, pp. 69–75.

Primary Examiner—Wayne Amsbury
Attorney, Agent, or Firm—Townsend and Twonsend and Crew LLP

[57] ABSTRACT

A method for maintaining relationships between entities in a computer system, each entity having a plurality nodes, includes the steps of: modifying one of the plurality of nodes; searching for a plurality of dependent nodes from the plurality of nodes coupled to the one node; ordering the plurality of dependent nodes into an order; and evaluating the plurality of dependent nodes in the order.

18 Claims, 13 Drawing Sheets

OBJECT RELATIONSHIP MANAGEMENT SYSTEM

This application is a continuation of application Ser. No. 08/437,942 filed on May 9, 1995, now U.S. Pat. No. 5,692,184

CROSS REFERENCE TO RELATED APPLICATIONS

This patent application is related to and incorporates by reference the subject matter of commonly owned and assigned co-pending U.S. patent application Ser. No. 08/378,251 entitled "OLE For Design and Modeling", filed Jan. 23, 1995, by Mark Fortenbery, Robert Patience, Dominique Payannet, and Cameron Stubbs, now U.S. Pat. No. 5,682,468, which is directed towards extensions of OLE enabling the transfer of two and three-dimensional data objects between computer-aided design and computer-aided manufacturing (CAD/CAM) software applications.

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of computer-aided design and computer-aided manufacturing (CAD/CAM) software, and specifically to a general object relationship management subsystem. More specifically, the present invention relates to a system that maintains data integrity when an object is modified, maintains referential integrity when an object is copied or deleted, defines the guidelines for programming behavior when an object is copied or deleted, encapsulates the details of how relationships are stored, and provides a mechanism for undoing or reversing actions taken on the object model through the relationship management system.

Object Linking and Embedding (OLE) Overview

Within the office environment, one method that has been developed to enable "cutting" and "pasting" of data between software applications is OLE. OLE defines standardized interfaces and functions enabling users to transfer objects supporting the Component Object Model (COM) between software applications. The following section is an abbreviated overview of some of the concepts used in COM and OLE version 2.0, from Microsoft Corporation of Belleview, Wash., and defines some of the terms that will be used in the disclosure. Further information and details about COM and OLE may be obtained from "Inside OLE 2" by Kraig Brockschmidt, 1994, Microsoft Press, hereby incorporated by reference.

An example of cutting and pasting data between software applications is illustrated in FIG. 1. FIG. 1 illustrates a two-dimensional object 1 created in a first software application being transferred into a second software application. The first and second software applications (not shown) are commonly specialized software applications such as spreadsheets, word processors, or graphics programs. Once two-dimensional object 1 has been transferred, the second software application can manipulate its own data, two-dimensional object 2, so that two-dimensional object 2 interacts with two-dimensional object 1. The resulting document is then output to the user.

OLE provides a set of "interfaces", or groups of functions, which when combined provide the mechanics enabling the user to transfer data between programs. FIG. 2 illustrates the convention for representing an OLE interface 10, for an object 11 and a "consumer" 12 of the object. Object 11 is said to have an "interface implementation", including interfaces 13 and 14, that are analogous to an object oriented programming "class." Interfaces 13 and 14 include member functions 15 and 16, respectively, that are analogous to object oriented programming class "instances".

Consumer 12 receives data from object 11 by calling functions of interface 13 and/or interface 14. In some cases the consumer may only be aware of one of several interfaces available in an object. In response to the function calls, object 11 may return specific data about itself to the consumer 12. Object 11, however maintains exclusive control of its own data 17. As further illustrated in FIG. 2, IUnknown is an interface available to all objects, that when queried for specific interfaces, returns pointers to the requested interface. For example, assuming consumer 12 knows which functions are available in interface 14, consumer 12 can ask for and receive a pointer to interface 14. Then, once consumer 12 receives a pointer to interface 14, consumer 12 can call member functions 16.

CAD/CAM Market Overview

Application software specifically designed for architectural and engineering and mechanical design and fabrication purposes are commonly labeled Computer Aided Design (CAD) and Computer Aided Manufacturing (CAM) software. Some of the standard features of CAD/CAM applications is the ability to create and manipulate three-dimensional objects and to create relationships between three-dimensional objects relative to other three-dimensional objects.

CAD/CAM applications typically fall into generic types, those built upon a standard graphics platform where data and code is shared among many applications and proprietary applications which have very little in common with other CAD/CAM applications. Within the domain of applications built on generic graphics platforms some have crude capabilities for defining relationships between CAD objects. Typically the user must place objects in a location that represents the results of a relationship acting on that object, that is, the user performs the computation external to the application to determine the physical location of the new object. In many proprietary applications, there exist software that manages geometric relationships between CAD objects. Typically, these capabilities (called constraint management capabilities) allow for the definition of geometric constraints on CAD objects and between CAD objects. For example, a typical constraint between two CAD objects is maintaining a given distance between the objects or maintaining one face parallel to another face. One problem with these type of limited constraint management systems is that they only represent spatial relationships and they cannot model or maintain a more general class of relationships.

CAD/CAM Applications and Database Structures

In the past, CAD/CAM software applications included specialized software which allowed for the modeling of a limited set of relationships between objects. In many cases CAD/CAM systems did not model general relationships at all and only allowed the user to define positional relationships which essentially placed objects at specific coordinates in 3D space. In some systems "constraint management" capabilities have been added, however these are restricted to only modeling and managing geometric relationships between objects. Other relationship types that needed to be in the model were handled in an ad hoc manner by the user as CAD/CAM applications did not have generalized relationship modeling and maintenance capabilities.

What is needed is a relationship management subsystem that allows generalized relationships (including geometric relationships commonly present in current CAD/CAM systems) to be defined and that maintains the integrity of the object model.

SUMMARY OF THE INVENTION

The present invention provides enhancements and extensions to OLE for the CAD/CAM environment that are used for a general object relationship management subsystem. The "Object Relationship Management System" discloses extensions to the OLE COM object model for modeling and maintaining relationships that can be modeled between COM objects. The relationship types and COM object types are not limited to CAD/CAM systems by the Object Relationship Management System. The relationship subsystem maintains data integrity when an object is modified, maintains referential integrity when an object is copied or deleted, defines the guidelines for programming behavior when an object is copied or deleted, encapsulates the details of how relationships are stored, and provides a mechanism for undoing or reversing any modification done by a modify, copy, or delete operation and is accomplished through the Object Relationship Management System.

DESCRIPTION OF THE PREFERRED EMBODIMENT

The goals of the herein described Object Relationship Management Subsystem (Relations subsystem) are to maintain data integrity when an object is modified, maintain referential integrity when an object is copied or deleted, define the guidelines for programming behavior when an object is copied or deleted, encapsulate the details of how relationships are stored, and provides a mechanism for undoing or reversing any modification done by a modify, copy, or delete operation through the Relations subsystem.

These goals are accomplished by unifying "Modify", "Copy" and "Delete" "Semantics" in a single relationship model. Semantics defines the behavior for a known operation. For example, copy semantics of a relation are invoked by the Relations subsystem to define and operate on the values coupled to the relation. A single relationship model allows new types of relationships to be added to the system without breaking existing code. The alternative would be a special case solution in which adding a new type of relationship to the system would break existing copy, delete and/or modification commands.

COM objects are related to one another via their IUnknown pointers. The details of how the relationship is maintained persistently (if the objects it connects are persistent) are encapsulated behind two COM interfaces: IJRelationValue on the object side, and IJRelation on the relation side, as will be described below. The IUnknown pointer is the only object identity exposed in the API. The Data objects are given this ability by incorporation of the described OLE interfaces and functions below.

It is believed that one familiar with OLE, as described in "Inside OLE 2" by Kraig Brockschmidt, would be able to readily use the following COM interfaces based upon the following disclosure. Further details about the preferred method of enabling such transfer of data are detailed in the following sections.

The examples illustrated in this application are based on a typical CAD/CAM application data.

System Overview

Figures 1, 2:
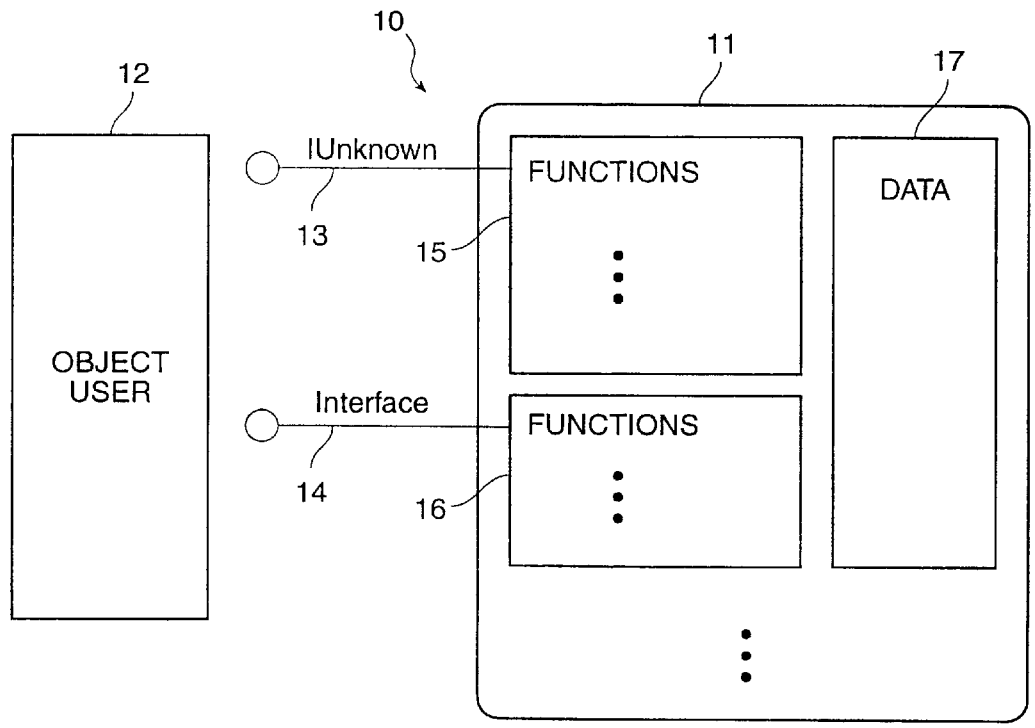
FIG. 1 illustrates a two-dimensional object 1 created in a first software application being transferred into a second software application.
FIG. 2 illustrates the convention for representing an OLE interface, for an object and a "consumer" of the object.
Figure 3:
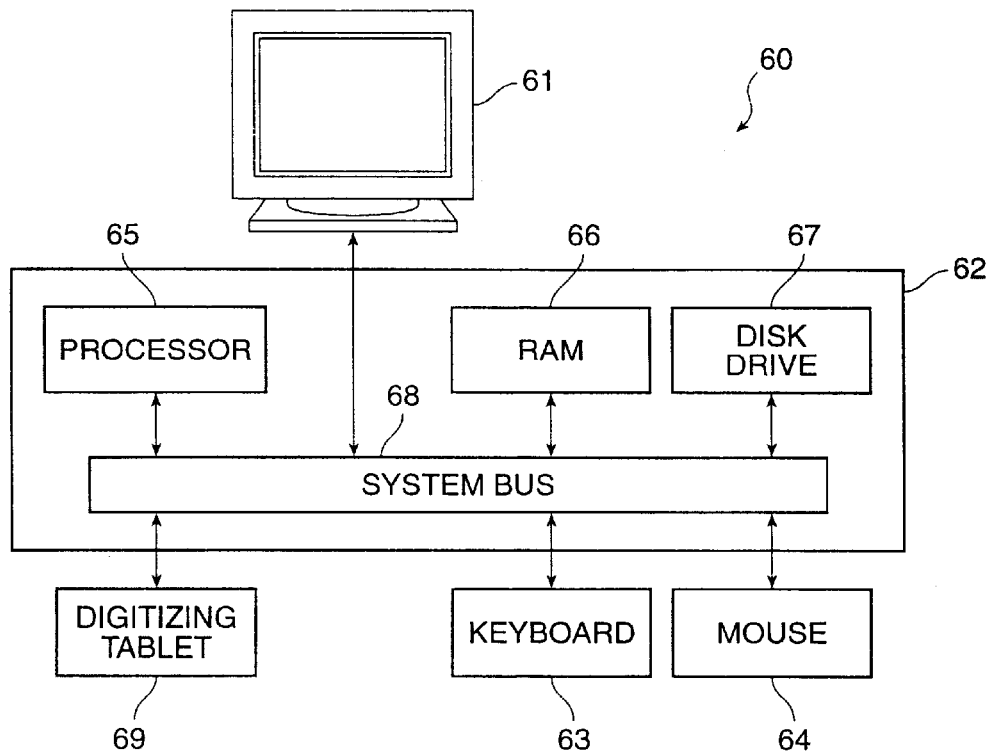
FIG. 3 is a block diagram of a system according to a preferred embodiment of the present invention.

FIG. 3 is a block diagram of a system 60 according to a preferred embodiment of the present invention. System 60 includes a display monitor 61, a computer 62, a keyboard 63, and a mouse 64. Computer 62 includes familiar computer components such as a processor 65, and memory storage devices such as a random access memory (RAM) 66, a disk drive 67, and a system bus 68 interconnecting the above components. Mouse 64 is but one example of a graphical input device, a digitizing tablet 65 is an example of another.

In a preferred embodiment, system 60 includes a IBM PC compatible personal computer, running Windows™ operating system Version 3.1 and OLE 2.0 by Microsoft Corporation, and Jupiter™ software, currently under development by Intergraph Corporation. The appendix includes preferred embodiments of COM interfaces described below, written in C++.

FIG. 3 is representative of but one type of system for embodying the present invention. It will be readily apparent to one of ordinary skill in the art that many system types and configurations are suitable for use in conjunction with the present invention.

I. Overview of Relations

The Relations Subsystem includes new interfaces and functions given to COM objects, as well as functions executed by Relations machines. Four Relations machines currently exist: a Modify machine, a Copy machine, a Delete machine, and an undo machine.

0. Definitions
1. The Associative Graph
2. The Associative Graph in COM

0. Definitions value: A value is an object, analogous to an entity in a Entity-Relation Model.

relation: A relation is the means by which one object refers to another object. A relation is defined by one or more connections and a set of semantics that define its behavior.

connection: A connection is a link between a value and a relation.

semantic: A semantic is a COM interface that defines some aspect of the relation such as its copy or delete behavior. Each value in a relationship can enumerate all the relations it participates in, and each relation semantic can enumerate the values that it defines behavior for.

Each relation must provide a "Copy" and a "Delete" semantic. A "Modify" semantic, known also as a "Compute" semantic, is optional and provides the relation with the ability to recompute an output value of the object based on changed input value(s). This will be discussed in greater detail later in this document.

1. The Associative Graph

Associativity and constraints deal with relationship management. The purpose of the Relations subsystem is to establish, maintain and dissolve relationships between entities. The Relations subsystem notifies related entities whenever something in a relationship changes. There are two types of relationships: dependency and equivalence.

In a dependency relation (also called a directed associative relationship), an entity depends on one or more other entities. When something changes dependent entities are notified in order of dependency. A dependency relation is illustrated with a cell in a spreadsheet that calculates the sum of a row of numbers: whenever a number in the row is modified, the sum is updated. Because the sum depends on the numbers in the row, one cannot directly edit the sum for the sum only exists as the output of the dependency relation. To change the sum the user must change one or more of the values the cell depends upon or make the cell depend on a new set of numbers. Dependency is a one-way relation such that the output of a dependency is changed by changing its input. Further, dependency relations can be built upon other dependency relations in an ordered manner.

In an equivalence relation (also called a constraint relationship), the related entities are equally dependent and are notified simultaneously when something changes. This ordered or simultaneous notification distinguishes constraints from dependencies. An equivalence relation is illustrated with a CAD system that creates a parallel constraint between two lines: line1 and line2. When the user grabs line1 with a mouse and moves it, the system moves line2 so that it remains parallel to line1. Conversely, when the user moves line2, the system moves line1 to remain parallel. In Relations subsystems terms, the lines are in an equivalence relation. Notice that in the dependency example above the sum could not be directly modified, whereas in the equivalence relation example either line can be modified. Equivalence is not a one-way relation, thus there is no implied ordering. To update equivalence relations, a set of entities and their related constraints are examined as a whole, then a decision is made as to which entities can be modified to satisfy all of the constraints.

The Relations subsystem describes the associative and the constraint relationships in a conceptual graph called an associative graph. This associative graph is used to maintain the integrity of relationships when entities of the associative graph are modified, deleted, copied, etc. The Relations subsystem creates and manipulates these graphs and maintains the information used to create them.

The associative graph consists of nodes that are connected together by edges. These nodes represent the related entities and the edges represent the relationships (either dependency or equivalence) between the entities.

1.1. Nodes

Each node in an associative graph is distinguished by a unique identifier. A node can represent a value, an associative evaluation function or a predicate as will be described below.

1.1.1. Value Nodes

A "value" node represents a storage. It can be used as:

an input of an associative function or predicate;

an output of an associative function; or a constrained argument of a predicate.

A value node can be thought of as a "passive node" of the associative graph. It is a repository to obtain or provide a value. This is in contrast to a node containing an associative function or predicate that is "active" in the sense that it recomputes.

1.1.2. Associative Function Nodes

An "associative function" node is used to establish dependency relations between value nodes. The dependency is such that output values depend on input values. When an associative function is evaluated, it entirely replaces the output value nodes. For this to produce predictable results:

A value node cannot be the output of more that one associative function node. If this were the case, the output values would never be consistent. The value would only represent the result of which ever function was evaluated last.

The output value nodes can only be changed by re-evaluation of the associative function node. As seen in the spreadsheet example above, the user cannot directly edit an associative output. Any direct modification of an output would be over-written the next time the associative function node is evaluated.

As an example, suppose a function that sets the start and end points of a line: "LineBy2Pts(Line, P1,P2)" is an associative function node that has a line for its output. When called, this function updates the geometry of the line with the input values P1, P2. The node containing the function would have a dependency relation with the two points, P1 and P2. If either of the two points changed, the function node would be notified and the evaluation function would recompute a new value for the line. If the line is modified directly, without modifying the associative function, such modifications would be lost the next time the LineBy2Pts function is evaluated.

1.1.3. Predicate Nodes

A "predicate" node is used to define an equation or a constraint between value nodes. A predicate node represents a boolean (TRUE/FALSE) value that indicates if the equation or constraint is satisfied, according to the inputs. Several predicates can be associated to the same input value node, thus unlike an associative function, a predicate only partially defines a value(s). An external mechanism, called a solver, is used to modify the input value nodes until all predicates relating to the input value nodes are TRUE. An exception to this is if an input value node that is the output of an associative function is used as an argument of a predicate, the input value node cannot be modified directly by a solver. In the preferred embodiment of the present invention, the solver treats these sort of input value nodes as "constant".

As an example, a predicate node is TRUE or FALSE depending if the beginning point of a line L0 matches a given point P1: "IsBeginPoint(L0,P1)". The geometry of the line is only partially defined by this predicate. If L0 or P1 changes, the predicate passes input values L0 and P1 to a solver. The solver modifies L0 or P1 until L0 has a beginning point equal with P1, i.e. until TRUE. If there are other input values that are related by other predicates to L0 and P1, these other input values along with the other predicates are also passed to the solver at the same time.

1.2. Edges

An edge connects a value node to a function node. (Two value nodes or two function nodes cannot be connected by an edge.) Edges are:

oriented, forming a dependency relationship; or non-oriented, forming an equivalence relationship.

A "non-oriented" edge always connects a value node (that is not the output of an associative function) to a node containing a predicate (constraint or equation). The value is a non-constant parameter of the predicate, meaning it can be modified by a solver. Such a relationship is an equivalence relationship because a set of values and their related predicates are treated equivalently by a solver during the evaluation of the associative graph and of the values may be modified.

There are two cases of oriented edges:

The edge is oriented from a value node to a function node, i.e. the function depends on the value node as input; and The edge is oriented from a function node to a value node, i.e. the value node is the output of an associative function node.

When a value node is an input to a function node and the function node produces a new output, the value node is referred to as the "parent" and the function node as the "child". Notice, children depend on the value of their parents, thus parents must be evaluated before their children. When an oriented edge connects an associative function node to its output value node(s), the function node is the "parent" and the value node is the "child".

When a value node is connected to a predicate by oriented edges, the value cannot be modified by a solver. An example of this is when the value node is the output of an associative function, or when it comes from a read only document or for reasons dictated by application semantics.

A loop is a set of oriented edges that form a cycle in the graph. If a loop is detected in the graph, all nodes in the loop are treated as nodes connected by equivalence relations, thus all the edges in the loop are treated as non-oriented edges and a solver is used to evaluate the nodes.

1.3. The Recompute Machine

Recompute is the process by which the value nodes in the graph are kept consistent. In the case of an associative evaluation function, the associative function re-evaluates (or computes) the value of its output node(s) whenever an input node changes. In the case of a predicate, when a value node changes, the set of values related via predicates is modified by a solver to make the predicates TRUE.

Figure 4:
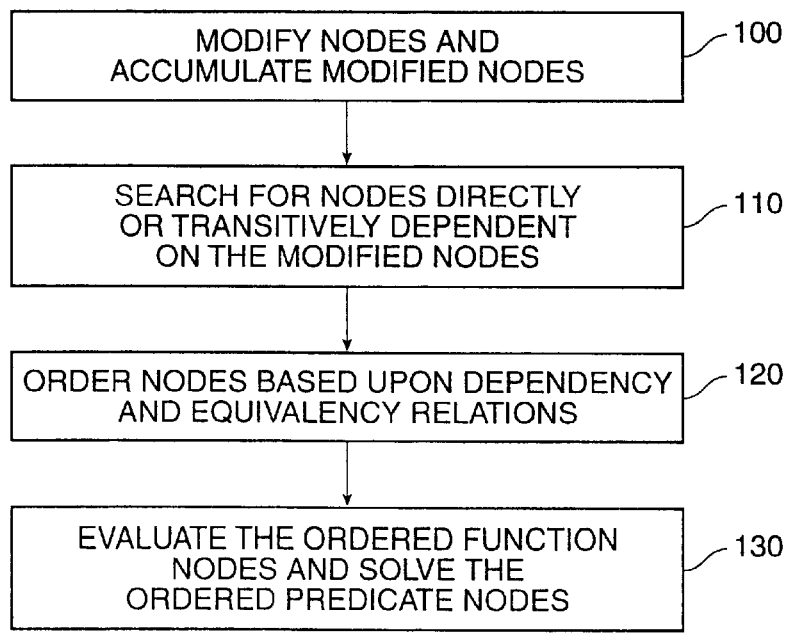
FIG. 4 illustrates a flow diagram of one embodiment of the process of recomputing the graph when a modification is made.

FIG. 4 illustrates a flow diagram of one embodiment of the process of recomputing the graph when a modification is made:

Accumulate modified nodes, step 100.

A node can be modified because:
   a value node was modified by the user; or
   a function node has its associative behavior modified by changing its evaluation function, changing its parameters, editing its parents or changing its equivalence relations.

Search for all nodes to evaluate, step 110. Nodes to evaluate are nodes which depend directly or transitively on the modified nodes. In other words, search for the nodes that are either directly or indirectly related to modified nodes as children of dependency relations or by equivalence relations.

Order the nodes to evaluate, step 120. This step insures that a function is re-evaluated after the values it depends upon are evaluated. Such ordering is analogous to ordering numeric variables related by operators "less than" (<) and "equal to" (==) into ascending order: (<) being the directed parent/child (dependency) relation, and (==) being the equivalence relation. Thus a parent is "less than" its child and is evaluated before the child, and all related predicates are "equal to" each other and are evaluated simultaneously by a solver.

Evaluate the ordered function nodes, step 130 (value nodes don't recompute)
   A node with an associative evaluation function is evaluated by calling its evaluation function.
   Predicate nodes and related value nodes are passed to a solver. It is up to the solver then to satisfy the predicates by modifying the value nodes that are related by the predicates.

1.3.1. Editing The Graph During The Recompute of A Node

Re-ordering of an associative graph is necessary when a node changes the relations on itself or on other nodes during a recompute. When relations are changed, the order in which nodes are computed may have to be re-established. The changing of relationships is equivalent to editing the associative graph.

Figure 5:
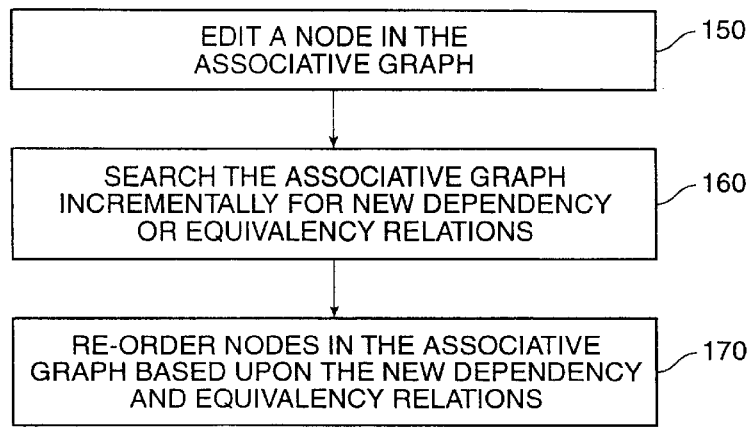
FIG. 5 illustrates a flow diagram of one embodiment of the process of recomputing the graph after a node is edited.

FIG. 5 illustrates a flow diagram of one embodiment of the process of recomputing the graph after a node is edited, step 150:

The graph is incrementally searched if the computed node adds some new dependency, step 160. Incremental means adding to the list of elements to be recomputed incrementally. Elements will not be removed from the recompute list because of this editing, but elements currently in the list to be recomputed could choose not to recompute if their parents did not change value either. This is an optimization mechanism known as "graph triggering".

The graph is resorted if the computed node modifies dependency relations, step 170.

Editing the graph during recompute is always allowable if the edited element is the current node being computed or depends directly or transitively on the node being computed. This limitation ensures that the edited node has not yet been evaluated. If the edited node does not depend (before the edit) on the node being recomputed there are risks that:

The edited node could have been already computed thus the Relations subsystem will not re-evaluate the node to take into account its new relations. In the best case, the Relations subsystem will identify it as an error, in the worst case the data of the model will no longer be consistent.

The edited node could have dependent nodes already computed. This will also result in an error.

When the edited node is not the current node being computed or one of its dependents, the application must assume responsibility for the consequences of its graph edits.

1.4. The Copy and Delete Machines

The relationships between nodes need to be modified whenever a node(s) is deleted, copied, or an action is "undone". The copy and delete machines are responsible for ensuring the integrity of the graph is maintained. The actions taken are relationship specific, and the modification behavior may be different on a per node basis. For more detailed information on how the Relations subsystem maintains graph integrity, refer to section III, below.

On a node delete: A node related to a node being deleted is made aware of the deletion in order to rectify the information it stores and adjust its behavior. Some behaviors the node may exhibit are:

keep the relation to the node being deleted, i.e. to prevent the deletion;

modify its evaluation function so as not to refer to the node being deleted;

remove its evaluation function completely (transform to non-associative); and delete itself.

On a node copy: a "prune graph" operation is performed on the initial graph to ensure that a meaningful set of elements is copied. The relationships between nodes in the copied graph should be the same as the relationships in the original graph. In other words, when a child is copied, the parents of the child should be copied as well. Alternatively the copy of the child should be hooked up to an existing parent.

1.5. Simple Example

Figure 6:
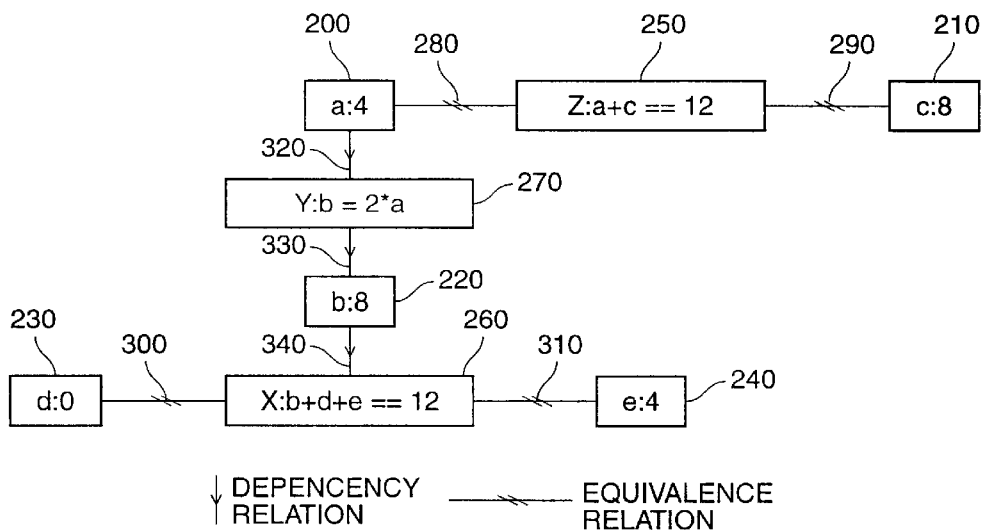
FIG. 6 illustrates a simple graph with nodes and relations.

FIG. 6 illustrates a simple graph with nodes and relations. Nodes 200, 210, 220, 230, and 240 are value nodes, Nodes 250 and 260 are predicate nodes, and node 270 is an associative function node. Edges 280, 290, 300, and 310 represent equivalence relations, and edges 320, 330, and 340 represent dependency relations, in the direction shown.

Figure 7:
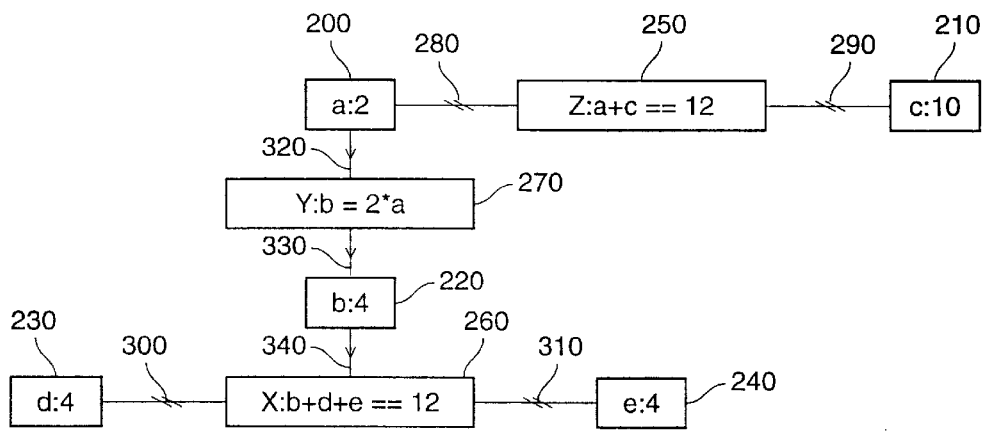
FIG. 7 illustrates new values of the graph in FIG. 6 in response to the modification of the value of node "a"

FIG. 7 illustrates new values of the graph in FIG. 6 in response to the modification of the value of node "a" 200.

Following the of recompute process disclosed above, if the node "a" 200 is modified to have a value of "2", the Relations subsystem performs the following steps:

accumulates the modified nodes. In this case, only one node is modified "a" 200.

searches for all related nodes to evaluate. This results in the nodes: "a" 200, "Z" 250, "c" 210, "Y" 270, "b" 220, "X" 260, "d" 230, and "e" 240.

orders the nodes to evaluate. Given the relationships above:

"a" 200, "Z" 250 and "c" 210 are equivalents;

"a" 200 must be evaluated before "Y" 270, "Y" 270 must be evaluated before "b" 220, and "b" 220 must be evaluated before "X" 260, thus are dependents; and "d" 230, "X" 260 and "e" 240 are equivalents.

This ordering can be expressed as: a==Z==c<Y<b<X== d==f.

evaluates the ordered nodes:

1. "a" 200 , "Z" 250 and "c" 210 are passed to a solver to satisfy the predicate "Z" 250. In this case, "c" 210 is changed to 10 to satisfy the predicate "Z" 250.

2. The associative evaluation function "Y" 270 is then called on to calculate a new value for "b" 220. Since "a" 200 is 2, the new value of "b" 220 is 4.

3. "d" 230, "X" 260 and "e" 240 are passed to a solver to satisfy the predicate "X" 260. Since "b" 220 is 4, "d" 230 can be set to 4 to satisfy the predicate. Alternatively "d" 230 could remain at 0, and "e" 240 can be set to 8.

Notice that even though "e" 240 was considered as part of the recompute "e" 240 may not need to change. Further, if there were other nodes dependent on "e" they would not necessarily change either. (A solver can have more than one way to change values to satisfy predicates.) It is an important optimization to recognize which values do not change, in a graphics system, for instance, this can avoid needless erases/displays.

2. Associative graph in COM

The following section describes how the associative graph is realized using the component object model (COM). The following assumptions are initially made about the Relations subsystem in COM:

A single COM object can represent more than one node of the associative graph. Multiple nodes per COM object allows a "granularity" of recompute. For example, a recompute of a geometric dependency of an element would not be necessary if the symbology changes; and All higher-level application relationships are broken down into the two basic relations: dependency and equivalence. These are the only relationships managed by the Relations subsystem.

2.1. Nodes in COM

Each value node of the associative graph corresponds to a single COM interface. A COM object can support more than one interface and can represent more than one value node. Because of the interface granularity, a recompute semantic can enumerate as a connected value the same IUnknown pointer more than once with different IIDs. An interface represents a value node only if it is used as input or output argument of a function node. A function node is also known as a recompute semantic. A COM object can have more than one recompute semantic. For example, a recompute semantic between A and B could be represented by (A interface w) as input and for output (B interface x). another recompute semantic for the same relation could use (B interface y) as input and (A interface z) for output. Something that will not happen for the copy and delete semantics since a COM object can not be "half copied" or "half deleted". These functions nodes are enumerated by the Relation COM object The components of a node (identity, and value or function) are represented in COM as follows:

The identity of a value node is defined by the persistent identity of the COM object representing the node and the IID of the interface that is used to set or get the value.

The value of a node is not explicit. It is represented by the interface functions that are used to set or get the value. (This is in accordance with COM where all data is private.) Associative functions and predicate solvers use COM interfaces to request the values for input or output.

The identity of a function node is defined by the persistent identity of the COM object representing the node and a key returned from the COM object representing the node when the COM object it enumerates its function nodes.

The recompute semantic of a function node is defined by a Relations interface. The Relations subsystem uses a function on this interface to recompute the node.

Value nodes that represent the output of an associative function may come from the same COM object as the function node. Value nodes which are input arguments, or constrained argument of a predicate can come from different COM object than the function node.

2.2. Edges in COM

A COM object representing value nodes can determine which other COM object(s) depend on it or have an equivalence relationship with it. Further, a COM object representing function nodes can determine the value nodes (COM identity, Interface id) that each function node that it contains depends upon or is in equivalence with. Some important limitations of Edges in COM:

The information stored on both sides of a relation is not symmetrical:
  A value node only knows the COM object that holds the relation not the identity of the function nodes that refer to it.
  A function node knows the identity of the value nodes it refers to.

The Relations subsystem defines interfaces to access the relationship information. The implementation of these interfaces determines where the actual information is stored. The Relations subsystem provides a set of "helper" classes that implement the Relations interfaces:
  The information stored by function nodes (COM identity, interface id) is stored in a COM "helper" object aggregated by the application object.
  The information stored by value nodes (COM identity of function node holder) is maintained by a COM helper object aggregated by the application object.

II. Relationship Subsystem COM Interfaces

The following are a more detailed explanation of the OLE extensions to COM described above.

1. IJRelation Interface
2. IJRelationValue Interface
3. IJCopy Interface
4. IJDelete Interface
5. IJCompute Interface
6. IJRelationGraph Interface
7. IJRelationNotify Interface
8. IJRelationGlobal Interface
9. IJRelationSolver Interface
10. IJComputeCFunction Interface
11. IJUndo Interface
12. IEnumJCHKPNT Interface
13. IJUndoManager Interface
14. Other Interfaces
1. IJRelation Interface The IJRelation interface is supported by any object that wants to define a relationship with one or more other objects. A relationship is defined by its copy, delete, and recompute (modify) behavior. These three behaviors (modify, copy, and delete) are referred to collectively as the semantics of the relationship. The purpose of the IJRelation interface is to manage the relation semantics and to connect or disconnect values to and from the relation. Each type of semantic has a corresponding software module, called an machine, provided by the Relation subsystem. These machines use IJRelation::EnumSemantics to interrogate the semantics of the relationships. An object implementor is responsible for implementing IJRelation and the necessary semantic interfaces listed below.

The copy semantic of a relation defines what happens when objects connected to the relation or the relation itself is copied. The copy machine that the Relation subsystem provides is responsible for all copy operations. It enumerates relation semantics via IJRelation::EnumSemantics and queries each semantic for IJCopy. The copy machine uses the IJCopy interface to complete the copy operation.

The delete semantic of a relation defines what happens when objects connected to the relation or the relation itself is deleted. The delete machine that the Relation subsystem provides is responsible for all delete operations. It enumerates relation semantics via IJRelation::EnumSemantics and queries each semantic for IJDelete. The delete machine uses the IJDelete interface to complete the delete operation.

The recompute semantics of a relation define what happens when objects connected to the relation are modified. A relation can define multiple recompute semantics. The recompute machine that the core provides enumerates relation semantics via IJRelation::EnumSemantics and queries each semantic for IJCompute. The recompute machine uses the IJCompute interface to complete the recompute operation.

The copy/delete/recompute machines only access semantics through IJRelation::EnumSemantics. A relation can choose to store semantics as physical objects, or it can create the semantics dynamically when asked to enumerate them. An implementation of IJRelation can choose to return an error from AddSemantic and RemoveSemantic to disallow semantics to be added or removed.

The following is a description of the preferred embodiment of the formal IJRelation interface:

---

```
Interface IJRelation : IUnknown {
    AddSemantic (LPUNKNOWN pSemantic, ULONG* pKey);
    RemoveSemantic (ULONG key);
    EnumSemantics  (LPENUMJRELATIONSEMANTICDESC*
                    ppEnum);
    GetSemantic (ULONG key, LPUNKNOWN* ppSemantic);
    GetType     (LPGUID pType);
```

```
        SetType        (LPGUID pType);
        }
Structures defined
    typedef struct tagRELATIONSEMANTICDESC {
        LPUNKNOWN    pSemantic;
                        // unknown interface of the semantic
        ULONG       key;     // semantic identifier
    } JRELATIONSEMANTICDESC;
typedef
JRELATIONSEMANTICDESC* LPJRELATIONSEMANTICDESC;
```

1.1. IJRelation::AddSemantic

IJRelation::AddSemantic adds a semantic to a relation and connects values enumerated by the semantic to the relation. A single semantic object can support multiple semantic interfaces (e.g. IJCopy and IJDelete). In this case, the semantic should only be added to the relation once.

The implementation of this function performs the following: Stores the specified semantic and handles its persistence; Connects to all values enumerated by the specified semantic; Performs QueryInterface for IJCopy, IJDelete, and IJCompute; and Connects the values enumerated by these interfaces to the relation with IJRelationValue::ConnectRelation.

The following is a description of the preferred embodiment of the formal AddSemantic interface:

```
HRESULT AddSemantic(LPUNKNOWN pSemantic, ULONG* pKey);
    Parameters
        pSemantic  IN    New semantic to add.
        pKey       OUT   Key to identify this semantic within the
                         relation. Can be used later to remove the
                         semantic. This parameter can be NULL if the
                         key is not desired. The returned key is
                         only valid until the semantic is removed.
        Return   S_OK    The operation was successful.
                 E_FAIL  The relation does not support adding
                         semantics.
                 E_INVALIDARG     One of the arguments is invalid.
                 E_UNEXPECTED     An unexpected error occurred.
    See Also   IJcompute::EnumValues, IJCopy::EnumValues,
               IJDelete::EnumValues.
```

1.2. IJRelation::EnumSemantics

IJRelation::EnumSemantics is used to enumerate the semantics of a relation. The core copy, delete, and recompute machines use this function to interrogate the behavior of a relationship.

The returned enumerator specifies a "key" identifying each semantic, as described above. This key can be used as input to GetSemantic or RemoveSemantic and is invalidated if the semantic is removed.

The following is a description of the preferred embodiment of the formal EnumSemantics interface:

```
HRESULT EnumSemantics  (LPENUMJRELATIONSEMANTICDESC
                        *ppEnum);
    Parameters
        ppEnum  OUT    The enumerator to list the semantics and
                       their identifiers
        Return  S_OK   The operation was successful.
                E_OUTOFMEMORY    Unable to allocate required
                                 memory for the enumerator.
                E_INVALIDARG     The argument is not a valid
                                 pointer.
                E_UNEXPECTED     An unexpected error occurred.
    See Also  IEnumJReleationSemanticDesc.
```

1.3. IJRelation::GetSemantic

IJRelation::GetSemantic returns a pointer to the IUnknown interface of the relation semantic identified by the key. The key is returned from AddSemantic or EnumSemantics. The returned pointer must be released before being discarded.

The following is a description of the preferred embodiment of the formal GetSemantic interface:

```
HRESULT GetSemantic(ULONG key, LPUNKNOWN *ppSemantic);
    Parameters
        key         IN     Key that identifies desired semantic. The
                           key was returned by AddSemantic or
                           EnumSemantics.
        ppSemantic  OUT    Returned IUnknown interface of the
                           semantic.
        Return  S_OK       The operation was successful.
                E_FAIL     The semantic identified by key does not
                           exist.
                E_INVALIDARG    One of the arguments is invalid.
```

1.4. IJRelation::GetTyPe

IJRelation::GetType gets the "type" of the relation. Each relation has an associated type that can be used to infer information about the relation. The type is never interpreted by the MCD machines but it is defined by the relation implementor as a "hint" as to what the relation is used for.

The following is a description of the preferred embodiment of the formal GetType interface:

```
HRESULT GetType(LPGUID pType);
    Parameters
        pType   OUT    The type associated to this relationship.
                       GUID_StdRelationType is returned if the
                       relationship is generic.
        Return  S_OK   The operation was successful.
                E_INVALIDARG    The argument is not a valid pointer.
```

1.5. IJRelation::RemoveSemantic

IJRelation::RemoveSemantic removes a semantic from a relation and disconnects any values enumerated by the semantic. This function is the inverse of AddSemantic. Any implementation of this function should QueryInterface for IJCopy, IJDelete, and IjCompute and disconnect the values they enumerate by calling IJRelationValue::DisconnectRelation.

The following is a description of the preferred embodiment of the formal RemoveSemantic interface:

```
HRESULT RemoveSemantic(ULONG key);
    Parameters
        key    IN     Key to the semantic to remove from the relation.
                      The key is obtained from AddSemantic or
                      EnumSemantics.
        Return S_OK   The operation was successful.
               E_FAIL The relation does not support removing
```

-continued

```
         E_INVALIDARG   The argument is invalid.
See Also IJCompute::EnumValues, IJCopy::EnumValues,
IJDelete::EnumValues.
```

1.6. IJRelation::SetType

IJRelation::SetType sets the type of the relation. Each relation has an associated type that can be used to infer information about the relation. The type is never interpreted by the MCD machines, it is defined by the relation implementor as a hint to what the relation is used for. SetType can only be called once on a relation. Some relation definitions can choose to return an error from SetType.

SetType is most useful for the standard relation helper where a set of semantics and a type can be added from "outside" an object.

The following is a description of the preferred embodiment of the formal SetType interface:

```
HRESULT SetType(LPGUID pType);
    Parameters
        pType   OUT  The type to be associated to this relationship.
        Return  S_OK         The operation was successful.
                S_FALSE      The type can only be changed once per
                             relation.
                E_INVALIDARG The argument is not a valid
                             pointer.
```

2. IJRelationValue Interface

The IJRelationValue interface should be supported by any object that wants to participate in a relationship with another object. It is recommended that all objects support this interface. The IJRelationValue interface manages the list of relations that are connected to a value.

A helper object (referred to above is obtained through ::CreateStdRelationValue) has been provided that implements this interface. This helper is intended to be a virtual aggregate, the aggregator does not store a pointer to the helper object. No overhead is required in the aggregator itself.

The following is a description of the preferred embodiment of the formal ReplaceValue interface:

```
Interface IJRelationValue : IUnknown {
    ConnectRelation(LPUNKNOWN pRelation);
    DisconnectRelation(LPUNKNOWN pRelation);
    EnumRelations(LPENUMUNKNOWN* ppEnum, LPGUID pType);
    IsInterfaceIndependent(REFIID riid);
    GetRelation(LPUNKNOWN* ppRelation, LPGUID pType);
}
typedef STDAPI (*LPJRELATIONIFDEPFUNC) (REFIID riid);
```

2.1. IJRelationValue::ConnectRelation

IJRelationValue::ConnectRelation establishes a connection between a value and a relation. This function is called by a relation as part of its implementation of IJRelation::AddSemantic from some other function that defines how objects are connected to a relationship.

The following is a description of the preferred embodiment of the formal ConnectRelation interface:

```
HRESULT ConnectRelation(LPUNKNOWN pRelation);
    Parameters
        pRelation  IN   Any interface of the object supporting the
                        IJRelation side of the relationship.
        Return S_OK            The operation was successful.
               E_OUTOFMEMORY   Unable to allocate required
                               memory for the operation.
               E_INVALIDARG    One of the arguments is invalid.
               E_UNEXPECTED    An unexpected error occurred.
```

2.2. IJRelationValue::DisconnectRelation

IJRelationValue::DisconnectRelation disconnects an object from a relation. This function is only called by a relation as part of its implementation of IJRelation::RemoveSemantic, by IJDelete::Disconnect or from some other interface function that defines how objects are disconnected from a relationship.

The following is a description of the preferred embodiment of the formal DisconnectRelation interface:

```
HRESULT DisconnectRelation(LPUNKNOWN pRelation);
    Parameters
        pRelation  IN   Any interface of the object supporting the
                        IJRelation side of the relationship.
        Return S_OK           The operation was successful.
               E_INVALIDARG   The argument is not a valid
                              pointer.
               E_UNEXPECTED   An unexpected error occurred.
```

2.3. IJRelationValue::EnumRelations

IJRelationValue::EnumRelations returns an enumerator that is used to iterate through all the relations that are connected to a value.

The following is a description of the preferred embodiment of the formal EnumRelations interface:

```
HRESULT EnumRelations  (LPENUMUNKNOWN* ppEnum,
                        LPGUID pType);
    Parameters
        ppEnum   OUT  Enumerator of relations connected to this
                      value.
        pType IN  Only enumerate relations of this type. If NULL
                  enumerate all relations.
        Return S_OK            The operation was successful.
               E_OUTOFMEMORY   Unable to allocate required
                               memory for the enumerator.
               E_INVALIDARG    One of the arguments is invalid.
```

2.4. IJRelationValue::GetRelation

IJRelationValue::GetRelation returns the relation of pType connected to this value. This can be used to get a particular relation connected to a value such as the owner or a symbology bundle. If more than one relation of the specified type is connected to this value, the first relation connected should be returned along with the return code, RELATION_S_DUPLICATE_TYPE. In this case, EnumRelations should be used initially to find all the relations of the specified type. A NULL pointer and S_FALSE are returned if no relations of the given type are found.

The following is a description of the preferred embodiment of the formal GetRelation interface:

```
HRESULT GetRelation(LPUNKNOWN* ppRelation, LPGUID pType);
    Parameters
        ppRelation  OUT
                          IUnknown of the relation. NULL if relation
                          does not exist.
        pType      IN    Return the relation of this type.
    Return     S_OK      The operation was successful.
               RELATION_S_DUPLICATE_TYPE
                          If more than one relation of the specified
                          type is connected to this value.
               S_FALSE   If no relations of the given type are found.
               E_INVALIDARG   One of the arguments is invalid.
```

2.5. IJRelationValue::IsInterfaceIndependent

IJRelationValue::IsInterfaceIndependent identifies whether or not the interface riid is independent of all the other interfaces supported by this value. Interfaces are not independent if calling a function on the interface affects the results of any function on another interface. These interface dependencies must be known to the recompute machine so that the recompute semantics can be evaluated correctly. Interface dependencies create two ways for a recompute semantic to be evaluated: first, a recompute semantic is evaluated when one of its inputs changes (by the interface specified by the semantic) or second, when another interface of one of its inputs changes and this implicitly (through interface dependencies) causes an input to be changed.

The interfaces of an object can be divided into two categories: independent interfaces and non-independent interfaces. Independent interfaces are mutually exclusive of each other such that calling a function on an independent interface will NOT cause a change in any values returned from other independent interfaces. In contrast when a non-independent interface is used to modify an object, ALL interfaces on the object are considered to be modified. Note that when an independent interface is used to modify an object, all non-independent interfaces are also considered modified.

In sum, a recompute semantic will be evaluated in the following cases:

When one of its input values is modified by the interface enumerated from the recompute semantic. A recompute semantic always specifies its dependence on a particular interface of an input value.

When an input value is modified by any non-independent interface. Modification of a non-independent interface always triggers a recompute. This includes the recompute of semantics that input interfaces other than the one used to modify the object.

When an independent interface is used to modify a value, all semantics that depend on non-independent interfaces are recomputed.

Independent interfaces are used to prevent un-necessary recompute. Given an interface ID, IsInterfaceIndependent returns an HRESULT that describes the interfaces relationship with the other interfaces on the same object.

Note: The IJRelationValue helper object uses a callback function to implement this. The application should define a global C function with the following function signature: STDAPI IsInterfaceIndependent(REFIID riid).

A pointer to the application callback function is passed into CreateStdRelationValue. The recompute machine then calls this function, passing it the IID of the interface in question. In this way an application can re-use the provided helper implementation while still supplying the recompute machine with the interface dependencies of particular application classes.

The following is a description of the preferred embodiment of the formal IsInterfaceIndependent interface:

```
HRESULT IsInterfaceIndependent(REFIID riid);
    Parameters
                riid IN    The interface in question.
    Return      S_OK       If the interface is independent.
                S_FALSE    If the interface is non-independent.
                E_FAIL     If the interface is not supported on the
                           given object or is not to be considered in
                           recomputation.
```

3. IJCopy Interface

The IJCopy interface represents the copy behavior of a relationship. An object implements this interface to define the copy operation for a particular relation. The Relation subsystem copy machine uses this interface when it is copying objects. The Relation subsystem copy machine accesses the IJCopy interface through IJRelation::EnumSemantics. A relationship describes its modify, copy, and delete behavior by enumerating one or more semantics.

An IJCopy semantic defines a relationship between a set of values. A value is represented by the IUnknown pointer of a COM object and a status that describes whether or not the object is an input or output: (LPUNKNOWN, IID, flags). The structure that defines a value also contains an IID that is not used for the copy semantic. The IID is used only by the Compute semantics of the relation object.

The designation of objects as input or output affects how much control an application has over the copy operation. When a semantic enumerates a value as input it just guarantees that someone (another semantic or the Relation subsystem copy machine) will provide a copy of the object before the semantic is called. When a semantic enumerates a value as output, the semantic must provide a copy of the object. Outputs give an application a hook to make the choice of either cloning the value, locating an existing object as the copy, or replacing the output value with a new object. For example, a copy semantic on a document object would enumerate a symbology manager object as output so that it could decide where the copy of the symbology manager would come from. When copying to the clipboard, the semantic would clone a new symbology manager. When copying from the clipboard to an existing document, the semantic would locate the existing symbology manager instead of cloning a new one.

The following is a description of the preferred embodiment of the formal IJCopy interface:

```
Interface IJCopy : IUnknown {
    EnumValues(LPENUMJIDREF* ppEnum);
    CreateClones    (LPENUMJIDREF pOriginals, LPJMAPUNKNOWNTOUNKNOWN
                     pCloneMap);
```

-continued

```
ReconnectClones  (LPENUMJIDREF pOriginals, LPJMAPUNKNOWNTOUNKNOWN
                 pCloneMAP);
PreValueCopy(LPUNKNOWN pValues, LPJRELATIONNOTIFY pNotify);
}
```

3.1. IJCopy::CreateClones

IJCopy::CreateClones provides a clone for each of the output values of the copy semantic. The clones can be located objects, objects created with IJPersist::Clone, a new object that replaces the output value, or NULL. The core copy machine calls IJCopy::CreateClones after input values enumerated by the copy semantic have been cloned. The copy semantic provides a clone for each of its outputs and adds them to a map (hash table). If the clone is created with IJPersist::Clone, the flag RELATION_CLONE must be set in the clone map.

The following is a description of the preferred embodiment of the formal CreateClones interface:

```
HRESULT CreateClones  (LPENUMJIDREF pOriginals,
                       LPJMAPUNKNOWNTOUNKNOWN
                       Pclonemap);
     Parameters
          Poriginals IN
                       The values that the semantic has a
                       relationship with. This enumerator provides
                       the same list of values that
                       IJCopy::EnumValues returned with any
                       implicit value added at the end.
          Pclonemap    IN/OUT
                       Maps the IUnknown pointers of the original
                       objects to be copied to the IUnknowns of
                       their clones. The clones for outputs of
                       this copy semantic must be added to this
                       hash table. Any object in the map that has
                       the flag RELATION_CLONE should only be
                       accessed during IJCopy::ReconnectClones.
                       These objects are the result of
                       IJPersist::Clone and are by definition in an
                       undefined state until their relationships
                       have been re-established. If a clone is not
                       created/located for an output, the output
                       should be mapped to NULL.
     Return  S_OK      The operation was successful.
             E_OUTOFMEMORY  Unable to allocate required
                            memory.
             E_INVALIDARG   One of the arguments is invalid.
             E_UNEXPECTED   An unexpected error occurred.
```

3.2. IJCopy::EnumValues

IJCopy::EnumValues is called by the copy machine to build a graph of the objects related to a set of objects being copied. Returns an enumerator that is used to iterate through the values related by this copy semantic. Each value is qualified as input or output. (The IID is not used and is set to NULL.) Input values are objects that must be copied before this semantics CreateClones function is called. Outputs are objects that will be copied by the copy semantics CreateClones function. Typically, inputs are objects that are accessed during CreateClones to make a decision about an output. For example, a symbology manager's copy semantic would enumerate the symbology manager as an input. This would guarantee that the copy semantic could use the copy of the symbology manager during CreateClones to look for existing symbology bundles. Outputs are objects the application wants to control the copy of. Using the same example, the symbology bundles would be output of the symbology manager's copy semantic so that during copy, the semantic could look to see if an equivalent symbology bundle already exists before creating a new one. Note: the true IUnknown pointer must be returned for each value.

The following is a description of the preferred embodiment of the formal EnumValues interface:

```
HRESULT EnumValues(LPENUMJIDREF* ppEnum);
     Parameters
          ppEnum OUT  Returned enumerator.
     The flags field of the JIDREF structure indicates the value type: (IID is
     set to NULL)
                     RELATION_INPUT
                          This value is must be copied by the core
                          copy machine (or another semantic) before
                          CreateClones is called.
                     RELATION_OUTPUT
                          This value will be copied by this semantic
                     RELATION_NO_TRANSITIVE_EXPANSION
                          This is an additional qualifier, can be
                          logically OR'ed RELATION_OUTPUT into
                          the flags. This will prevent the copy machine
                          from expanding the graph through this value.
                          This is typically used on all outputs to
                          prevent unnecessary graph traversal.
     Return  S_OK     If success.
                     RELATION_S_IMPLICIT_INPUTS
                          This return code is used to allow objects to be
                          copied conditionally.
                     E_OUTOFMEMORY
```

Unable to allocate required memory. Since any object enumerated as input by the copy semantic will be copied by the copy machine (or by another semantic), a semantic can choose to not enumerate all its input values. In this case, any values that enumerate this relation in IJRelationValue::EnumRelations (i.e are connected to this relation via IJRelationValue::ConnectRelation) will be considered INPUT values and will consequently be added to the enumerator returned from IJCopy::EnumValues before IJCopy::CreateClones and IJCopy::ReconnectClones are called. This allows a semantic to "see" objects only when they are of interest (enumerated by another semantic or selected by the user).

3.3. IJCopy::PreValueCopy

IJCopy::PreValueCopy is called by the copy machine when a value directly related to the relation containing this semantic is going to be copied. For efficiency in the copy machine, all copy semantics on a relation will receive PreValueCopy whether or not they enumerate the value being copied. It is the responsibility of the PreValueCopy implementation to test that the copy of the value will have some impact on the semantic. The implementation of PreValueCopy should call IJRelationNotify::Copy to add additional objects to the copy set.

The main purpose of PreValueCopy is to propagate the copy operation. For instance, when an owner is selected for copy, the copy operation is propagated to members via IJRelationNotify::Copy. An implementation of PreValueCopy can choose to do nothing. In this case, PreValueCopy should just return S_FALSE.

The following is a description of the preferred embodiment of the formal PreValueCopy interface:

```
HRESULT PreValueCopy   (LPUNKNOWN pValue,
                        LPJRELATIONNOTIFY pNotify);
    Parameters
        pValue   IN    Value to be copied.
        pNotify  IN    PreValueCopy should call
                       IJRelationNotify::Copy to propagate the copy
                       operation. The copy machine them
                       prenotifies connected relations.
        Return   S_OK  If the semantic is interested in
                       prenotification. The semantic will continue
                       to be prenotified.
                 S_FALSE If the semantic is not interested in
                       prenotification. It will not be prenotified
                       when other related values get copied.
```

3.4. IJCopy::ReconnectClones

IJCopy::ReconnectClones re-establishes the relationships between the set of objects created by IJCopy::CreateClones. The copy machine calls this function after persistent identities are assigned to all copied values. Access to the clones is provided by iterating poriginals and looking up the clones in pCloneMap. During a copy operation, it is the responsibility of the original object to reconnect the relationships of its clone. This includes calling IJRelationValue::ConnectRelation to re-establish the relation and storing any necessary persist ids.

Note: since objects created with IJPersist::Clone are by definition in an incomplete state, care should be taken when accessing the cloned objects for reconnection. Some API's on the cloned object could fail. Objects in this state will have the flag RELATION_CLONE set when they are looked up in pCloneMap.

The following is a description of the preferred embodiment of the formal ReconnectClones interface:

```
HRESULT ReconnectClones   (LPENUMJIDREF pOriginals,
                           LPJMAPUNKNOWNTOUNKNOWN
                           pCloneMap);
    Parameters
        pOriginals  IN
                       The values that the semantic has a
                       relationship with.
This enumerator provides the same list of values that were returned from
IJCopy::EnumValues with any implicit values added
        pCloneMap  IN/OUT
                       Maps the IUnknown pointers of the
                       original objects to be copied to the
                       IUnknowns of their clones. Each object in
                       the map also has an associated flag that
                       tells whether or not the copy was created
                       with IJPersist::Clone or if the copy is a
                       pre-existing object. Outputs that are
                       mapped to NULL can be replaced in the
                       map during reconnect.
        Return   S_OK          The operation was successful.
                 E_OUTOFMEMORY Unable to allocate required
                               memory for the operation.
                 E_INVALIDARG  One of the arguments is invalid.
                 E_UNEXPECTED  An unexpected error occurred.
```

4. IJDelete Interface

The IJDelete interface represents the delete behavior of a relationship. An object implements this interface to define the delete operation of a particular relation. This interface is only exposed via IJRelation::EnumSemantics. A relationship describes its modify, copy, and delete behavior by enumerating one or more semantics.

An IJDelete semantic defines a relationship between a set of values. A value is represented by the IUnknown pointer of a COM object and a status that describes whether or not the object is an input or output: (LPUNKNOWN, IID, flags). The structure that defines a value also contains an IID that is not used for the delete semantic.

The designation of objects as input or output affects how much control an application has over the delete operation.

The following is a description of the preferred embodiment of the formal IJDelete interface:

```
Interface IJDelete : IUnknown {
    EnumValues (LPENUMJIDREF* ppEnum);
    Disconnect (LPENUMJIDREF pDeleted,
                LPJRELATIONNOTIFY pNotify);
    PreValueDelete (LPUNKNOWN pValue,
                    LPJRELATIONNOTIFY pNotify);
    }
```

4.1. IJDelete::Disconnect

The IJDelete::Disconnect interface disconnects objects from a relation before they are deleted.

The following is a description of the preferred embodiment of the formal Disconnect interface:

```
HRESULT Disconnect   (LPENUMJIDREF pDeleted,
                      LPJRELATIONNOTIFY pNotify);
    Parameters
        pDeleted  IN    The values that the semantic has a
                        relationship with.
This enumerator provides the same list of values that were returned from
IJDelete::EnumValues. Each value with status RELATION_DELETED
should be disconnected from this relation.
        pNotify   IN    Used to notify the delete machine of
additional objects to be deleted (pNotify -> Delete) or additional objects
that were created (pNotify -> Insert)
        Return   S_OK         The operation was successful.
                 E_INVALIDARG One of the arguments is invalid.
                 E_UNEXPECTED An unexpected error occurred.
```

4.2. IJDelete::EnumValues

The IJDelete::EnumValues returns an enumerator that is used to iterate through the values related by this delete semantic. Each value is qualified as input or output. (The IID is not used and is set to NULL.). Note the true IUnknown pointer must be returned for each value.

The following is a description of the preferred embodiment of the formal EnumValues interface:

```
HRESULT EnumValues (LPENUMJIDREF* ppEnum);
    Parameters
        ppEnum  OUT  Returned enumerator.
The flags field of the JIDREF structure indicates the value type: (IID is
set to NULL).
        RELATION_INPUT
        RELATION_OUTPUT
        Return   S_OK If success.
                 RELATION_S_IMPLICIT_INPUTS
                       If the enumerator does not enumerate all the
                       values related to the semantic. If a value,
                       part of the catched graph, enumerates the
                       relation by IJRelationValue::EnumRelations,
                       it will be considered as an INPUT value of
                       the semantic and passed accordingly when
                       calling Disconnect.
```

4.3. IJDelete::PreValueDelete

IJDelete::PreValueDelete is called by the delete machine when a value directly related to the relation containing this semantic is going to be deleted. For efficiency in the delete machine, all delete semantics on a relation will receive PreValueDelete whether or not they enumerate the value being deleted. It is the responsibility of the PreValueDelete implementation to test that the delete of the value will have some impact on the semantic. The implementation of PreValueDelete should call IJRelationNotify::Delete to add additional objects to the delete set. It should also call IJRelationNotify::Modify when the deletion of a connected element causes a modification of state such as when a member of an owner is deleted.

The main purpose of PreValueDelete is to propagate the delete operation: for instance when an owner is selected for delete, the delete operation is propagated to members via PrevalueDelete. An implementation of PreValueDelete can choose to do nothing. In this case, PreValueDelete should just return S_FALSE. Note: the user cannot call the global batch function from within PreValueDelete.

The following is a description of the preferred embodiment of the formal PreValueDelete interface:

```
HRESULT PreValueDelete  (LPUNKNOWN pValue,
                         LPJRELATIONNOTIFY pNotify);
    Parameters
        pValue    IN   Deleted value directly related by this
                       semantic.
        pNotify   IN   PreValueDelete should call
                       IJRelationNotify::Delete to propagate the
                       delete operation. The delete machine then
                       prenotifies recursively connected relations.
    Return    S_OK     If the semantic is interested in
                       prenotification. The semantic will continue
                       to be prenotified.
              S_FALSE  If the semantic is not interested in
                       prenotification. It won't be prenotified
                       when other related values get copied.
```

5. IJCompute Interface

The IJCompute interface represents the recompute behavior of a relationship. An object implements this interface in order to be notified of changes to other objects in the system. A pointer to the IJCompute interface is obtained by calling IJRelation::EnumSemantics, as was previously described. A relationship describes its modify, copy, and delete behavior by enumerating one or more objects that implement the relation's semantics.

An IJCompute semantic defines a relationship between a set of values. Values are represented by the identity of the COM object representing the value, the identity of the interface used to access the value, and a status that describes whether or not the value is an input, an output, or constrained: (LPUNKNOWN, IID, and flags).

A semantic is evaluated when one of its input values is modified. When constrained values are modified, a set of related semantics and values are passed to a solver. Typically, the result of evaluating a semantic is the modification of one or more output values. The modification of output values can trigger the evaluation of other semantics, and so on.

The relationships between input, output, and constrained values can be modified during evaluation by editing the recompute semantics. If this happens, evaluation will stop; the semantics will be searched again; and evaluation will continue.

The following is a description of the preferred embodiment of the formal IJCompute interface:

```
Interface IJCompute : IUnknown {
    GetSolver       (LPJRELATIONSOLVER* ppSolver);
    Evaluate        (LPENUMJIDREF pRelatedValues,
                     LPJRELATIONNOTIFY pNotify,
                     LPENUMUNKNOWN* ppEditedSemantics);
    EnumValues      (LPENUMJIDREF* ppEnum);
    ReplaceValue    (LPJIDREF pOld, LPJIDREF pNew);
    PreValueModify  (LPENUMJIDREF pStackedValues,
                     LPJRELATIONNOTIFY pNotify);
    }
Structures defined
    typedef struct tagJIDREF{
        LPUNKNOWN   pObject;   // COM object identity
        IID         iid;       // Interface used to modify
                               pObject or zero if not a
                               modification
        ULONG       flags;     // Context dependent status of
                               pObject
    } JIDREF;
    typedef JIDREF* LPJIDREF;
```

5.1. IJCompute::EnumValues

During modification (::BatchFlush) the Relation subsystem recompute machine calls this function to build a graph of all objects related to the objects being modified. The EnumValues function returns an enumerator that can be used to iterate through the values related by this recompute semantic. Each value is qualified as input, output, or constrained. Input values are objects that the relation depends on, i.e. the recompute semantic is evaluated when one or more of its input values are modified. Output values are objects that can be changed as the result of evaluating the recompute semantic. Constrained values must be passed to a solver along with the related recompute semantics. Note: the true IUnknown pointer must be returned for each value.

The following is a description of the preferred embodiment of the formal EnumValues interface:

```
HRESULT EnumValues (LPENUMJIDREF* ppEnum);
    Parameters
        ppEnum   OUT   Returned enumerator.
    The flags field of the JIDREF structure indicates the value type:
        RELATION_INPUT :
                    This semantic should be evaluated when this
                    value is modified.
        RELATION_OUTPUT :
                    This semantic can modify this value.
        RELATION_CONSTRAINED :
                    This semantic should be passed to a solver
                    along with this value to decide whether or
                    not this value should be changed.
    These three qualifiers are mutually exclusive. An additional qualifier
    may be added to any of these three:
        RELATION_NO_TRANSITIVE_EXPANSION :
                    Do not traverse through this value when
                    traversing relationships. This causes
                    additional elements connected to these
                    values to not be added in the domain of
                    interest.
    Return   S_OK    If success.
        RELATION_S_IMPLICIT_INPUTS
                    The enumerator does not enumerate all the
                    values related to the semantic. Any value
                    that enumerates this relation in
                    IJRelationValue::EnumRelations (i.e. is
                    connected to this relation via
                    IJRelationValue::ConnectRelation) will be
                    passed to IJCompute::Evaluate as an INPUT.
                    This is a way for the semantic to limit the
```

5.2. IJCompute::Evaluate

The IJCompute::Evaluate function is called by the Relation subsystem recompute machine after input values connected to the relation are modified. The recompute semantic has the option of modifying output values as the result of being evaluated. If a recompute semantic has constrained arguments, it will NOT get an Evaluate call, instead, the recompute semantic and its related values will be passed to a solver. The solver chooses which values to modify.

A recompute semantic can choose to change some relations during evaluation. In that case, Evaluate should return RELATION_S_SEARCH and specify the list of changed semantics in ppEditedSemantics.

The implementation of Evaluate performs the following functions:

Tests the status of input arguments (modified, not modified, or error);

Evaluates an output;

Notifies the recompute machine if the output value will change before the value is actually changed; and Posts the new value of the output, after the recompute machine notification.

If Evaluate changes relationships (for example, edit the relationship graph), it should return RELATION_S_SEARCH to notify the recompute machine that the current graph is no longer valid. The enumerator ppEditedSemantics must be returned indicating the edited semantics. If the current semantic is included in the edited list, it is recomputed.

When calling this function, the recompute machine changes the status of output values as follows:

If Evaluate sends a modify for an output value to pNotify, the recompute machine changes the status of the output value to RELATION_MODIFIED; and If the return code of Evaluate is an error, the state of the output value(s) is set to RELATION_ERROR.

The following is a description of the preferred embodiment of the formal Evaluate interface:

```
HRESULT Evaluate  (LPENUMJIDREF pValues,
                   LPJRELATIONNOTIFY pNotify
                   LPENUMUNKNOWN* ppEditedSemantics);
  Parameters    pValues    IN
                           The values that the semantic has a
                           relationship with.
```
The flags field of the JIDREF structure indicates the status of the value with respect to recompute:

| | |
|---|---|
| RELATION_MODIFIED : | the value has been modified by the user or by the recompute of other semantics. |
| RELATION_ERROR : | the value is in error. |
| RELATION_FROZEN : | the value cannot be modified by a constraint solver |
| RELATION_INPUT : | this semantic depends on this value. Modification of this value causes this recompute semantic to be evaluated. |
| RELATION_OUTPUT : | the value can be modified by this evaluation. It is write only. |
| RELATION_CONSTRAINED : | the value is a constrained argument of a predicate. In this case, a solver must be called to evaluate this semantic. | pValues can be held by AddRefing or Cloning it. This allows this enumerator to be used to enumerate which values have been modified after returning from Evaluate. However, this enumerator will only be valid for the duration of the current graph compute. It will be automatically invalidated by the recompute machine at the end of the current recompute. After an enumerator has been invalidated it will return E_ACCESSDENIED.

| | | |
|---|---|---|
| pNotify | IN | Used to notify the recompute machine before an output value is modified: pNotify->Modify (outputValue) |
| ppEditedSemantics | OUT | |
| | | If this evaluation edits any relationships, Evaluate should return RELATION_S_SEARCH and the edited semantics should be returned through ppEditedSemantics. Otherwise, ppEditedSemantics should be returned as NULL. |

The global batch functions, ::BatchInsert, ::BatchModify, and so on, should never be called from within Evaluate. Use pNotify instead.

| | | |
|---|---|---|
| Return | S_OK | If success. (*ppEditedSemantics must be NULL.) |
| | E_FAIL | If evaluation failed. (*ppEditedSemantics must be NULL.) |
| | RELATION_S_SEARCH | |
| | | If the evaluation function modified the graph. The graph must be searched and sorted again before continuing. (*ppEditedSemantics must be not NULL.) |

5.3. IJCompute::GetSolver

The IJCompute::GetSolver gets the solver associated with a recompute semantic. The solver is responsible for updating constrained values or updating the outputs of recompute semantics that are in a loop. This function is only called when the recompute machine detects constrained values or a set of semantics that are in a loop. (A loop results when a set of recompute semantics defines inputs and outputs such that evaluation would cause an infinite loop.)

The following is a description of the preferred embodiment of the formal GetSolver interface:

```
HRESULT GetSolver(LPJRELATIONSOLVER* ppSolver);
  Parameters
        ppSolver    OUT   Solver to be used for constrained values or
                          semantics in a loop.
        Return  S_OK       The operation was successful.
                E_INVALIDARG   The argument is invalid.
```

5.4. IJCompute::PreValueModify

IJCompute::PreValueModify is called by the recompute machine when a value directly or transitively related to the relation containing this semantic is going to be modified. For efficiency in the recompute machine, all compute semantics on a relation will receive PreValueModify whether or not they enumerate the value being modified. It is the responsibility of the PreValueModify implementation to test that the modification of the value will have some impact on the semantic. (This could involve testing independent or non-independent interface information.) The implementation of PreValueModify should call IJRelationNotify::Modify on any output values that will be modified as a result of the input value being modified.

If an interface modifies an object several times, the recompute machine notifies connected semantics only for the first modification. If different interfaces modify an object several times, the recompute machine notifies connected semantics each time a new interface is modified. The flag RELATION_MULTI_MODIF indicates that another interface has already modified the object.

By enumerating pStackedValues, the semantic can find out which object initiated the modification because of ::BatchModify and which objects forwarded it using IJRelationNotify::Modify. This allows access to the list of objects involved in the modification not just the object connected directly to this relation. pStackedValues enumerates values in the following manner:

1. The first enumerated value is the value directly connected to this relation.
2. All enumerated values but the last have been marked modified by IJRelationNotify::Modify.
3. The value enumerated last has been marked modified by ::Batchmodify.

A modification is always initiated with ::BatchModify. The relation(s) directly connected to the value to be modified will receive IJCompute::PreValueModify. Each of these semantics will call IJRelationNotify::Modify for each output that will be modified. These additional semantics will receive IJCompute::PreValueModify and be able to access the original object that was specified in ::BatchModify and the intermediate objects that were modified by IJRelationNotify::Modify. For example, when a listener that depends on the IJOwner interface of an owner is being notified that the owner is about to change, it can find which member of the owner is about to change.

Note that an implementation of PreValueModify can choose to do nothing. In this case, PrevalueModify should just return S_FALSE.

The following is a description of the preferred embodiment of the formal PreValueModify interface:

```
HRESULT PreValueModify    (LPENUMJIDREF pStackedValues,
                           LPJRELATIONNOTIFY pNotify);
    Parameters
        pStackedValues    IN
                          Modified value(s).
The structure contains the following fields:
    pObject :   IUnknown pointer of the modified object
    IID :       interface modified on that object
    flags :     It has the possible values
    RELATION_FIRST_MODIF:
                It's the first time the object is modified
    RELATION_MULTI_MODIF:
                The object has already been modified by another
                interface
    RELATION_INDEP_INTF:
                The modified interface is "independent"
    RELATION_NONINDEP_INTF:
                The modified interface is not independent.
        pNotify   IN      PreValueModify should call
                          IJRelationNotify::Modify when the output of
                          this semantic is modified as the result of
                          the modified input. The recompute machine
                          them prenotifies recursively connected
                          relations.
    Return    S_OK        If the semantic is interested in
                          prenotification. The semantic will continue
                          to be prenotified.
              S_FALSE     If the semantic is not interested in
                          prenotification. It won't be prenotified
                          when other related values get modified.
```

5.5. IJCompute::ReplaceValue

IJCompute::ReplaceValue replaces a value related enumerated by this semantic with another value. This function can be used to change or edit the relationship graph. Note that if the same value is depended on multiple times, this function replaces the first occurrence of that value with the new value.

The following is a description of the preferred embodiment of the formal ReplaceValue interface:

```
HRESULT ReplaceValue (LPJIDREF pOld, LPJIDREF pNew);
    Parameters
        pOld    IN     Old value that this semantic depends on.
        pNew    IN     Value used to replace old value.
    Return  S_OK       The operation was successful.
            E_FAIL     The old object referenced by pOld was not
                       found.
```

6. IJRelationGraPh Interface

The IJRelationGraph interface is supported by the Relation Manager to communicate with the relation semantics or the solvers that operate on relation semantics. It presents a "snap-shot" of a document's relationship graph.

The following is a description of the preferred embodiment of the formal IJRelationGraph interface:

```
typedef ULONG  (*LPJRELATIONSTATUSFUNC) (LPJIDREF,
                       char*, ULONG);
Interface IJRelationGraph : IUnknown {
    AddElement (LPUNKNOWN, LPIID, ULONG);
    SearchAndSort (LPENUMJIDREF, ULONG);
    IncrementalSearchAndSort (LPENUMJIDREF, ULONG);
    EnumSemantics (LPENUMUNKNOWN);
    EnumValues (LPENUMJIDREF);
    ModifyValueState (LPJRELATIONSTATUSFUNC, char*,
    ULONG);
    Update (LPJRELATIONNOTIFY, LPENUMJIDREF*);
    Clear( );
    CommittedOn( );
    CommittedOff( );
    }
```

6.1. IJRelationGraph::AddElement

IJRelationGraph::AddElement indicates to the graph element to accumulate before a call to SearchAndSort. That is an alternate way to indicate the set of initial values to use for searching and sorting of a dependent graph.

The following is a description of the preferred embodiment of the formal AddElement interface:

```
HRESULT IJRelationGraph::AddElement
                    (LPUNKNOWN pObject, LPIID pIId, ULONG
                     flags);
    Parameters
        pObject  IN    Object to accumulate.
        pIId     IN    Interface modified when flags =
                       RELATION_INSERTED; NULL for other
                       values of flags.
        flags IN  Operation on the element: RELATION_INSERTED,
                       RELATION_MODIFIED, or
                       RELATION_DELETED.
    Return   S_OK        The operation was successful.
             E_OUTOFMEMORY  Unable to allocate required
                            memory for the operation.
```

6.2. IJRelationGraph::Clear

IJRelationGraph::Clear clears the graph. Releases a pointer to the object that it contains and releases memory. Constraint system to solve.

The following is a description of the preferred embodiment of the formal Clear interface:

```
Clear(void);
    Return  S_OK    The operation was successful.
```

6.3. IJRelationGraph::CommittedOff

IJRelationGraph::Committedoff indicates that the graph operation performed will not affect the data base permanently. This mode gets elements which recompute when calling IJRelationNotify::IsCommitted The following is a description of the preferred embodiment of the formal CommittedOff interface:

```
ULONG CommittedOff()
    Return  Number of CommittedOff requirement
See Also: BatchCommittedOn, BatchCommittedOff, IsBatchCommitted,
RelationNotify::IsBatchCommitted
```

6.4. IJRelationGraph::CommittedOn

IJRelationGraph::CommittedOn indicates that the graph operation that will be performed will affect permanently the data base. This mode gets elements which recompute when calling IJRelationNotify::IsCommitted The following is a description of the preferred embodiment of the formal CommittedOn interface:

```
ULONG CommittedOn()
    Return  Number of "CommittedOn" requirement left.
The mode is back to "Committed" when this count is back to 0.
See Also     : BatchCommittedOn, BatchCommittedOff,
               IsBatchCommitted,
RelationNotify::IsBatchCommitted
```

6.5. IJRelationGraPh::EnumValues

IJRelationGraph::EnumValues returns an enumerator that can be used to list the values that the graph contains. The flags field of the

```
JIDREF structure has the following meaning :
    RELATION_MODIFIED     The value has been modified.
    RELATION_ERROR        The value is in error.
    RELATION_NOT_EVALUATED
                          The value has not been evaluated
                          so far.
    RELATION_FROZEN       The value that participates in a
                          constraint system. However, because a
                          partial or incremental search has been
                          performed, all the predicates acting on
                          the value are not in the constraint
                          system to solve.
```

The following is a description of the preferred embodiment of the formal EnumValues interface:

```
EnumValues (LPENUMJIDREF* ppEnum);
    Parameters
        ppEnum  OUT   Enumerator to access the values that the
                      graph contains.
        Return  S_OK  The operation was successful.
```

```
        E_OUTOFMEMORY  Unable to allocate required
                       memory for the enumerator.
        E_INVALIDARG   The argument was not a valid
                       pointer.
```

6.6. IJRelationGraPh::IncrementalSearchAndSort

IJRelationGraph::IncrementalSearchAndSoort is used in two cases:

After an initial SearchAndSort has been performed with the option RELATION_PARTIAL_CONSTRAINT, and a solver cannot find a solution without modifying values whose predicates are not in the system to solve (values with the state RELATION_FROZEN). The solver should then ask for an incremental search of the graph that takes all the predicates acting on these frozen values into consideration. The incremental search adds these predicates and adds any values that are arguments of these predicates. The solver can then attempt to solve again. This entire process is repeated until a solution is found.

During update if Evaluate returns RELATION_S_SEARCH. In this case, the graph needs to be searched and sorted again with respect to the list of edited semantics returned by Evaluate.

The following is a description of the preferred embodiment of the formal IncrementalSearchAndSort interface:

```
HRESULT IJRelationGraph::IncrementalSearchAndSort
                        (LPENUMJIDREF pAdditional, ULONG mode);
    Parameters
        pAdditional  IN
                            Values for which all predicates must be
                            taken in consideration.
        mode         IN     New mode for the searching. Could be
                            changed from
                            RELATION_PARTIAL_CONSTRAINT
                            to RELATION_FULL_CONSTRAINT
                            to stop incremental solving.
    Return  S_OK            The operation was successful.
            E_OUTOFMEMORY   Unable to allocate required
                            memory.
            E_INVALIDARG    If the new mode defined for
                            searching is incompatible with
                            previous modes.
```

6.7. IJRelationGraph::ModifyValueState

IJRelationGraph::ModifyValueState allows a callback to be used to modify the status of values in the current graph. This function is typically used to reset the status of values after an Update.

The following is a description of the preferred embodiment of the formal ModifyValueState interface:

```
typedef ULONG   (*LPJRELATIONSTATUSFUNC)
                (LPJIDREF pIdRef, char*
                pContext, ULONG contextSize);
ModifyValueState (LPJRELATIONSTATUSFUNC pCallback,
                char* pContext, ULONG contextSize)
    Parameters
        pCallback    IN    Function that is called for each value in
                           the current graph.
This function is passed the JIDREF of a value and should return the new
status for the value.
        pContext     IN    Callback specific context information. It
                           is passed into the callback for each value.
                           This can be NULL.
```

```
        contextSize    IN
                            The size, in bytes, of the above context
                            buffer. This is also passed into the
                            callback function. It can be zero.
        Return  S_OK        The operation was successful.
                E_FAIL      If IJRelationGraph::SearchAndSort has
                            never been called for this graph.
```

6.8. IJRelationGraph::SearchAndSort

IJRelationGraph::SearchAndSort forms a set of COM object identifiers and interface identifiers, and finds the elements transitively connected by dependency or equivalence relations and sorts them into the correct order for recompute. The following modes of searching are provided:

```
RELATION_DEPENDENT        Finds the direct and transitive dependents
                          of pInitial.
RELATION_PARTIAL_CONSTRAINT
                          Constraint systems are not searched
                          transitively. It only finds predicates
                          defined on pInitial elements and on
                          elements added because of direct
                          dependency.
RELATION_FULL_CONSTRAINT
                          Constraint systems are searched
                          transitively as soon as one of their
                          elements enters the graph.
```

The set of initial elements can be passed as input argument pInitial, or accumulate by the graph itself by previous call to AddElement.

The following is a description of the preferred embodiment of the formal SearchAndSort interface:

```
HRESULT IJRelationGraph::SearchAndSort
                    (LPENUMJIDREF pInitial, ULONG mode);
    Parameters
        pInitial  IN    Enumerator to get the set of initial values
                        to start the search from or NULL to search
                        and sort the graph corresponding to elements
                        accumulated by the graph as a result of
                        AddElement calls.
        mode      IN    Define the searching mode.
        Return    S_OK          The operation was successful.
                  E_OUTOFMEMORY Unable to allocate required
                                memory.
                  E_INVALIDARG  If invalid mode (for example
                                DEPENDENT | INTERNAL).
    Processing  The elements are searched with respect to the options
                defined above.
The following options are mutually exclusive:
                RELATION_PARTIAL_CONSTRAINT /
                RELATION_FULL_CONSTRAINT.
The elements are sorted in the dependency order. If the SearchAndSort is
to be used for a graph update, the status of all pInitial values should be
set to RELATION_MODIFIED.
```

6.9. IJRelationGraph::Update

IJRelationGraph::Update maintains the data integrity of values by evaluating recompute semantics or by passing recompute semantics to a solver. Whenever elements with relations are modified, SearchAndSort should be called followed by an Update.

The following is a description of the preferred embodiment of the formal Update interface:

```
Update (LPJRELATIONNOTIFY pNotify, LPENUMJIDREF* ppValues);
    Parameters
        pNotify   IN     Used to notify the relationship manager of
                         changes to values.
        ppValues  OUT    If not NULL, this should return an
                         enumerator that allows the caller to find
                         the status of all relations after the
                         update. For example, to see if a value was
                         modified or not.
        Return    S_OK   The operation was successful.
                  E_FAIL If some elements have failed recompute.
```

7. IJRelationNotify Interface

The IJRelationNotify interface is used during update, copy, and delete to notify the relationship manager of additional objects to be processed. It is passed as a parameter to the compute, copy and delete semantics. The semantics are responsible for notifying the relationship manager.

The following is a description of the preferred embodiment of the formal IJRelationNotify interface:

```
Interface IJRelationNotify : IUnknown {
    HRESULT Copy(LPUNKNOWN pAnyInterface);
    HRESULT Delete(LPUNKNOWN pAnyInterface);
    HRESULT Modify(LPUNKNOWN pAnyInterface, REFIID);
    HRESULT Insert(LPUNKNOWN pAnyInterface);
    HRESULT IsCommitted( );
    };
typedef IJRelationNotify* LPJRELATIONNOTIFY;
```

7.1. IJRelationNotify::Copy

IJRelationNotify::Copy is used by a relation semantic to notify the relationship manager that the COM object, pAnyInterface, needs to be copied as the result of the current operation. This is typically called from IJCopy::PreValueCopy to add additional objects to be copied. For instance, when an owner is being copied, its copy semantic uses this to recursively add its members to be copied.

The following is a description of the preferred embodiment of the formal Copy interface:

```
HRESULT Copy(LPUNKNOWN pAnyInterface)
    Parameters
        pAnyInterface   IN
                           Pointer to any interface of the object to be
                           copied.
        Return  S_OK       The operation was successful.
                E_UNEXPECTED
                           Unexpected error during operation.
```

7.2. IJRelationNotify::Delete

IJRelationNotify::Delete used by a relation semantic to notify the relationship manager that the COM object, pAnyInterface, needs to be deleted as the result of the current operation. This is typically called from IJDelete::PreValueDelete to add additional objects to be deleted. For instance, when an owner is being delete, its delete semantic uses this to recursively add its members to be deleted.

The following is a description of the preferred embodiment of the formal Delete interface:

```
HRESULT Delete (LPUNKNOWN pAnyInterface)
    Parameters
        pAnyInterface   IN
                        Pointer to any interface of the object to be
                        deleted.
    Return  S_OK        The operation was successful.
            E_UNEXPECTED
                        Unexpected error during operation.
```

7.3. IJRelationNotify::Insert

IJRelationNotify::Insert is used by a relation semantic to notify the relationship manager that the COM object, pAnyInterface, was created as the result of the current operation. This can only be called from an implementation of IJDeleteIJDeletePreValueDelete. A delete semantic sometimes has the need to create objects. For example, to delete an elbow and create an end cap when a pipe is being deleted.

The following is a description of the preferred embodiment of the formal Insert interface:

```
HRESULT Insert (LPUNKNOWN pAnyInterface)
    Parameters
        pAnyInterface   IN
                        Pointer to any interface of the object to be
                        inserted.
    Return  S_OK        The operation was successful.
            E_UNEXPECTED
                        Unexpected error during operation.
```

7.4. IJRelationNotify::IsCommitted

IJRelationNotify::IsCommitted is used by functions of relation semantic which are given a LPRELATIONNOTIFY as argument to inquire if the current modification if committed or not, i.e. will it affect the database permanently.

The following is a description of the preferred embodiment of the formal IsCommitted interface:

```
HRESULT IsCommmmitted( )
    Return  S_TRUE      Current mode is committed.
            S_FALSE     Current mode is not committed.
See Also: ::BatchCommittedOff, ::BatchCommittedOn,
::IsBatchCommitted.
```

7.5. IJRelationNotify::Modify

IJRelationNotify::Modify is used by a relation semantic to notify the relationship manager that the COM object, pAnyInterface, will be modified via interface, refIID, as the result of the current operation. This is typically called from IJCompute::Evaluate to notify the relationship manager that the outputs of a recompute semantic are going to be modified. This function should be called before the actual modification of pAnyInterface.

The following is a description of the preferred embodiment of the formal Modify interface:

```
HRESULT Modify(LPUNKNOWN pAnyInterface, REFIID refIID)
    Parameters
        pAnyInterface   IN
                        Pointer to any interface of the object to be
                        modified.
        refIID          IN  Interface identifier of the interface that
                            is used to modify the object.
```

```
    Return  S_OK        The operation was successful.
            E_UNEXPECTED
                        Unexpected error during operation.
See Also: IJcompute::Evaluate.
```

8. IJRelationGlobal Interface

The IJRelationGlobal interface is supported by the Relation Manager to set and get how the Relation Manager behaves during recompute.

The following is a description of the preferred embodiment of the formal IJRelationGlobal interface:

```
Interface IJRelationGlobal : IUnknown {
    SetUpdateMode(ULONG mode);
    GetUpdateMode(ULONG *pMode);
};
```

8.1. IJRelationGlobal::GetUpdateMode

IJRelationGlobal::GetUpdateMode inquires how Relation Manager recomputes dependency after a modification: RELATION_PARTIAL_CONSTRAINT solves the constraint systems incrementally. RELATION_FULL_CONSTRAINT searches the entire constraints system before trying to solve them.

The following is a description of the preferred embodiment of the formal GetUpdateMode interface:

```
HRESULT GetUpdateMode (ULONG *mode);
    Parameters
        mode    OUT     RELATION_PARTIAL_CONSTRAINT or
                        RELATION_FULL_CONSTRAINT as
                        defined above.
    Return  S_OK        The operation was successful.
```

8.2. IJRelationGlobal::SetUDdateMode

IJRelationGlobal::SetUpdateMode defines how Relation Manager recomputes dependency after a modification: RELATION_PARTIAL_CONSTRAINT solves the constraint systems incrementally. RELATION_FULL_CONSTRAINT searches the entire constraints system before trying to solve them.

The following is a description of the preferred embodiment of the formal SetUpdateMode interface:

```
HRESULT SetUpdateMode(ULONG mode);
    Parameters
        mode    IN      RELATION_PARTIAL_CONSTRAINT or
                        RELATION_FULL_CONSTRAINT as
                        defined above.
    Return  S_OK        The operation was successful.
            E_INVALIDARG
                        The mode specified was not
                        RELATION_PARTIAL_CONSTRAINT or
                        RELATION_FULL_CONSTRAINT
```

9. IJRelationSolver Interface

The IJRelationSolver interface is implemented by the Relation Manager to communicate with an application solver. The solver should have knowledge of a particular set of constraints or knowledge of how to solve a list of semantics in a loop.

The following is a description of the preferred embodiment of the formal IJRelationSolver interface:

```
Interface IJRelationSolver : IUnknown {
Solve (LPJRELATIONNOTIFY, LPENUMJIDREF,
    LPENUMUNKNOWN, LPENUMJIDREF*);
}
```

9.1. IJRelationSolver:Solve

IJRelationSolver::Solve solves a constraint system. A set of values and a set of semantics defines the system to solve. The solver should update values to ensure that all the constraints are TRUE.

The following is a description of the preferred embodiment of the formal Solve interface:

```
Solve  (LPJRELATIONNOTIFY pNotify, LPENUMJIDREF pValues,
       LPENUMUNKNOWN pSemantic, ULONG mode,
       LPENUMJIDREF* ppAddedValues);
    Parameters
        pNotify       IN
                      Used to notify the relationship manager of
                      any changes to values.
        pValues       IN/OUT
                      Values that participate in the system to
                      solve. Their flags in the JIDREF structure
                      could be RELATION_MODIFIED,
                      RELATION_INPUT,
                      RELATION_CONSTRAINED, or
                      RELATION_FROZEN.
        pSemantics    IN
                      Semantics that participate in the constraint
                      system to solve, either semantics
                      transitively connected by constrained values
                      or semantics in a loop created by input and
                      output values.
        mode          IN
                      RELATION_FULL_CONSTRAINT : The
                      full set of values and constrains acting on
                      them has been searched
                      RELATION_PARTIAL_CONSTRAINT:
                      Some of the values passed the solver can be
                      "frozen" because incremental solving
        ppAddedValues OUT
                      Values with a RELATION_FROZEN status
                      that need to be modified. This is used in
                      conjunction with a return code
                      RELATION_S_SEARCH.
    Return  S_OK  If solution found.
            RELATION_S_INCREMENTAL_SEARCH
                      If graph should be searched again, with all
                      the semantics acting on ppAddedValues
                      added to the graph.
            RELATION_S_FULL_CONSTRAINT
                      If graph should be searched again with the
                      full constraint system (no more incremental
                      searching)
            RELATION_E_NO_SOLUTION
                      If the solver doesn't find a solution.
            E_FAIL
```

To reduce the size of the system to solve, the solver can test for the status RELATION_MODIFIED to see which values have been modified by the user or by some re-evaluation function. The graph to recompute can contain values that have not changed.

The solver must not modify values with the status RELATION_INPUT. Such a value is a constant input of a predicate, for example, if the value is the output of a recompute semantic.

If the solver needs to modify RELATION_FROZEN values to find a solution, it should return the values in ppAddedValues and return the status RELATION_E_NO_SOLUTION to ask the recompute machine for a more complete graph. All the semantics acting on these values and all the values that are values related to these semantics are then added to the graph. After the graph is re-ordered, the evaluation functions with the added values for output are called before the constraint solver is called again with the extended system.

An alternate solution is to ask for a complete search of the constraint system by returning RELATION_S_FULL_CONSTRAINT.

If a solution is found, the solver should pre-notify the recompute machine, update adequate geometry, and return S_OK.

10. IJComputeCFunction Interface

The IJComputeCFunction interface represents a recompute semantic that is implemented as a C function. It also provides local storage of intrinsic values like int, double, and so on to be used as function arguments. This interface should be implemented by an object representing the recompute semantic of a relation. This interface is accessed through IJRelation::EnumSemantics. The standard C function helper supports IJComputeCFunction.

The idea is for an application to write a set of C functions that the Relationship Manager can call during recompute. These functions take values as inputs and write to output values. This allows an application to model a wide variety of recompute behavior without having to implement the associative machine itself. This is analogous to a spreadsheet where end-users can write their own functions to be placed in a cell.

The following is a description of the preferred embodiment of the formal Solve interface:

```
Interface IJComputeCFunction : IUnknown {
    SetDefinition      (REFCLSID dllServerClsid,
                        LPSTR pFunctionName,
                        LPSTR pArgFormat, ... );
    SetDefinitionV     (REFCLSID dllServerClsid,
                        LPSTR pFunctionName,
                        LPSTR pArgFormat, va_list args);
    GetArgumentCount   (ULONG* pCount);
    GetArguments       (ULONG count, LPJCFUNCARGDESC
                        pArgs);
    ReplaceArgument    (ULONG index, LPJCFUNCARGDESC pArg);
    GetDefinition      (LPCLSID pDllServerClsid, LPSTR FAR*
                        ppFunctionName, LPSTR FAR* ppArgFormat)
}
Structures defined
    typedef struct tagJCFUNCARGDESC {
    // modifiers
    JCFUNC_ARRAY
    JCFUNC_UNSIGNED
    // types
    JCFUNC_CHAR
    JCFUNC_SHORT
    JCFUNC_LONG
    JCFUNC_DOUBLE
    JCFUNC_IDREF
    JCFUNC_IFACE
    JCFUNC_STRING
    JCFUNC_NOTIFY
        ULONG    m_type;
        union
        {
            char     m_char;
            short    m_short;
            long     m_long;
            UCHAR    m_uchar;
            USHORT   m_ushort;
            ULONG    m_ulong;
            double   m_double;
            char*    m_string;   // NULL terminated allocated via
    IMalloc
            JIDREF   m_object;   // Must be released.
```

-continued

```
    struct
    {
        ULONG        m_count;
        union
        {
            // allocated via IMalloc
            char*   m_pChar;
            short*       m_pShort;
            long* m_pLong;
            UCHAR*      m_pUchar;
            USHORT*     m_pUshort;
            ULONG*      m_pUlong;
            double*     m_pDouble;
            JIDREF*     m_pObject;
        }
    } m_array;
    };
    BYTE*   m_reserved;
} JCFUNCARGDESC;
typedef JCFUNCARGDESC FAR* LPJCFUNCARGDESC;
```

10.1. IJComputeCFunction::GetArgumentCount

IJComputeCFunction::GetArgumentCount gets the count of the arguments for the specified function. The count is determined from the argument format passed to IJComputeCFunction::SetDefinition.

The following is a description of the preferred embodiment of the formal GetArgumentCount interface:

```
HRESULT GetArgumentCount(ULONG* pCount);
    Parameters
        pCount      OUT The argument count.
    Return  S_OK    The operation was successful.
```

10.2. IJComputeCFunction::GetArguments

IJComputeCFunction::GetArguments gets the actual arguments for the specified function. The buffer passed in should be large enough to hold all the arguments. The arguments returned in the buffer could contain interface pointers that need to be released and memory pointers that need to be freed via IMalloc->Free. The Relations subsystem provides a helper function, ::ReleaseJCFUNCARGDESCon pArgs to release any interfaces and free any allocated memory it might contain.

The following is a description of the preferred embodiment of the formal GetArguments interface:

```
HRESULT GetArguments  (ULONG count, LPJCFUNCARGDESC
                       pArgs);
    Parameters
        count   IN    The number of argument descriptors in pArgs.
                      Should be greater than or equal to the count
                      returned from GetArgumentCount.
        pArgs   OUT   Buffer, allocated by the caller, to return the
                      arguments in.
    Return  S_OK      The operation was successful.
```

10.3. IJComputeCFunction::GetDefinitionV

IJComputeCFunction::GetDefinitionV gets the parameters used to define the C function.

The following is a description of the preferred embodiment of the formal GetDefinitionV interface:

```
HRESULT GetDefinitionV  (LPCLSID pDllServerClsid, LPSTR FAR*
                        ppFunctionName, LPSTR FAR*
                        ppArgFormat);
    Parameters
        pDllServerClsid   OUT
                          The GUID used to find the DLL that
                          contains this function.
        ppFunctionName    IN
                          The function name. This memory is allocated
                          with the IMalloc interface returned from
                          CoGetMalloc and must be freed by the
                          caller.
        ppArgFormat IN
                          A "printf" style character string that
                          describes the function arguments. This
                          memory is allocated with the IMalloc
                          interface returned from CoGetMalloc and
                          must be freed by the caller.
    Return  S_OK          The operation was successful.
```

10.4. IJComputeCFunction::ReplaceArQument

IjComputeCFunction::ReplaceArgument replaces an actual argument for the specified function.

The following is a description of the preferred embodiment of the formal ReplaceArgument interface:

```
HRESULT ReplaceArgument  (ULONG index, LPJCFUNCARGDESC
                         pArg);
    Parameters
        index   IN    The index of the argument to replace. (Zero is
                      the left-most argument.)
        pArg    IN    New value for the index argument.
    Return  S_OK      The operation was successful.
            E_INVALIDARG
                      One of the arguments was invalid.
```

10.5. IJComputeCFunction::SetDefinition

IJComputeCFunction::SetDefinition establishes a C function as an associative evaluation function. The C function is called from IJCompute::Evaluate during a graph update. The C function to call and its arguments are specified.

A function can have the following intrinsic types as input arguments: char, unsigned char, char[], unsigned char[], short, unsigned short, short[], unsigned short[], long, unsigned long, long[], unsigned long[], double, double[], and string (NULL terminated char[]).

A function can have COM objects as input and output arguments. These arguments can be passed to the evaluation function in three ways: as an interface pointer, as a pointer to a JIDREF structure (LPJIDREF) or as an array of JIDREF structures. In the first case, IJCompute::Evaluate is responsible for querying and releasing the interface. In the second and third cases, the C evaluation function receives the IUnknown pointer in the JIDREF struct. Since the flags field of the JIDREF contains a status: modified, error, and so on, using an JIDREF as input allows a function to determine which of its parents has changed.

A function can also have a special "run-time" argument: a pointer to the relation manager notification interface. This argument is set during evaluate and can be used by the function to notify the recompute machine of modify events for outputs. This allows a function to optimize its recompute behavior by sending modify events for outputs only when necessary.

Argument types are specified by a "printf" style format string. The argument format string is composed of a contiguous list of one or more argument formats. Each argument format consists of three parts:

A '%' character to indicate the start of a new argument.
For intrinsic types: zero, one or two modifiers that indicate whether or not the argument is an array and/or unsigned. For COM object types: one or two status characters that indicate whether or not the argument is an array and input or output.
A single character that indicates the argument type.
The syntax for an argument format is:

---

%[#][u]{c|h|l} [array of][unsigned] char, short or long
%[#]g [array of ]double
%s NULL terminated char string.
%n LPJRELATIONNOTIFY (runtime argument).
%[#]{<|>}r [array of]{input or output } JIDREF
%{<|>}i {input or output }interface pointer

---

This results in the following supported argument types:

---

| | |
|---|---|
| %c | char |
| %uc | unsigned char |
| %#c | array of char |
| %#uc | array of unsigned char |
| %h | short |
| %uh | unsigned short |
| %#h | array of short |
| %#uh | array of unsigned short |
| %l | long |
| %ul | unsigned long |
| %#l | array of long |
| %#ul | array of unsigned long |
| %g | double |
| %#g | array of double |
| %s | NULL terminated char* string |
| %n | LPJRELATIONNOTIFY passed at run-time |
| %<i | interface pointer as input value |
| %>i | interface pointer as output value |
| %<r | JIDREF as input value |
| %>r | JIDREF as output value |
| %#<r | array of JIDREF as input values |
| %#>r | array of JIDREF as output values |

---

Arrays are passed as two arguments: a ULONG indicating the number of elements in the array and a pointer to the first element. Zero size arrays are passed with a NULL pointer.

On creation of the C function, array arguments are copied into a buffer within the C function. When called, the C function is passed a pointer into this buffer. Changing the contents of arrays and strings can only be done with IjComputeCFunction::ReplaceArgument.

The actual arguments, as passed to SetDefinition, must exactly match the specified argument format (except for the relation notification pointer, which should be NULL. The current relation notification pointer is substituted when the C function is called.). Arrays require two actual arguments: a ULONG count indicating the number of elements in the array and a pointer to the first element. COM object arguments also require two actual arguments: a pointer to any interface on the value (LPUNKNOWN) and a pointer to the iid of the interface used on the value (LPIID). These arguments are passed to the evaluation function as a pointer to the specified interface or as a pointer to a JIDREF structure. In the later case, the JIDREF structure contains the IUnknown pointer, interface ID, and a status flag. An array of JIDREF structures is required for the "%#>r" and "%#<r" argument types.

COM object arguments are optional. In this case, the actual arguments are passed as NULL (both the LPUNKNOWN and LPIID). When called, the evaluation function is passed a NULL interface pointer or NULL LPJIDREF for these arguments. Optional arguments can be set with IJComputeCFunction::ReplaceArgument.

Normally, the Relation Manager assumes that Evaluate modifies all output values and sets their status. If the C function wants to set the status of the outputs itself, it should declare the relation notification interface, "%n", as a runtime argument and declare its output arguments as LPJIDREF. (The notification for modify requires the COM identity of an object and the IID of the interface used to modify the object.) This allows a C function to optimize its recompute behavior, for example by deciding whether or not an output value has changed. Note: the user cannot call the global batch functions during evaluate of the C function.

The following is a description of the preferred embodiment of the formal SetDefinition interface:

| | | |
|---|---|---|
| HRESULT SetDefinition | (REFCLSID dllServerClsid, LPSTR pFunctionName, LPSTR pArgFormat, . . . ); | |
| Parameters | | |
| | dllServerClsid | IN |
| | | The GUID used to find the DLL that contains this function. There should be an InprocServer32 sub-key under HKEY_CLASSES_ROOT\CLSID\dllServerClsid that contains the path to the DLL containing this function. |
| | pFunctionName | IN |
| | | The function name. The function must be exported from the DLL represented by dllServerClsid. |
| | pArgFormat | IN |
| | | A "printf" style character string that describes the arguments to follow. |
| | . . . | IN |
| | | The actual arguments used to call the function. These argument must exactly match the format specified by pArgFormat (except for Relation notify, which is passed as NULL and filled in when the function is called). |
| Example | | |
| // | App defines a C function to do an associative linear dimension. | |

-continued

```
//    The function (in JDIM.DLL) has the signature:
//          extern "C" HRESULT LinearDim(LPJLINEARDIMENSION,
//          LPJLINE,
//          LPJLINE);
LPJCOMPUTECFUNCTION pFunc = . . . . . . .
LPJDIMENSION pDim = . . . . . . .
LPJLINE pLine1 = . . . . . . . .
LPUNKNOWN pLine2 = . . . . . . . .
pFunc->SetDefinition(CLSID_JDim, // JDIM.DLL
    "LinearDim",
    "%>i%<i%<i",
    pDim, &IID_IJLinearDimension,
    pLine1, &IID_IJLine,
    pLine2, &IID_IJLine);
Return    S_OK    The operation was successful.
```

10.6. IJComputeCFunction::SetDefinitionV

IjComputeCFunction::SetDefinitionV returns a va_list version of IJComputeCFunction::SetDefinition.

The following is a description of the preferred embodiment of the formal SetDefinitionV interface:

| HRESULT SetDefinitionV | (REFCLSID dllServerClsid, LPSTR pFunctionName, LPSTR pArgFormat, va_list args); |
|---|---|
| Parameters | |
| dllServerClsid | IN |
| | The GUID used to find the DLL that contains this function. There should be an InprocServer32 sub-key under HKEY_CLASSES_ROOT\CLSID\ dllServerClsid that contains the path to the DLL containing this function. |
| pFunctionName | IN |
| | The function name. The function must be exported from the DLL represented by dllServerClsid. |
| pArgFormat | IN |
| | A "printf" style character string that describes the arguments to follow. |
| args | IN |
| | The actual arguments used to call the function. These argument must exactly match the format specified by pArgFormat (except for Relation notify, which is passed as NULL and filled in when the function is called) |
| Return    S_OK | The operation was successful. |

11. IJUndo Interface

The Undo Interface writes object modifications to a log (stream) and reads from the log to restore/revert a value. This is an optional Interface.

The following is a description of the preferred embodiment of the formal IJUndo interface:

```
interface IJUndo : IUnknown{
    HRESULT Log    (Writes to the undo stream the data associated with a
                   given interface.)
    HRESULT Revert (Reads from the undo stream the
                   data and reverts object data associated
                   with a given interface.)
}
```

11.1. IJUndo::Log

IJUndo::Log Method writes to the undo stream the data associated with a given interface. IJUndo::Log(IID, pStream) is the logging method. Given the IID of the interface slated for modification, the object saves (writes) the data associated with the given IID, including any dependent interfaces, to the provided Steam pointer, pStream->write( ).

The following is a description of the preferred embodiment of the formal Log interface:

| HRESULT Log(IID Interface, IStream* pStream) | |
|---|---|
| Parameters | |
| Interface | Input |
| | The interface ID for which all dependent data must be logged before modify. |
| pStream | Input/Output |
| | The IStream to write the undo log to. |
| Return Codes | |
| S_OK | Successful Completion. |
| E_FAIL | General Failure. |
| See Also IStream. | |

11.2. IJUndo::Revert

IJUndo::Revert reads from the undo stream the data and reverts object data associated with a given interface STDMETHOD(Revert) (THIS_IjUndo::Revert(IID, pStream) is the reloading method. Given the IID of the interface slated for Undo, the object reloads the data associated with the given IID, including any dependent interfaces, from the provided Steam pointer, pStream->read( ).

The following is a description of the preferred embodiment of the formal Revert interface:

| HRESULT Revert(IID Interface, IStream* pStream) | |
|---|---|
| Parameters | |
| Interface | Input - |
| | The interface ID associated with the data to be restored. |
| pStream | Input/Output - |
| | The stream to read the undo log from. |
| Return Codes | |
| Value | Meaning |
| S_OK | Successful Completion. |
| E_FAIL | General Failure. |
| See Also IStream. | |

12. IEnumJCHKPNT Interface

IEnumJCHKPNT Interface is an enumerator to be returned by the undo manager for selecting a checkpoint. It is supported by IJUndoManager.

The following is a description of the preferred embodiment of the formal IEnumJCHKPNT interface:

```
interface IEnumJCHKPNT: IUnknown{
    HRESULT Next     Returns the next checkpoint structure(s)
    HRESULT Skip     Skips the next count of checkpoint structures.
    HRESULT Reset    Reverts the enumerator to the first entry in the
                     list.
    HRESULT Clone    Creates a copy of the enumerator.
}
See Also IJUndoManager
```

12.1. IEnumJCHKPNT::Clone

IEnumJCHKPNT::Clone creates a copy of the enumerator.

The following is a description of the preferred embodiment of the formal Clone interface:

```
HRESULT Clone(IEnumJCHKPNT* * ppEnum)
    Parameters
        ppEnum        Output -
                        The returned enumerator copy
        Return Codes
            S_OK      Successful Completion.
            E_FAIL    General Failure.
```

12.2. IEnumJCHKPNT::Next

IEnumJCHKPNT::Next returns the next checkpoint structure(s).

The following is a description of the preferred embodiment of the formal Next interface:

```
HRESULT Next    (ULONG requestedCount, LPJCHKPNT
                returnedEntries, ULONG
                FAR * returnedCount)
    Parameters
        requestedCount  Input -
                          Number of Checkpoint structures requested
        returnedEntries Output -
                          The returned checkpoint array
        returnedCount   Output -
                          The number of checkpoints in the returned
                          array
        Return Codes
            S_OK        Successful Completion.
            E_FAIL      General Failure.
```

12.3. IEnumJCHKPNT::Reset

IEnumJCHKPNT::Reset Reverts the enumerator to the first entry in the list.

The following is a description of the preferred embodiment of the formal Reset interface:

```
HRESULT Reset()
    Return Codes   S_OK
                     Successful Completion.
                   E_FAIL
                     General Failure.
```

12.4. IEnumJCHKPNT::Skip

IEnumJCHKPNT::Skip skips the next count of checkpoint structures.

The following is a description of the preferred embodiment of the formal skip interface:

```
HRESULT Skip(ULONG requestedCount)
    Parameters
        requestedCount  Input -
                          Number of Checkpoint structures to skip
        Return Codes    S_OK
                          Successful Completion.
                        E_FAIL
                          General Failure.
```

13. IJUndoManager Interface

The Undo Manager maintains an undo log for the document. In addition it keeps the transaction checkpoints and initiates the undo and redo processing. IJUndoManager is supported by IJUndoManager The following is a description of the preferred embodiment of the formal IJUndoManager interface:

```
interface IJUndoManager : IUnknown{
    HRESULT Checkpoint          Sets a checkpoint in the undo
                                log for the next set of
                                document modifications.
    HRESULT GetUndoCheckPoints  Returns an enumerator of
                                checkpoints from the Undo Log.
    HRESULT GetRedoCheckPoints  Returns an enumerator of
                                checkpoints from the Redo Log.
    HRESULT GetCheckPointData   Returns a stream from which a
                                command may reuse data in an
                                undo log.
    HRESULT Log                 Logs a transaction to the
                                Undo Stream.
    HRESULT Undo                reverts the document to the state
                                at which the specified
                                checkpoint was logged.
    HRESULT Redo                reverses an undo to the specified
                                document state.
}
See Also IJUndo IJPersist IStream
```

13.1. IJUndoManager::Checkpoint

IJUndoManager::Checkpoint sets a checkpoint in the undo log for the next set of document modifications. The document's undo manager is informed of the beginning of a command by calling its checkpointing method, IJUndoManager::Checkpoint(LPJUSERTEXT, DWORD). The command manager (One per document makes this call at the beginning of a transaction with the name to associate with the log of the next set of changes (using Level=0). The implementation of a command may add additional checkpoints that may be selected by the user during that command. When a command has completed, only the top level checkpoints must be accessible. Any checkpoints issued to the UndoMgr without subsequent modifications to the document will not be accessible.

The following is a description of the preferred embodiment of the formal Checkpoint interface:

```
HRESULT Checkpoint(LPCWSTR pCmdName, DWORD Level)
    Parameters
        pCmdName     Input -
                       Pointer to Internationalized Command Name
                       String
        Level Input -
                       The nesting level for the checkpoint
                       (Command Mgr set to 0)
```

13.2. IJUndoManager::CheckpointData

IJUndoManager::GetCheckPointData returns a stream from which a command may reuse data in an undo log. GetCheckpointData(JChkPnt, LPStream) is to be used by commands that have explicit knowledge of the undo log written by a data entity. The purpose for providing this method is to allow a command access to data that it modified, for reuse in its processing and not maintain multiple copies of that data. As mentioned earlier, the undo log is application entity specific, therefore, the log may contain references to other storage media (such as a memory mapped files . . . ) which the entity (and command if so programmed) will know how to access.

The following is a description of the preferred embodiment of the formal CheckpointData interface:

```
HRESULT GetCheckPointData   (const LPJCHKPNT Checkpoint,
                             LPSTREAM * pStrm)
    Parameters
        Checkpoint   Input -
                         The checkpoint for which the desired undo
                         data is associated
        pStream      Output -
                         The stream containing the (logged)
                         information associated with the provided
                         checkpoint
    Return Codes
        S_OK         Successful Completion.
        E_FAIL       General Failure.
See Also IStream, JCHKPNT.
```

13.3. IJUndoManacer::GetUndoCheckpoints

IJUndoManager::GetUndoCheckPoints returns an enumerator of checkpoints from the Undo Log. A command (like the Undo command itself), gets a list of checkpoints with associated keys from the UndoMgr by calling the method IJUndoManager::GetUndoCheckPoints (LPJEnumChkPnt). The command could then use the information to either provide in a dialog to the user for the selection to undo or to access the stream at the point where that data was logged (more on IJUndoManager::GetCheckPointData( ) later).

The following is a description of the preferred embodiment of the formal GetUndoCheckpoints interface:

```
HRESULT GetUndoCheckPoints(LPENUMJCHKPNT * pChkPts)
    Parameters
        pChkpts  Output -
                     List of checkpoint for use in selecting an
                     Undo target
    Return Codes
        S_OK     Successful Completion.
        E_FAIL   General Failure.
See Also IEnumJCHKPNT, JCHKPNT
```

13.4. IJUndoManager::GetRedoCheckpoints

IJUndoManager::GetRedoCheckPoints returns an enumerator of checkpoints from the Redo Log. Same as GetUndoCheckPoints for Undoing an Undo operation (Redo).

The following is a description of the preferred embodiment of the formal GetRedoCheckpoints interface:

```
HRESULT GetRedoCheckPoints(LPENUMJCHKPNT * pChkPts)
    Parameters
        pChkPts  Output -
                     List of checkpoint for use in selecting a
                     Redo target
    Return Codes
        S_OK     Successful Completion.
        E_FAIL   General Failure.
See Also IEnumJCHKPNT, JCHKPNT
```

13.5. IJUndoManager::Log

IJUndoManager::Log logs a transaction to the Undo Stream. IJUndoMgr::log(LOGTYPE, LPIUNKNOWN, IID) is the logging method. Given the logtype and Iunknown of the modified object, the undo manager performs the log write. In processing it searches for Modify, Create, and Delete operations sorting them to eliminate any unnecessary steps (e.g. create and subsequent delete need only perform a DELETE_MARKONLY operation).

The following is a description of the preferred embodiment of the formal Log interface:

```
HRESULT Log(ULONG Type, IUnknown* pObject, REFIID interfaceID)
    Parameters
        Type     Input -      The type of modification
                              (Modify, Create , Delete) as
                              follows:
                 RELATION_MODIFIED    Write a Modify Log to the
                                      Undo Stream.
                 RELATION_INSERTED    Write a Create Log to the
                                      Undo Stream.
                 RELATION_DELETED     Write a DELETE Log to
                                      the Undo Stream.
        pObject  Input -
                     The IUnknown of the entity to be modified
                 interfaceID Input -
                     The IID of the interface to be modified on
                     the specified object (NULL for Create and
                     either IID_IUnknown or
                     IID_IJRelationValue
                     for Delete)
    Return Codes
        S_OK     Successful Completion.
        E_FAIL   General Failure.
See Also IJCompute, JCHKPNT
```

13.6. IJUndoManager::Undo

IJUndoManager::Undo Method reverts the document to the state at which the specified checkpoint was logged. IJUndoMgr::Undo(JChkPnt, LPENUMJIDREF) is the undo method. Given the checkpoint key, the undo manager performs the undo operation. In processing it searches for Modify, Create, and Delete operations sorting them to eliminate any unnecessary steps (e.g. create and subsequent delete), and performs the modify to the document in an order necessary to restore data and referential integrity. As changes are made, the UndoMgr will set the document undo stream to point to its redo pointer.

The following is a description of the preferred embodiment of the formal Undo interface:

```
HRESULT Undo  (LPJCHKPNT pChkPnt, LPENUMJIDREF*
               ppOjbectEnumerator)
    Parameters
        pChkPnt     Input -
                        The checkpoint for which the desired undo
                        should revert to
        ppOjbectEnumerator  Output -
                        The list of Modified Objects from Undo
                        Processing (for use as the select set if
                        desired)
    Return Codes
        S_OK        Successful Completion.
        E_FAIL      General Failure.
See Also IEnumJIDREF, JIDREF, JCHKPNT
```

13.7. IJUndoManager::Redo

IJUndoManager::Redo Method reverses an undo to the specified document state. IJUndoMgr::Redo(JChkPnt, LPENUMJIDREF) is the redo method. It operates just as Undo except that changes are logged to the document's redo stream.

The following is a description of the preferred embodiment of the formal Redo interface:

```
HRESULT Redo  (LPJCHKPNT pChkPnt, LPENUMJIDREF*
               ppOjbectEnumerator)
    Parameters
        pChkPnt     Input -
                        The checkpoint for which the desired redo
                        should revert to
        ppOjbectEnumerator  Output -
                        The list of Modified Objects from Redo Processing
                        (for use as the select set if desired)
    Return Codes
        S_OK        Successful Completion.
        E_FAIL      General Failure.
See Also EnumJIDREF, JIDREF, JCHKPNT
```

13.8. JCHKPNT Structure

This structure contains the checkpoint name associated with a set of document changes and a key used to identify the checkpoint in the undo log.

```
typedef struct {
    WCHAR name[CMDSTRSIZE];
    LARGE_INTEGER key;
{ JCHKPNT;
Members
    name[CMDSTRSIZE]  The name of the checkpoint
    key               The key used by the undo manager to
                      locate the beginning of the transaction
                      log to undo.
```

14. Other Interfaces

The IJMapUnknownToUnknown interface defines a hash table that maps a key to a value. In this case, the key is an IUnknown pointer, and the value is an IUnknown pointer and a ULONG flags word.

The following is a description of the preferred embodiment of the formal IJMapUnknownToUnknown interface:

```
Interface IJMapUnknownToUnknown : IUnknown {
    HRESULT GetCount(int* pCount);
    HRESULT IsEmpty( );
    HRESULT Lookup    (LPUNKNOWN key, LPUNKNOWN*
                       pValue, ULONG* pValueFlags);
    HRESULT SetAt     (LPUNKNOWN key, LPUNKNOWN
                       newValue, ULONG newFlags);
    HRESULT RemoveKey (LPUNKNOWN key);
    HRESULT RemoveAll( );
    HRESULT GetStartPosition(LPVOID* pPosition);
    HRESULT GetNextAssoc   (LPVOID* pNextPosition,
                       LPUNKNOWN* pKey,
                       LPUNKNOWN* pValue, ULONG*
                       pValueFlags);
}
```

The IEnumJRelationSemanticDesc interface defines an enumerator object for a list of relation semantic descriptor structures. This structure contains a pointer to the IUnknown interface of a relation semantic and a key that uniquely identifies the semantic. The interface pointer must be released before discarding the contents of the structure. For more information on enumerators, please refer to IEnumX in the OLE documentation.

The following is a description of the preferred embodiment of the formal IEnumJRelationSemanticDesc interface:

```
typedef struct tagRELATIONSEMANTICDESC {LPUNKNOWN
pSemantic; ULONG key;}
JRELATIONSEMANTICDESC;
Interface IEnumJRelationSemanticDesc : IUnknown {
    Next  (ULONG requestedCount, LPJRELATIONSEMANTICDESC
           returnedEntries, ULONG * returnedCount);
    Skip(ULONG requestedCount);
    Reset( );
    Clone (IEnumJRelationSemanticDesc** ppEnum);
}
```

The IEnumJIDREF interface defines the Enumerator object for the JIDREF structure. The JIDREF structure associates an object's IUnknown pointer to an interface ID and a set of bit flags. The bit flags determine the current status of the object. The IID field is used to indicate which interface (if any) was used to modify the object.

The following is a description of the preferred embodiment of the formal IEnumJRelationSemanticDesc interface:

```
Interface IEnumJIDREF : IUnknown {
    HRESULT Next   (THIS_ ULONG requestedCount, LPJIDREF
                   returnedEntries, ULONG * returnedCount);
    HRESULT Skip(THIS_ ULONG requestedCount);
    HRESULT Reset (THIS);
    HRESULT Clone (THIS_ LPENUMJIDREF* ppEnum);
}
```

For more information on enumerators, please refer to IEnumX in the OLE documentation previously cited.

The Relations subsystem provides several global functions. These functions serve three purposes: to provide access to global Relations objects, to create "helper" objects that implement Relations interfaces, and to provide common functions to interrogate the relationships between objects.

The following is a description of the preferred embodiment of the formal IEnumJRelationSemanticDesc interface:

```
::CreateStdRelationCFunction
                        (LPUNKNOWN pUnkOuter, LPUNKNOWN* ppFunc,
                        REFCLSID dllServerClsid, LPSTR
                        pFunctionName, LPSTR pArgumentFormat . . . );
::CreateStdRelationCFunctionV
                        (LPUNKNOWN pUnkOuter, LPUNKNOWN* ppFunc,
                        REFCLSID dllServerClsid, LPSTR
                        pFunctionName, LPSTR pArgumentFormat,
                        va_list args);
::ReleaseJCFUNCARGDESC (ULONG count, LPJCFUNCARGDESC pArgs);
::CreateStdRelation     (LPUNKNOWN pUnkOuter, LPUNKNOWN
                        *ppRelation);
:CreateStdRelationValue
                        (LPUNKNOWN pUnkOuter, LPJRELATIONIFDEPFUNC
                        pInterfaceDepFunc, LPJRELATIONVALUE*
                        ppValue);
::GetStdGlobalRelationManager(LPUNKNOWN* ppRelationManager);
::IsComputeInput(LPUNKNOWN, REFIID, BOOL);
::IsComputeConstrained(LPUNKNOWN, REFIID, BOOL);
::IsComputeConstrainedWith
                        (LPUNKNOWN, REFIID, LPUNKNOWN, REFIID);
::IsComputeCompatibleWithConstraints
                        (LPENUMJIDREF, LPUNKNOWN);
::IsComputeCompatibleWithLoop (LPENUMUNKNOWN, LPUNKNOWN);
::IsComputeOutput (LPUNKNOWN, REFIID, BOOL);
::IsComputeDependingOn
                        (PUNKNOWN, REFIID, LPUNKNOWN, REFIID);
::CopyJObjects          (LPENUMUNKNOWN pObjects,
                        LPJMAPUNKNOWNTOUNKNOWN pCopies);
::IsBatchCommitted( )
::BatchCommittedOn( )
::BatchCommittedOff( )
::BatchDelete(LPUNKNOWN pAnyInterface)
::BatchFlush( )
::BatchFlushOn( )
::BatchFlushOff( )
::BatchInsert(LPUNKNOWN pAnyInterface)
::BatchModify(LPUNKNOWN pAnyInterface, REFIID)
```

III. The Relations Subsystem

1. Examples of Associative Graphs in COM
2. Detailed Description of Relations
3. Detailed Description of Modify Copy Delete Machines
4. Example of the Relations Subsystem
5. Detailed Description of the Undo Feature 1. Examples of Associative Graphs in COM In the following example, names of certain interfaces are contrived where necessary.

1.1. Associative Dimension on a Line

Figure 8:
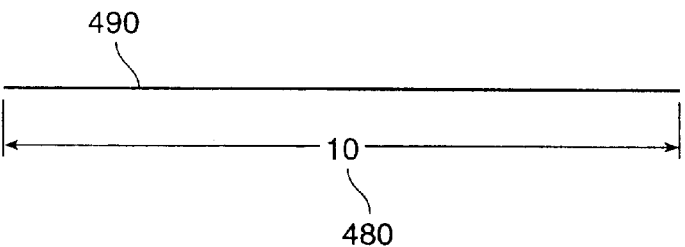
FIG. 8 illustrates two COM objects: a dimension and a line.

FIG. 8 illustrates two COM objects: a dimension and a line. The dimension 480 depends on the line 490 such that whenever the length of 490 line changes dimension 480 is re-calculated.

Figure 9:
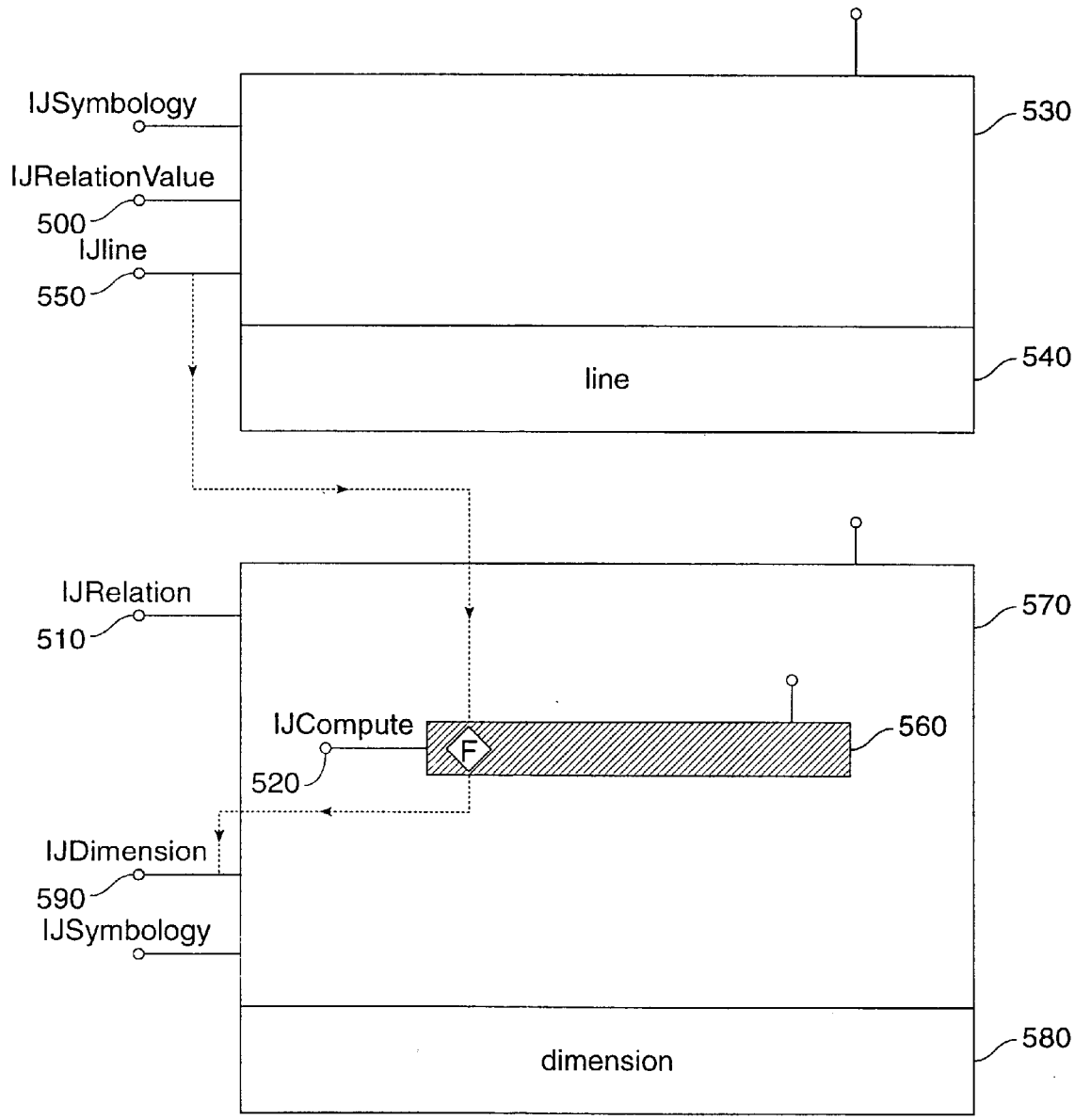
FIG. 9 illustrates a graphic representation of the COM relations for a dimension and a line of FIG. 8.

FIG. 9 illustrates a graphic representation of the COM relations for dimension 480 and line 490 of FIG. 8. IJRelationValue 500 is a COM interface that represents value nodes. IJRelation 510 is a COM interface that represents function nodes. Finally, IJCompute 520 is a COM interface that represents a single function node.

The three nodes in the associative graph are a value node 530 representing the line's geometry (identified by: line 540, IJLine 550), a function node 560 representing the evaluation function, and a value node 570 representing the output of the function: dimension value (identified by: dimension 580, IJDimension 590).

The associative evaluation function of function node 560 is called every time the IJLine interface 550 is changed. The evaluation function of function node 560 gets the line geometry via the IJLine interface 550 and sets the dimension value using the IJDimension interface 590. There can be many more interfaces on the line that can be modified without affecting the dimension. For example, the symbology interface, IJSymbology, could be changed without affecting the dimension.

1.2. Parallel Constraint Between Two Lines

Figure 10:
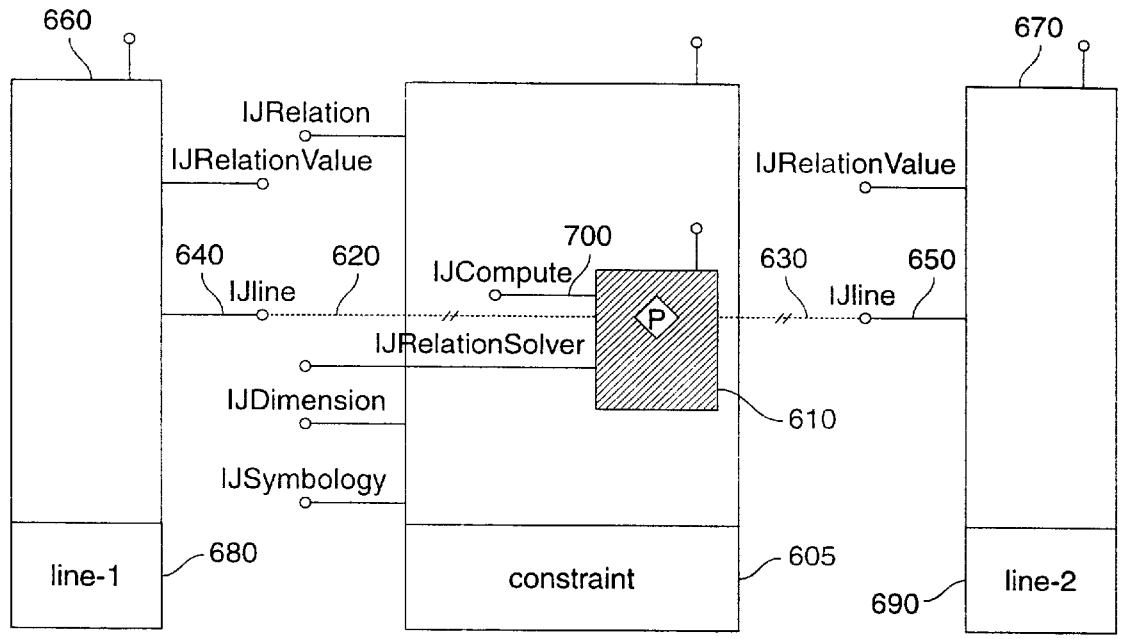
FIG. 10 illustrates a graphic representation of the COM relations for a parallel constraint.

FIG. 10 illustrates a graphic representation of the COM relations for a parallel constraint. Whenever the geometry of line-1 changes, line-2's geometry is changed to maintain the parallel constraint. Furthermore, if the geometry of line-2 changes, then line-1 geometry is also changed to maintain the parallel constraint. In this example there are no graphic handles to represent the constraint 605. A predicate evaluation function 610 has an equivalence relation 620 and 630 with the IJLine interfaces 640 and 650 of line-1 and line-2, respectively.

The associative graph contains three nodes: a value node 660 for line-1's geometry (identified by: line-1 680, IJLine 640), a value node 670 for line-2's geometry (identified by: line-2 690, IJLine 650), and a function node IJCompute 700 for the constraint.

1.3. Parallel Constraint with Graphic Handles

Figure 11:
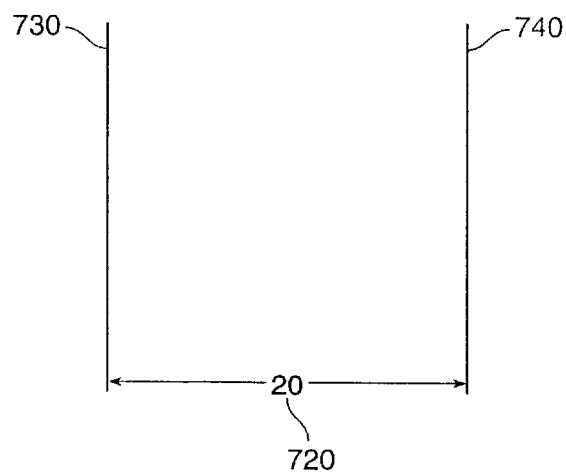
FIG. 11 illustrates two lines having a parallel constraint and a dimension having a graphic handle.

FIG. 11 illustrates two lines having a parallel constraint and a dimension having a graphic handle. As the size of dimension 720 is edited, the distance between the two parallel lines 730 and 740 is determined.

Figure 12:
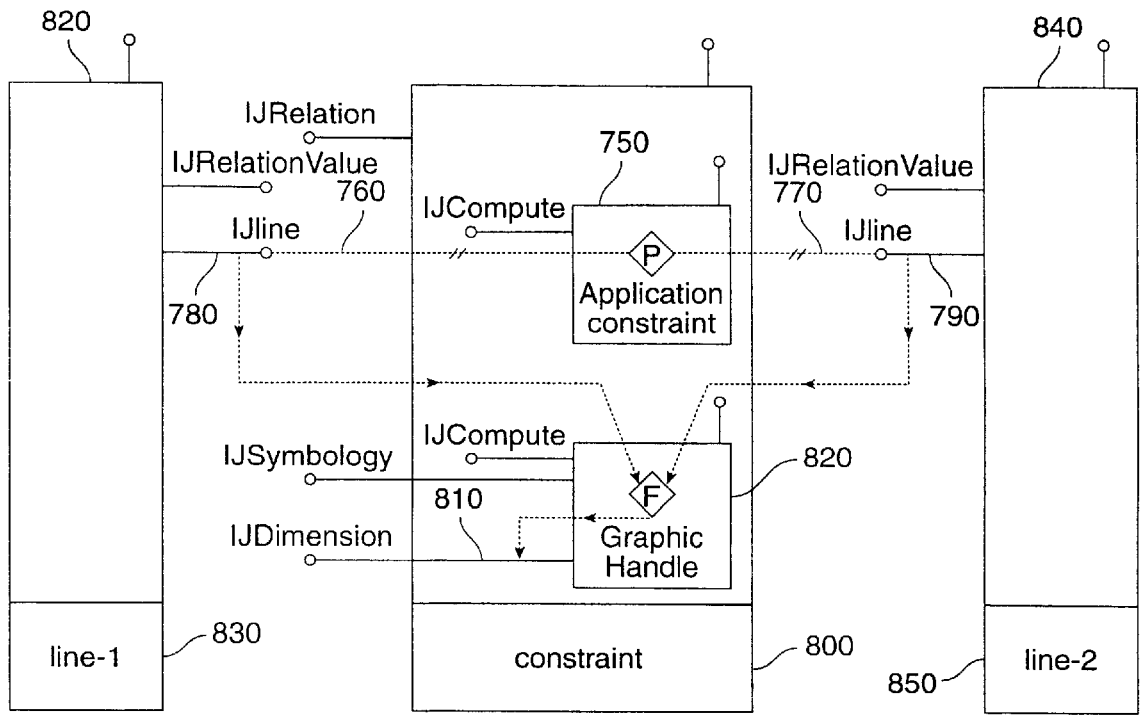
FIG. 12 illustrates a graphic representation of the COM relations of FIG. 11.

FIG. 12 illustrates a graphic representation of the COM relations of FIG. 11. A predicate evaluation function 750 has an equivalence relation 760 and 770 with the IJLine interfaces 780 and 790 of line-1 and line-2, respectively. Further, the constraint 800 encapsulates the dimension 810 that acts as a graphic handle for the end-user.

There are five nodes in the associative graph: a value node for line-1's geometry (identified by: line-1 830, IJLine 780), a value node for line-2's geometry (identified by: line-2 850, IJLine 790), a function node 750 for the parallel constraint, a function node 820 for the graphic handle, and a value node 820 for the dimension value (identified by: constraint 800, IJDimension 810).

1.4. Connector Between Two Pipes

Figure 13:
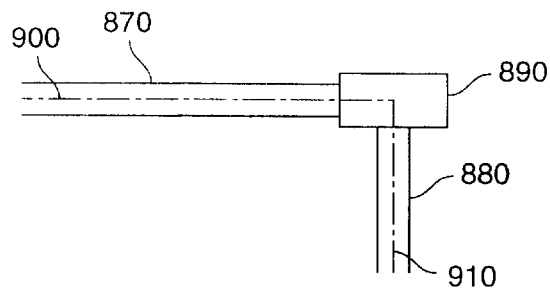
FIG. 13 illustrates an example of two pipes connected by a connector.

FIG. 13 illustrates an example of two pipes connected by a connector. Pipes 870 and 880 are represented by "multi-lines" that are each created by constructing two parallel lines to respective center-lines 900 and 910. Pipes 870 and 880 are connected by a connector 890. In this example, when the connector 890 or pipes 870 and 880 are modified: the center-lines 900 and 910 need to be kept connected and the multi-lines that represent the pipes need to be evaluated (trimmed to the proper length).

Figure 14:
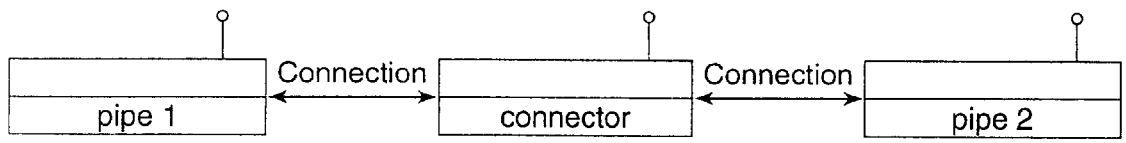
FIG. 14 illustrates a graphic representation of the COM objects of FIG. 13.

FIG. 14 illustrates a graphic representation of the COM objects of FIG. 13.

Figure 15:
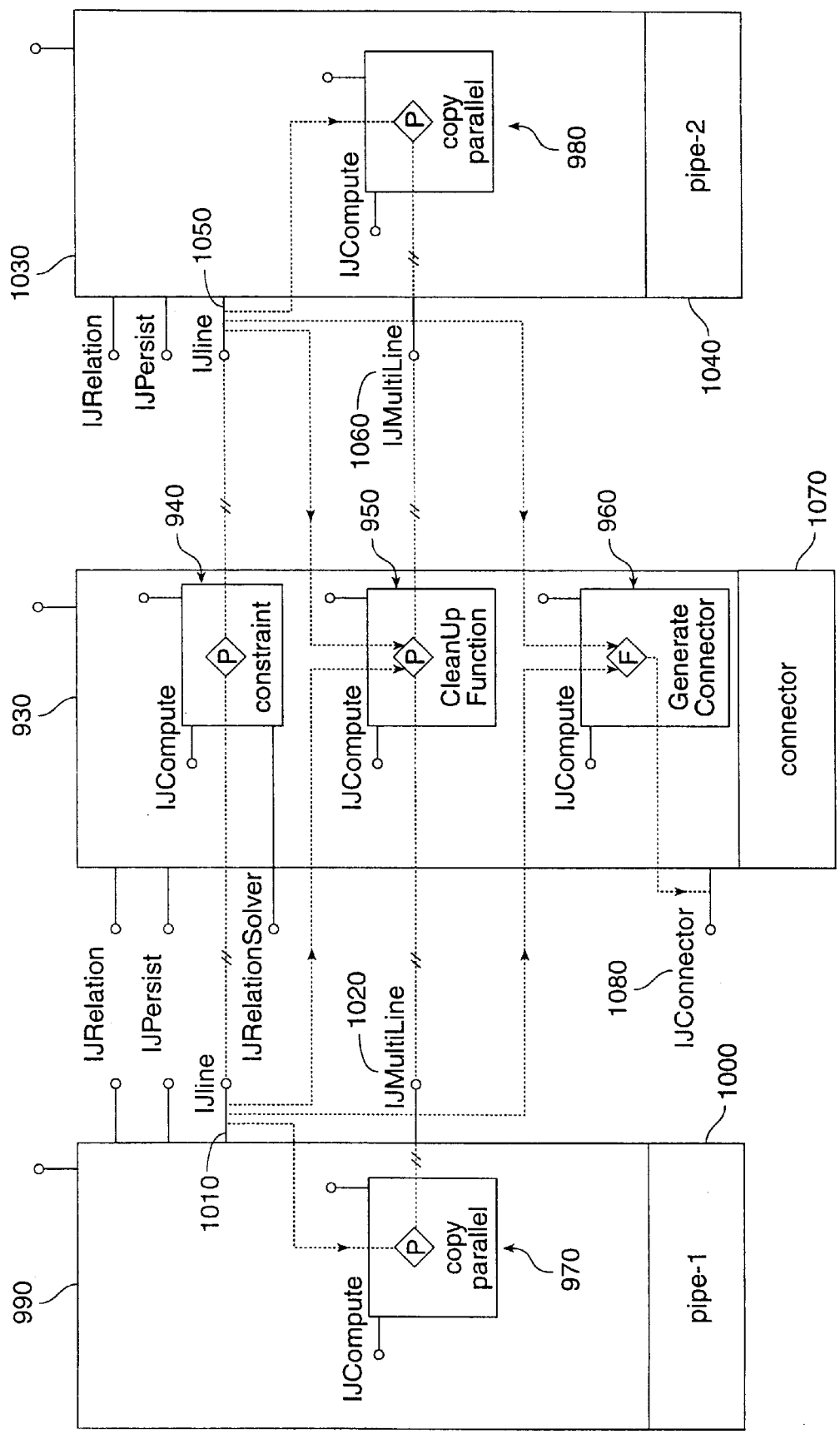
FIG. 15 illustrates a graphic representation of the COM relations of FIG. 13.

FIG. 15 illustrates a graphic representation of the COM relations of FIG. 13.

The connector 930 represents a constraint 940 to ensure that the end-point of pipe-1's center line and the begin-point of pipe-2's center line are coincident. The connector 930 represents another constraint 950 that acts as a cleanup function to trim the pipes (multi-lines) appropriately for this type of connector. The connector 930 also represents an associative function 960 that generates the connector geometry based on the center lines of the pipes.

Pipe-1 and Pipe-2 each contain a constraint 970 and 980, respectively to create their multi-lines by copying parallel the center lines. The multi-line representing each pipe is defined by two constraints: a constraint in the pipe that maintains two lines parallel to the center-line 970 and 980 (to determine the pipe thickness) and a constraint 950 in the connector 930 to do trimming.

Thus there are ten nodes in the associative graph:

1. A value node 990 for pipe-1's center-line geometry (identified by: pipe1 1000, IJLine 1010).
2. A value node 990 for pipe-1's multi-line geometry (identified by: pipe1 1000, IJMultiLine 1020).
3. A function node 990 for pipe-1's copy parallel constraint 970.
4. A value node 1030 for pipe-2's center-line geometry (identified by: pipe2 1040, IJLine 1050).
5. A value node 1030 for pipe-2's multi-line geometry (identified by: pipe2 1040, IJMultiLine 1060).
6. A function node 1030 for pipe-2's copy parallel constraint 980.
7. A function node 930 for the connector's end point constraint 940.
8. A function node 930 for the connector's trimming constraint 950.
9. A function node 930 for the connector's evaluation function 960.
10. A value node 930 for the connector's geometry (identified by: connector 1070, IJConnector 1080)

There are two constraint systems in the graph:

1. One containing the center-lines of the pipes and the connector's end-point constraint (nodes 990, 940, 1030).
2. One for the generation of the multi-lines and their trimming (nodes 970, 980, 930). Each of these "systems" would be passed to a solver independently of each other. In fact, they probably would use a different solver.

Given the above relations, the Relations subsystem manages each relation in response to a modify/copy/ or delete semantic.

2. Detailed Description of Associative Graphs in COM 2.1 The Relationship on the Value Side The only requirement for an object to participate in a relationship is that it must be able to store and enumerate the relations that it participates in. This protocol is defined by the interface IJRelationValue. IJRelationValue defines how to connect, disconnect, and enumerate relations. The actual storage of the relation is implementation specific; the IJRelationValue API deals strictly with IUnknown pointers. Values should allow definition of relations contained within a persistent or non-persistent object. In the persistent case the relation is stored using the persistid of the relation container, in the non-persistent case the relation is stored using its unknown pointer and is not written to file.

2.2. The Relationship on the Relation Side

Objects that define/store a relation have to store and enumerate the semantics that apply to the relation. This is achieved by implementing the interface IJRelation. Only the few objects that store relations and define their behavior need to implement/contain/aggregate this interface. An object can be both a relation and be used as a value by another relation. In other words, an object can support both IJRelation and IJRelationValue.

2.3. Connections

A relation contains one or more connections. A connection is represented to the external world by the IUnknown pointer of the value that the relation connects. Only this IUnknown pointer is used by API to communicate object identity.

Connections are typically stored internally using the persistid of the connected element, if this element is persistent. A connection elevates the persistid reference count of the object that it connects. When an object with relationships is deleted, the relations may or may not disconnect from the object. If any of the relations choose to keep a connection, the object will not be deleted. Instead, it will become "support only", that is, it will not be seen by the user and will be deleted when the last relation disconnects.

There are cases where more than just the persistid might be necessary to establish a connection. For example, a relation that goes across a document boundary probably needs to store a moniker. Also for relations to temporary objects which are not given a persistid, the connection will be stored by keeping the unknown pointer of the connected value. It is up to the relation implementation to allow or not such connections. The interface for adding a connection on the relation side is implementation specific; the user cannot directly access connected objects from the relation, and must go through a relation semantic. To avoid redundancy, a unique storage of the connection information could be shared by all the relation semantics.

2.4. Semantics

A relation contains several semantics that describe how the connected objects interact together. These semantics store and manage connections (i.e. the identity of the connected values):

"MCD semantics" for modify/copy/delete operations. These semantics are understood by the generic relationship management subsystem and are used by the corresponding Relations machine to ensure system wide integrity by a uniform handling of these operations.

"Application semantics". The IJRelation interface allows any semantic to be enumerated. Applications define their own semantics to control relation properties like cardinality, ordering, unicity, etc., or to apply special meaning to element connectivity. These added semantics should never conflict with the Relations semantics. Application specific commands can use these semantics for special behavior. Only the MCD semantics are discussed herein.

A MCD semantic is composed of three parts

First, PreNotification Behavior: The pre-notification of a semantic is used for the relation to close on behavior that would not be accessed during transitive closure.

When a value is selected for a MCD operation (by a batch operation or pRelationNotify->operation), it is interrogated (IJRelationValue::EnumRelations( )) for all connections/ relationships. Each relation returned in the value's relation enumerator is notified of the pending operation by sending its MCD semantic(s) a pre-notification message with the IUnknown pointer of the selected value as a parameter. The relations/semantics then have an opportunity to mark additional values as RELATION_MODIFIED, RELATION_COPIED, or RELATION_DELETED, depending on the semantic's behavioral requirements.

Second, Oriented Graph behavior: The "oriented graph behavior" of a semantic is used to search and sort the domain of interest of an MCD operation by building the "domain of interest".

The transitive closure (or catching) of elements and relations on which the operation has some impact and should be performed. When an element is selected for modification copy or delete, the relations that it participates in are asked to introduce themselves and to introduce other elements (if they wish) in the list of selected elements. Building this "domain of interest" is semantic specific: It will not be the same for a modify or a copy operation. The different MCD machines will detail later their domain of interest.

The MDC semantic defines in which order the relation's semantic should be activated to accomplish the MCD operation. A relation semantic sees its connections as oriented and presents them as input, constrained and output values. Oriented connections ensures a re-evaluation function gets triggered after the functions that evaluate its inputs. Oriented connections are a new concept for a copy or delete operation. The idea is to use this ordering to reduce conflict when handling the copy or delete, or in other words let a relation semantic define how an element that it connects to should be copied/deleted and be sure that it will not conflict with any other copy/delete semantic defined by other relations on this object.

A relation semantic can only act on a connected value that it declares as output and a value can be output of one relation only. If several relations want to influence the same value, they have to declare it "constrained, and they have to present a common referee (the constraint solver), that will be in charge of performing the operation. The constraint solver is passed the entire set of "constrained values" and "constraints" on them. The different semantics of a relation can qualify the same connection differently: For the relation R, the object A could be an input of the delete semantic, and an output of the copy semantic. For a modify operation (IJCompute semantic), independent interfaces (as verified by IJRelationValue::IsInterfaceIndependent( ) ) are viewed as if separate values, hence are allowed to be enumerated as OUTPUT by multiple Compute semantics as long as the interfaces specified in the JIDREF structures are different and independent of each other.

When the MCD operation is performed, it should be possible for some semantics to stop the operation in progress and cause the corresponding MCD machine to search and sort the domain of interest again before proceeding with the operation. (This is currently only implemented for the modify semantic).

Third, Operational behavior: This describes what should happen to the relation, or to the objects on the output side of the relation, when an MCD operation happens on any object connected to the relation. Each specific MCD machine will detail its operational behavior.

2.5. Typing Relations

Relations can be disambiguated by assigning each "kind" of relation a unique type. For example, the ownership relation would have a unique type as would the symbology relation. Once the relations connected to a value are disambiguated, an application can unambiguously retrieve a relation by type. The connected relations can also be hashed on type to provide efficient access.

A relations type is optional and is never interpreted by the Relations engine itself. Relations participate in the modify/ copy/delete operations by the semantics that they enumerate. A relation's type is there to give the relation user a fast and reliable way to access connected objects.

2.5.1. Assigning Type to A Relation

Relation types are defined by GUIDS. Note that this type is independent of the interfaces supported by the relation container: The symbology bundle, obtained by IJRelationValue::GetRelation(&pRel, SYMYPE) could support IJOwner.

The two following member functions of IJRelation deal with typing:

```
HRESULT IJRelation::GetType(LPGUID pType);
HRESULT IJRelation::SetType(LPGUID pType);
The person(s) responsible for creating a relation would:
        define a GUID for that relation type. For example:
        "extern GUID OwnerRelationType;".
        return that GUID from IJRelation::GetType and/or set the
        type with IJRelation::SetType.
```

Note that SetType is mainly for use by the standard relation helper object. A relation can only support one type. An implementor of IJRelation can choose to "hard code" the relation type and return an error from SetType. SetType can only be called once per relation. The Relations subsystem will define a generic relation type: StdRelationType. It should be returned from GetType if no one has called SetType.

2.5.2. Finding A Relation by Type

The following function of IJRelationValue is used to retrieve a relation by type:

HRESULT IJRelationValue::GetRelation (LPUNKNOWN* ppRelation, LPGUID pType);

EnumRelations also takes an optional GUID. If the GUID is not NULL, then only relations of the specified type should be enumerated.

HRESULT IJRelationValue::EnumRelations (LPUNKNOWN* ppRelation, LPGUID pType);

If more than one relation connected to the value has the same type, GetRelation should return the first relation and the return code RELATION_S_DUPLICATETYPE. All duplicates can be found with IJRelationValue::EnumRelations.

2.5.3. Making A Value Non-Dependent on the Implementation

Since the physical location of a relation is arbitrary with respect to its enumerated values (i.e. it can be contained in a separate object), obtaining a relation from a value does not always guarantee access to the desired object. For example, there could be an implementation of the ownership model where the owner relation was not contained in the owner. In this case more work has to be done to get the owner.

In such a case information based on relation type is implied. For example, if it is assumed that a relation of type, OwnerRelationType, will always be contained in the owner itself, the owner relation can be retrieved via IJRelationValue::GetRelation(&pOwner, &OwnerRelationType). In other words, the relation type is a contract, if the owner relation were not contained in the owner, the relation would have a different type 2.6. How the Relation Management Subsystem is Made Aware of Element Deletion/Insertion/Copy for Recompute The different associative machines are not totally independent the one from the other. When inserting an element in an owner, or when deleting one of its members, the owner itself is modified, hence its dependents in the recompute sense should be re-evaluated. That is, for example, how a "display manager" hooked to the owner interface of a group that is displays, is aware of elements to display/erase. This is achieved as follow:

2.6.1. Recompute When an Element Gets Deleted

When an element is deleted by the user, or marked deleted by the delete machine BatchDelete( ) (by the command) or pRelationNotify->Delete( ) (by a semantic) is called. It causes a call to PrevalueDelete(deleted_obj, pRelationNotify) for connected relations' delete semantics.

The implementation of this function tells the MCD machine that one its interfaces will be modified because of this deletion. This is done by calling pRelationNotify->Modify(This,output intf). By doing this, recompute semantics that are directly connected, as well as those that are transitively connected, can be prenotified.

In this way the notification going down the dependency graph goes up the dependency tree. When getting the PreValueModify message, the dependent could determine by walking the stack (enumerator) of JIDREFs passed as argument, if the element that initiates the notification is modified inserted or deleted.

The delete machine then complete (close on) the delete operation.

It is then up to the compute machine to complete the recompute operation. When by the compute machine, the display manager for example could redisplay invalidated regions. Since deleted elements got disconnected from their owner, and the regions' redisplays go down the owner tree, deleted elements will not get redisplayed.

2.6.2. Recompute When an Element Gets Copied

Copying an element is similar to the insertion of a new element. Hence after the copy is performed this is the responsibility of the command to notify the Relations Machine of the copy by using BatchInsert(Clone). This will retrigger an evaluation of the recompute semantic of the relations connected to that clone. As above in the delete case, it will walk up the ownership graph and owner listener will get an Evaluate call as part of this recompute.

3. The MCD Machines 3.1. The Recompute Machine (Modify)

3.1.1. Transitive Closure

Transitive closure is the term used to describe the process of searching the associative graph for all nodes that need to be recomputed and sorting them (if necessary) into the correct order for recompute. Searching the associative graph is also called "catching" the graph. This search is typically instigated by the Relations subsystem when an element with an associative relationship is modified or deleted. After a modification or delete, related nodes must be re-evaluated to reflect the current status of their relationship. It is transitive because nodes that are not directly related (i.e. they are transitively related) are involved in the search.

The catch of a graph always starts with a set of modified value nodes (represented by COM identity and interface id (IID)). These value nodes are gathered by the batch or by some application command. The Relations subsystem defines a set of interfaces that are used to find and sort the remaining nodes of the graph. The interfaces of primary interest, that will be explained further below, are:

IJRelationValue: an interface supported by COM objects that want to represent one or more value nodes.

IJRelation: an interface supported by COM objects that want to represent one or more function nodes.

IJCompute: an interface supported by each function node.

Figure 16:
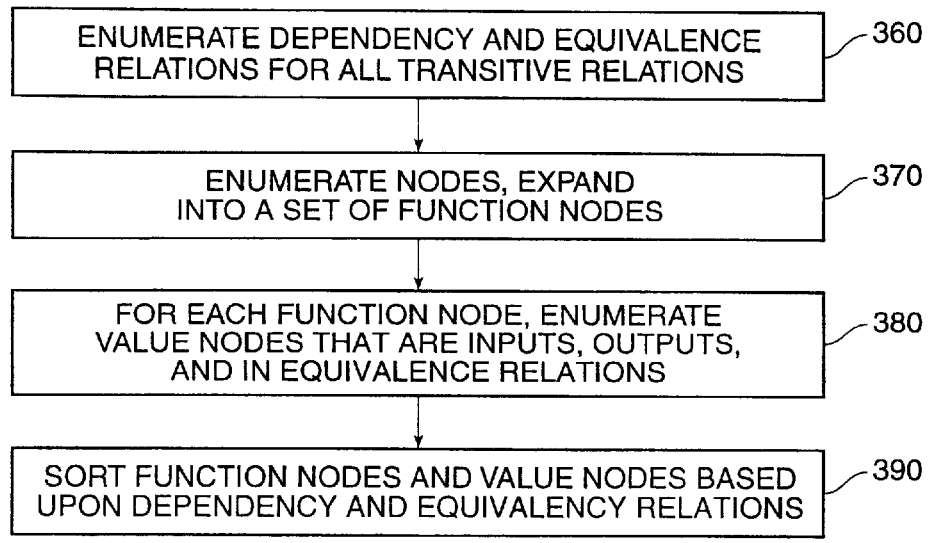
FIG. 16 illustrates a flow diagram of one embodiment of the process of searching the associative graph for all nodes that need to be recomputed and sorting them into the correct order for recompute.

FIG. 16 illustrates a flow diagram of one embodiment of the process of searching the associative graph for all nodes that need to be recomputed and sorting them into the correct order for recompute. The steps include:

Enumerate dependency. Using IJRelationValue, ask each COM object representing one of the original modified value nodes for the list of COM objects connected to it by a dependency relation or an equivalence relation, step 360. Repeat this process until all transitive relations are found.

Enumerate nodes. Using IJRelation, expand each of the COM objects above into a set of function nodes, step 370.

Enumerate values. Using IJCompute, ask each function node for the value nodes it outputs, the value nodes it depends upon or the value nodes it is in an equivalence relation with. The result is a list containing the COM identity, interface id and status of all value nodes related to each function node, step 380. The status describes whether or not a value is an output, an input, or is constrained.

Sort. The function nodes and related value nodes are sorted with respect to the found relationship: Parents are "less than" children and predicates are "equal to" each other, step 390. (See the simple Example section earlier.)

After Closure, the nodes are then ready for evaluation.

3.1.2. Recompute of Associative Function Nodes

Associative function nodes are evaluated by calling the function Evaluate on the IJCompute interface. This function is responsible for reading any input value nodes and updating any output value nodes.

3.1.2.1. Related Value Nodes

Associative function nodes must implement a function on IJCompute to enumerate all values related to the node. Each value is given a status as an input or output.

Input values represent parents of dependency relations, and they are read from during evaluation using COM interfaces. Output values represent children of dependency relations, and they are written to during evaluation using COM interfaces.

3.1.2.2. Return Codes

The function on IJCompute that is used to evaluate associative functions should return a special return code in the following cases: an evaluation failure; an evaluation does not change the value of the output nodes; and an evaluation function changed the associative graph. If any of these errors occur, typically the graph needs to be searched and sorted again.

3.1.2.3. Batch Notification

The batch is passed into the evaluation function on IJCompute. The batch should be notified during evaluation before an output value is changed.

3.1.3. Recompute of Predicate Nodes

Predicate nodes and their related value nodes are passed to a solver for recomputation. The solver is responsible for updating the value nodes related by the predicates until all predicates are satisfied. The solver communicates with predicate nodes via an application defined interface. This interface represents the semantics specific to a particular solver. For instance, an interface to the D-Cubed solver.

3.1.3.1. Related Value Nodes

Predicate nodes must implement a function on IJCompute to enumerate all values related to the node. Each value is given a status of an input or constrained.

Input values represent parents of dependency relations. The solver can only read from these values using COM interfaces. Constrained values represent equivalence relations. The solver reads from and/or writes to these values using COM interfaces. A set of constrained values is chosen for writing such that a set of predicates is satisfied. This solver can choose different techniques for satisfying a set of predicates:

- If all predicates on a value node can be seen as accessing independent information, the value node can be independently modified. For example, a begin point and an end point are two independent interfaces on a line; the begin and end points of a line are independent.
- Solve of all the predicates like a system of simultaneous equations. For example Endpoint, BeginPoint, Length are three inter-dependent interfaces of a line that should be solved simultaneously (the length of a line affects the begin and/or end point).

3.1.3.2. Return Codes

The evaluation function on IJCompute is not called for predicate nodes. For Predicate nodes, the solve method that is defined in the IJRelationSolver interface is called. If the predicate node cannot be satisfied, the solver will return E_Fail; if the predicate node can be satisfied, the solver will return S_OK. Other return codes are possible and are discussed in further detail in section II.

3.1.3.3. Batch Notification

The batch is passed into the solver. The solver should notify the batch before it updates any value nodes.

3.1.4. Information Held During Recompute

This section describes the types of data stored and manipulated by the Relations subsystem during recompute. This information is stored as a status in the graph during recompute.

3.1.4.1. Status Information

For graph triggering and incremental graph:

The nodes indicate whether they change value or not when the evaluation function is recomputed. The graph can be pruned during recompute if a node does not change value.

When a dependent node recomputes, it should be able to access the recompute state of its parent.

3.1.4.2. Error Management

The nodes indicate if their re-evaluation fails. There are several possible means of failure:

The evaluation function stored with the node fails to recompute. This is detected by the returned HRESULT.

A solver failed to satisfy a predicate.

The node is in error because one of its parents is in error. This means that a node of the associative graph should be able to retrieve the state of its parents when it recomputes. Even though there may be an error, In the preferred embodiment recompute is still sent to the dependent node even if one of their parent's is in error. In such a situation, the dependent decides its own error state rather the recompute engine setting it on behalf of the dependent.

In addition to the temporary error status stored in the graph, error information must be persistent. Applications need to be able to control if an element is in error, and to find all the elements that are in error.

In the preferred embodiment, the entire COM object turns to error when one of its node fails to recompute, although it means that some granularity information will be lost when saving this error state. That is, after saving the error at the COM level, all of the nodes that the COM object generate will also appear in error for next recompute.

To address this granularity issue, the application could perform some interactive and automatic handling of nodes in error, by asking the end-user to fix the problems that occurred during last recompute. For example this could be done by:

having a list for the elements in error that will be built up when the element turns to error.

using an "error manager listener" that is called to handle the error list in a way similar to batch listeners that are notified when elements are modified.

3.2. The Copy Machine

The copy machine is used by commands when they want to copy elements. The copy machine is not part of the batch mechanism and is never triggered automatically.

The result of a copy operation must be self-sufficient: It must have enough context information to stand alone. For example, when copying elements to the clipboard, one cannot predict where the results will be pasted. It could be to some external container like Word. In this case, the copied elements should include a document object. Our worst case for copy is the EMS™ "file fence command" where the only way to be sure enough context information was copied meant copying the entire document then deleting the elements that were not supposed to be copied.

Figure 17:
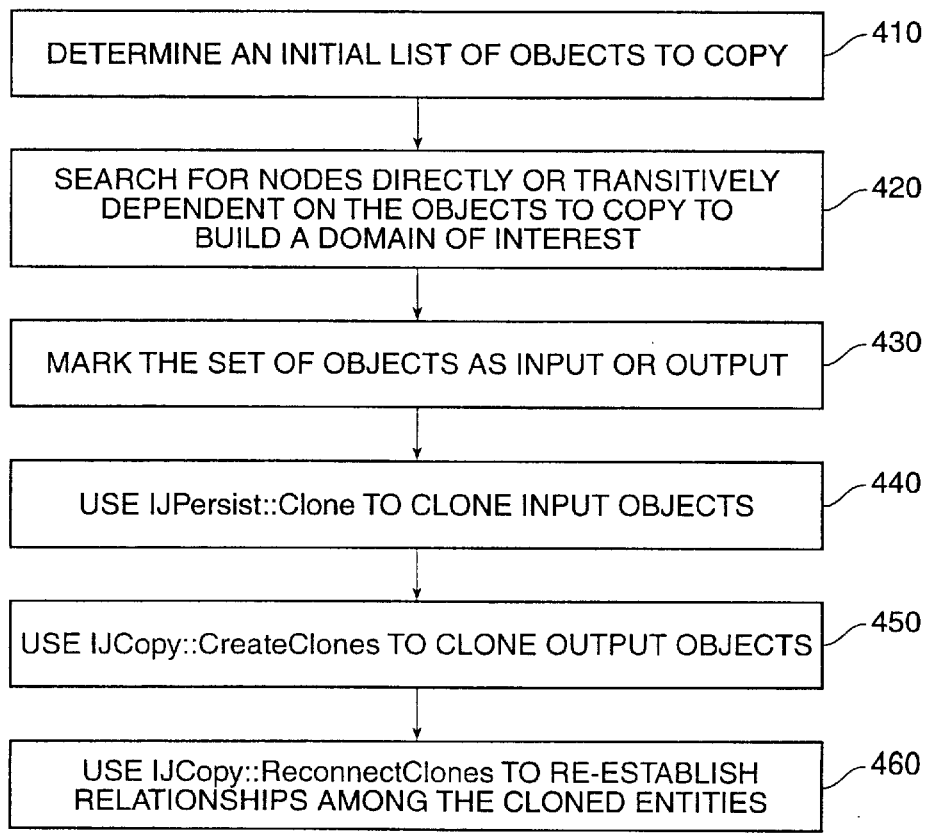
FIG. 17 illustrates a flow diagram of one embodiment of the process of copying objects.

FIG. 17 illustrates a flow diagram of one embodiment of the process of copying objects. The steps include:

1. Starting from an initial list of objects to copy, step 410, (for example, the select set defined by the user), scan all relationships for their copy semantics to build a set of objects to participate in the copy operation, step 420. This is called getting the domain of interest, step. (Also known as the "catching" the graph).
2. Mark the set of objects to be copied, step 430.
3. Clone any objects that are input only using IjPersist::Clone, step 440.
4. Objects that are marked as output of a copy semantic are cloned by the copy semantic that declares the output using IJCopy::CreateClones, step 450.
5. All of the objects cloned are assigned persist IDs (if the original object had a persist ID).

6. The relationships between the clones are re-established using IJCopy::ReconnectClones, step 460.

3.2.1. Extend the Set of Elements Selected for Copy.

When a command copies elements, the first step is to use the CopyJObjects( ) global function to indicate which elements are operated on. Other elements will then be selected simultaneously for copy because of existing relationships. For the MCD machine, this is very similar to the other elements being selected directly by the command.

When an element is selected for copy, and if the element was not previously selected (marked RELATION_ COPIED), the copy semantics (contained by relations that the element is connected to) receive a message. These semantics can then decide to select other values for copy, by calling pRelationNotify->Copy(OtherElem). This marks OtherElem RELATION_COPIED.

This copy process is transitive on elements newly marked RELATION_COPIED by calling recursively the PreValue-Copy function of copy semantics of relations that they are connected to. Since the RELATION_COPIED bit is not set on the objects returned from IJCopy::EnumValues, a copy semantic can distinguish between these elements and the ones selected by the user or added via IJCopy::PreValue-Copy.

3.2.2. Search and Sort the Domain of Interest

The aim of this step is to build a self sufficient set of elements, even if the elements have not been selected for copy, and to order the copy semantics of their relations. It is not desirable to capture the entire document. For example if a symbology bundle enumerates all the objects using that symbology, this will end up getting the entire document in the "domain of interest" and it defeats the goal.

An OUTPUT means that the modify/copy/delete action of the semantic will redefine this element. Thus an element can only be output of a single semantic for each type of MCD action.

An INPUT means that the MCD action of the semantic needs to access this element in order to implement the action and give a value to the OUTPUT.

Building the domain of interest with transitive outputs applies correctly for the Compute machine. It is however difficult to apply in the copy and delete machines. For example, a symbology bundle is declared input argument of the relation: bundle→graphic object. In order to implement copy correctly, the domain of interest must contain:

the relation between the symbology bundle and the symbology manager;

the relation between the symbology manager and the document;

the symbology manager;

and the document.

In addition to the qualification RELATION_INPUT/ RELATION_OUTPUT, a semantic can qualify the connected argument as NO_TRANSITIVE_EXPANSION.

The copy and delete engine will visit transitively all enumerated values that are not qualified NO_TRANSITIVE_EXPANSION. By visiting transitively, it means adding in the domain of interest, the relations that this value contains (IJRelation interface) plus the relation this value participates to (IJRelationValue interface).

As an optimization, a semantic may not enumerate its input arguments. It must then return from the EnumValues function, the return code RELATION_S_IMPLICIT_VALUES (The symbology bundle does not enumerate the graphic objects using it). This is very similar to enumerate arguments and qualify them as RELATION_INPUT¦NOT_ TRANSITIVE_EXPANSION. Any value that is for other reasons in the domain of interest and enumerates the relation will then be considered as one of its input arguments and passed accordingly to the CreateClone/ReconnectClone function.

Searching and sorting of the domain is done by starting with an initial set of values (objects) to be copied (CopyJObjects arguments+the expansion done by PreValueCopy). The initial set is represented by the value array $\{V_{init}\}$, containing IUnknown pointers. Each of its elements is marked RELATION_COPIED.

Next, find any additional objects part of the domain of interest when copying the initial set, and find the relations between all these elements. (These elements are not marked RELATION_COPIED.) This is achieved by:

Each object enumerating the relations it is connected to by IJRelationValue::EnumRelations. These relations are accumulated in the relation array $\{R\}$.

If the object itself contains a relation, this relation is also added to $\{R\}$.

Each relation copy semantic enumerates the objects (IJCopy::EnumValues) that participate in the copy operation and qualifies them as INPUT, OUTPUT, plus the optional qualifier: NO_TRANSITIVE_EXPANSION and optionally returns RELATION_S_ IMPLICIT_VALUES.

This process is then repeated until no more objects/ relations are added. The result is a set of values/relations to be copied: $\{V_{init}\}$==>(Copy Semantics)==>$\{V_{closure}, R_{closure}\}$ Next, the values and relations are ordered in such a way that a relation that declares a value as output is listed before a relation that takes it as input.

3.2.3. Clone the Elements

The objective in this step to establish a "clone graph" from the "original graph" gathered in the step above. Each object in the original graph will have a representative in the clone graph. This representative is context dependent (i.e. depends on the intent of the copy command (copying from a symbol library into a document is different than copying to the clipboard). The representative can be:

the original object itself, a clone of the original, an element selected by the user, etc.

As a result of the ordering done above, when asked to copy, each copy semantic has in hand the information it needs about its target context, because its input values will already be represented in the clone graph.

The distinction between elements initially selected, or just in the domain of interest can be made by looking at the RELATION_COPIED state. Only elements of the first kind have this status. By testing it, it allows the IJCopy::Create-Clones function to behave differently as exemplified by the copy semantic of owner relation, and copy semantic of the symbology manager.

Any objects not declared as output or constrained gets its representative in the clone graph from either: the copy command itself, or the copy machine. The copy command can clone the element using IjPersist::Clone or choose another representative such as an existing object or user selected object. The copy machine will clone the object via IJPersist:: Clone if the object is not marked RELATION_ OUTPUT (i.e. no semantic is responsible for producing the clone), or if the object has not been cloned already by the command.

Each copy semantic, is then asked to produce a representative for its output values. The semantic could: Clone the output by IjPersist::Clone; Use the original element as the representative in the clone graph; Produce/retrieve an output using the clones of its inputs; or Produce NO output. (The corresponding element will be represented as NULL in the clone graph.

This step will not define the persistid of elements in the clone graph.

3.2.4. Assign Persistent Identity to the Clones

Only after all the elements have been copied, the elements in the clone graph get a persistid as follows. First, for at least one object, the document clone gets a persistid during clone, then for all the other objects, if the original does not have a persistid, or if the clone already has a persistid, do nothing. If the original has a persistid, the following steps are performed: find the persist manager of the original; find the clone of the persist manager; use the persist manager clone to give the element clone a persistid.

3.2.5. Establish Connections in the Clone Graph

The intent of this step is to complete the copy action by connecting all "new" clone objects to their relations in the target environment.

This is done by asking each original relation in the clone graph to establish connections for its clone in the target environment. (All clone objects now have a persistid if the original object did.) Each copy semantic is asked to reestablish connection by IJCopy::Reconnect. The relation reconnects by using the clone map to identify its clone and the clones of its connected values.

At this point, the behavior is relation specific. The copy semantic may use public or private interfaces to accomplish its task. At some point in the process, it must tell the values to reconnect by sending them IJRelationValue::ConnectRelation(R punk) (except for the values in the same object if any and object that are already connected).

Since every relation and value in the clone graph at this point has a clone and the clone could be an already existing object or a newly created one depending on the context of the MCD operation, the semantic must check if its connected values' clones are connected, if not, make the connection.

3.3. The Delete Machine

The Delete machine is activated by a command when it calls BatchDelete(elem), hence the batch activates the delete machine. The extension of the set of elements for delete and the searching and sorting of the domain of interest is similar to what was described for the copy engine. The goal of the delete engine is to close on a delete operation such that the objects that are selected for delete are removed from the document and that referential integrity is maintained. Objects that rely an object marked for delete, must either be deleted or the marked object must remain as a support object (non-viewable, non-locatable) until the application can resolve the reference (maybe provide an alternate connection).

Figure 18:
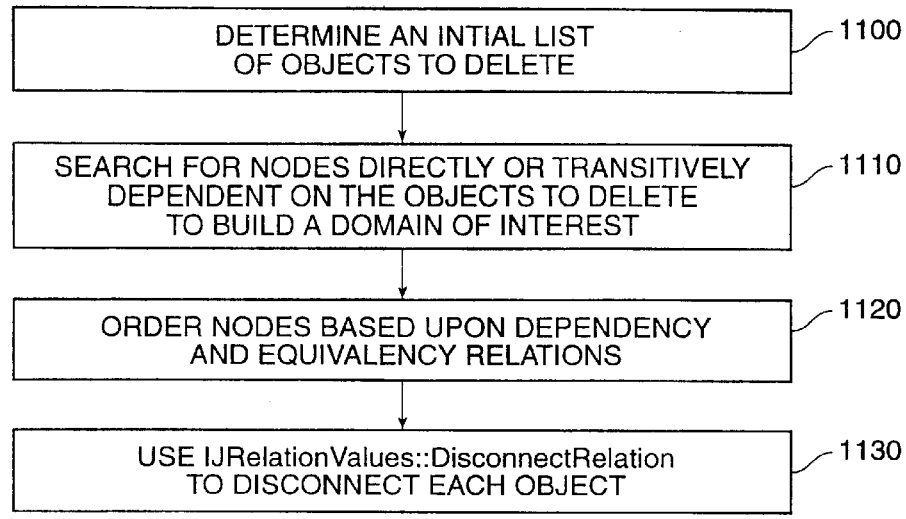
FIG. 18 illustrates a flow diagram of one embodiment of the process of the deleting process.

FIG. 18 illustrates a flow diagram of one embodiment of the process of the deleting process.

3.3.1. Extend the Set of Elements Selected for Delete

When a semantic gets PreValueDelete message because one of its connected values has been selected for delete by a call to BatchDelete(elem), the function decides to extend the deletion to other arguments of the semantic by calling RelationNotify->Delete(otherObj), step 1100. This occurs recursively if the other objects participates with other relations. All the elements are marked RELATION_DELETED.

3.3.2. Search and Sort the Domain of Interest

Next, the domain of interest is searched and sorted, step 1110, in a way similar to the search and sort of the copy engine. First, all values enumerated by a semantic are visited transitively if not specified NO_TRANSITIVE_EXPANSION. Next, if a semantic's EnumValues function returns RELATION_S_IMPLICIT_VALUES, all the values in the domain of interest that enumerate this relation as a connected relation will be considered as INPUT argument of the semantic and passed accordingly to its disconnect function.

Elements introduced by EnumValues are not marked RELATION_DELETED. Hence delete semantics can distinguish between elements that are part of the initial selection and PreValueDelete from elements introduced as part of EnumValues.

The search and sort is implemented as follows: Starting with an initial set of objects to be deleted, defined by BatchDelete( ) and its expansion performed as 3.2.1. The initial set is represented by an array of IUnknown pointers, $\{V_{init}\}$. These objects are already marked RELATION_DELETED.

Next, find the relations on these elements: each object enumerates the relations it is connected to by IJRelationValue::EnumRelations. These relations are accumulated in the relation array $\{R\}$, and if the object itself contains a relation, this relation is added to the same array; then each relation will then be asked to enumerate its related objects (IJDelete::EnumValues). This process is repeated until no more objects/relations are added. The result is a set of values/relations to be deleted/disconnected.: $\{V_{init}\}$==>$\{$Delete Semantics$\}$==>$\{V_{closure}, R_{closure}\}$ Next, order the values and relations in such a way that a relation that declares a value as output is listed before a relation that takes it as input, step 1120.

3.3.3. Disconnect

This stage involves telling the affected relations to take whatever action is appropriate for any related object marked as deleted, step 1130. As previously mentioned the object may not actually be disconnected from all its relationships, but becomes support only, this decision being made by the delete semantics. After testing the RELATION_DELETE state of its inputs/output, each delete semantic can: disconnect from its input/output by IJRelationValue::Disconnect Relation or keep the connection, the input becoming support only; and mark its output deleted, or transform it. (This could require a recompute of the dependency that will be accumulated by the batch for future handling.)

It should be noted that an element disappears for the user (becomes support only) when it is selected for delete because the semantic of its owner disconnects unconditionally from elements marked RELATION_DELETED

3.3.4. Release Last OID Reference Count

This only applies to persistent objects, step i.e. objects for which the following calls succeed:

GetPersistManager(pObject, &pPersistMgr); and
pPersistMgr->GetPersistID(pObject&Oid, NULL).

When an element has been initially made persistent by calling MakeObjectPersistent( ), its oid reference count has been set to 1. Each time another objects connected to it, its oid reference count has been elevated when the relation was established and stored as a persistid.

If after calling all the delete semantics of the relations that an object participates, its oid ref count is back to one, it means that nobody cares any longer about this object. It could be removed from the control of the Persist Manager by releasing this last oid ref count. The object will not be permanent any longer and will be physically destructed when its COM ref count goes to 0.

If the object still has an elevated OID, some relations did not disconnect from it, therefore, it is still known to the PM and becomes a "support only element" (i.e. not existent from the user's point of view) if disconnected from its owner.

4. Example of the Relations Subsystem

Figure 19:
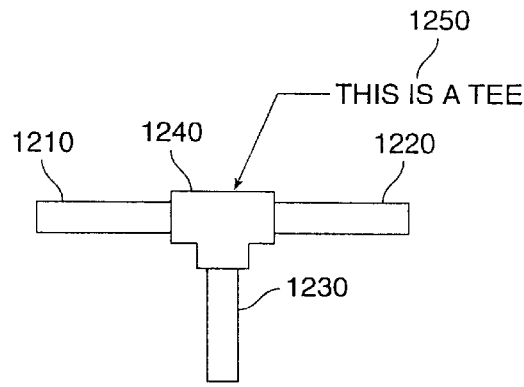
FIG. 19 illustrates three pipes connected to a tee connector in a constraint relationship.

The Relationship Subsystem is responsible for ensuring that the integrity of the data model is maintained during the manipulation of objects that are related. This section provides a description of the steps that are taken to create relationships between objects, and the steps taken when these relations and objects are modified, copied or deleted via examples 4.1. Creating Relationships FIG. 19 illustrates three pipes 1210, 1220, and 1230 are connected to a tee connector 1024 in a constraint relationship. This means that when pipe 1230 moves, the tee 1240 must also move, and if tee 1240 moves, pipe 1230 must also move. One additional relation depicted in FIG. 19 is the dependent relation between tee 1240 and the callout text object 1250. In this relation, if tee 1240 is moved, then the call out 1250 will stay connected to tee 1240; however, if call out text 1250 is moved tee 1240 will not be moved.

4.1.1. Establishing the Pines to the Tee Constraint Relation

The first step is establishing the pipes to the tee constraint relation. This is done by the following steps:

1. Obtain a IUnknown pointer to the pipe objects 1210, 1220, and 1230 and tee 1240.

2. The command will create a Tee Connector semantic object. This semantic object will implement the IJCompute, IJCopy, and IJDelete interfaces. The implementation of these interfaces will be described below.

3. Give the IUnknown pointers obtained in step 1 and the associated interface IID's to the compute semantic object. The interface IID for the pipes is the IID__IJPipeEndPoint and the IID for the Tee is IID__IJTeeConnector.

4. Create the relation object and obtain IUnknown pointer to the relation.

5. Obtain the IJRelation interface for the Relation object.

6. Add the semantic to the relation object by calling IJRelation::AddSemantics and passing in the IUnknown pointer to the semantic object.

The relation then:

keeps the persistent id of the semantic;

obtains the IJRelationValue interface of the three pipes 1210, 1220, and 1230 and tee object 1240 gives the relation values a pointer to itself by calling their ConnectRelation methods; and release each IJRelationValue interface.

7. Call::BatchInsert( ) for any new values the command created and subsequently call ::BatchFlush( ). For this example, the relation object connecting the tee to the pipes is added to the batch by calling ::BatchInsert and passing in the IUnknown pointer to the relation object.

8. The relation manager then builds and sorts a graph of the newly inserted values guaranteeing that values are stable and the data model intact. The building of the graph is done by performing the following steps for each value IUnknown pointer:

obtain a pointer to the IJRelationValue interface.

enumerate relations that the value is connected to by calling IJRelationValue::EnumRelations.

for each IJRelation interface in the enumerator, enumerate semantics by calling IJRelation::EnumSemantics.

for each compute semantic call the IJCompute::Enum-Values method, and determine if the value is an input to the semantic.

if the value is an input to the semantic, add all values to the graph and repeat these steps on all subsequently added values.

The graph is then sorted by determining by connection type an order as follows:

Inputs (or Parents)<(before) Outputs (or Children)

Constrained (or equivalence) are equal in order

Each semantic that has an output in the graph is then evaluated.

9. The command then releases the following pointers:

IUnknown pointers to the pipe objects 1210, 1220, and 1230 and the tee 1240.

IJRelation interface.

The IUnknown pointer to the relation object.

The IUnknown pointer to the semantic object.

4.1.2. Establish the Dependency Relation Between the Tee and the Call Out Text Object The next step is establishing the dependency relation between Tee 1240 and the call out text object 1250. The text is dependent upon the tee. This is done by the following steps:

1. Obtain a IUnknown pointer to the tee 1240 and the text object 1250.

2. The command will create a Text with Leader Line compute semantic object. This semantic object will implement the IJCompute, IJCopy, and IJDelete interfaces. The implementation of these interfaces will be described below.

3. Give the IUnknown pointers obtained in step 1 and the IID__IJTeeConnector interface IID for the Tee 1240 and the IID__IJText interface for the text object 1250.

4. Create the relation object and obtain IUnknown pointer to the relation.

5. Obtain the IJRelation interface for the Relation object.

6. Add the semantic to the relation object by calling IJRelation::AddSemantics and passing in the IUnknown pointer to the semantic object. The relation then keeps the persistent id of the semantic obtains the IJRelationValue interface of the three pipes 1210, 1220, and 1230 and tee objects 1240.

gives the relation values a pointer to itself by calling their ConnectRelation methods.

releases each IJRelationValue interface.

7. Call ::BatchInsert( ) for any new values the command created such as the text object and subsequently call ::BatchFlush( ).

8. The relation manager will then build and sort a graph of the newly inserted values guaranteeing that values are stable and the data model intact. The building of the graph is done by performing the following steps for each value IUnknown pointer:

obtain a pointer to the IJRelationValue interface.

enumerate relations that the value is connected to by calling IJRelationValue::EnumRelations.

for each IJRelation interface in the enumerator, enumerate semantics by calling IJRelation::EnumSemantics.

for each compute semantic call the IJCompute::Enum-Values method, and determine if the value is an input to the semantic.

if the value is an input to the semantic, add all values to the graph and repeat these steps on all subsequently added values.

The graph is then sorted by determining by connection type an order as follows:

Inputs (or Parents)<(before) Outputs (or Children)

Constrained (or equivalence) are equal in order

Each semantic that has an output in the graph is then evaluated.

9. Release the following pointers:

IUnknown pointers to the tee 1240 and the text object 1250.

IJRelation interface

The IUnknown pointer to the relation object.

The IUnknown pointer to the semantic object.

4.2. Modify Operation

The Relationship subsystem is responsible for maintaining referential integrity of the entity-relationship data model during manipulations of that data model. The initial set of objects to be modified is provided by a command. The Relationship Manager will then determine which related objects will also need to be modified.

Figure 20:
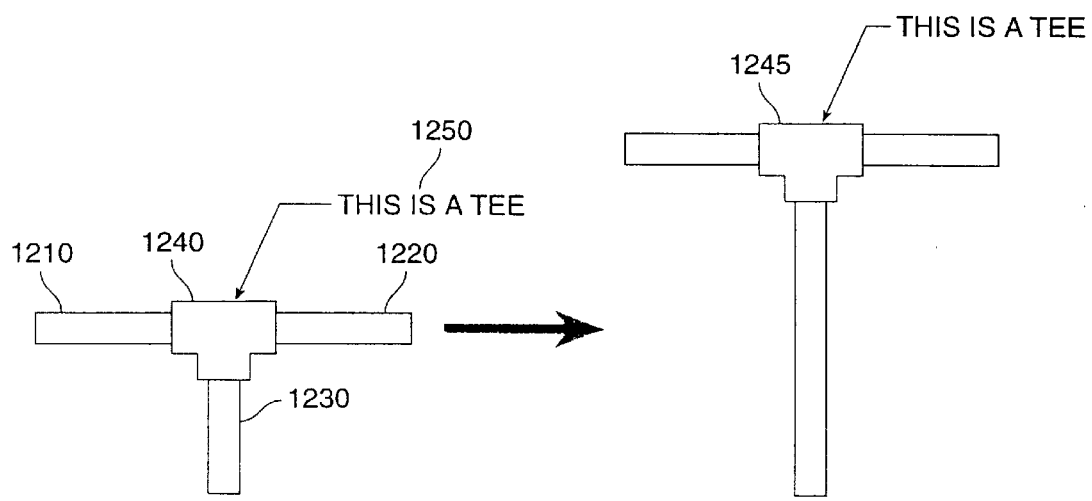
FIG. 20 illustrates three pipes connected to a tee connector in a constraint relationship being modified.

FIG. 20 illustrates three pipes connected to a tee connector in a constraint relationship being modified. When tee 1240 is moved upwards to become tee 1245, pipes 1210, 1220, and 1230 follow. Furthermore, the callout text object 1250 also follows tee 1240. The steps that are taken during this move operation are described below.

Figure 21:
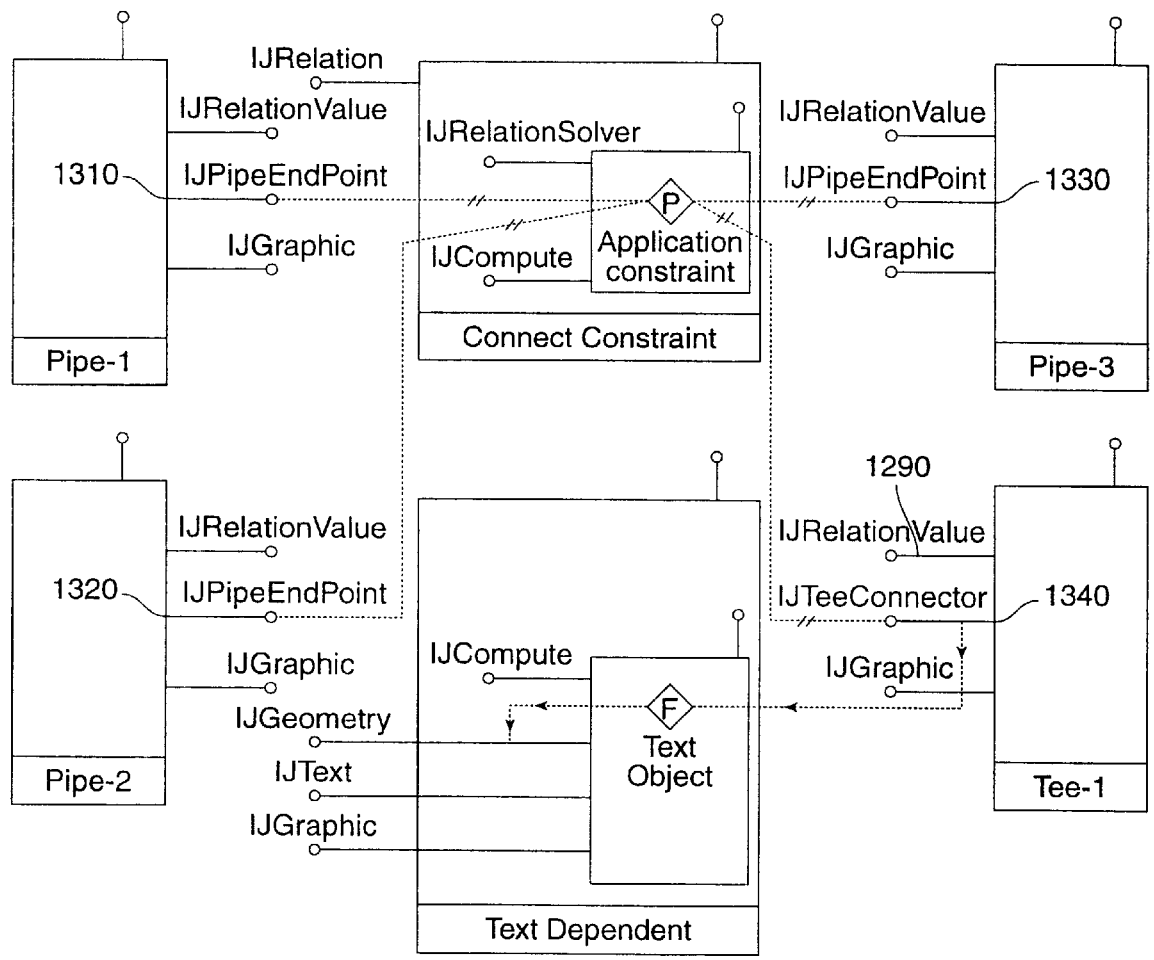
FIG. 21 illustrates a graphic representation of the COM relations of FIG. 20.

FIG. 21 illustrates a graphic representation of the COM relations of FIG. 20. The Modify Operation is performed by the following steps.

1. The Relation Manager is provided with a set of objects that are to be modified. Note, before Tee 1240 is modified, the command calls the global function BatchModify passing in the IUnknown pointer to Tee and the Interface pointer IJGeometry. BatchModify is a function provided by the Relation manager. The pointer to the Tee object will be added to a list of modified values maintained by the Relation manager.

2. The Relation manager obtains the IJRelationValue interface 1290 for object passed into ::BatchModify( ) and gets an enumerator for all of the relations that the object is connected.

3. From the IJRelation interface 1290 pointers obtained from the enumerator, the Relation manager obtains the IJCompute interfaces connected to the value. The IJCompute::PreValueModify method for each compute semantic is called passing in the IUnknown pointer to the related values, the interface IID to be modified and a flag that indicates the type of connection. In addition, a pointer to the batch which allows the semantic add additional values to the graph. Note, for this example, the tee-pipe compute semantics will simply return S_OK when its IJcompute::PreValueModify method is called.

4. The objects are then modified by the command. In this case the geometry definition of the tee would be transformed to the new location.

5, The Relation Manager is informed that the command done with all pending modify operations. This is done by calling ::BatchFlush( ).

6. The Relation manager will build a graph starting with the modified values as follows:

For each semantic obtained in step 3, call IJCompute::EnumValues( ) to obtain an enumerator for the values connected to that semantic. Note, the tee-pipe compute semantics will return an enumerator that contains pointers to the IUnknown pointer and interface to the values that it is connected.

For each value in the enumerator, determine if the value is already in the graph, if not add it to the graph and execute steps 3 and 6 recursively for any newly added values.

7. The Relation manager will sort the graph. This means that it will determine by input, output and constrained values an ordering where parents (inputs) are before children (outputs), and constrained values are equal. Equal values are passed to a constraint solver.

8. The Relation manager will then process the graph. For constraint relations, the IJRelationSolver::Solve( ) method will be called for the solver associated with the constraint relations. For parent/child relationships the Relation Manager will call the IJCompute::Evaluate.

9. The solve method is implemented per a private contract between the relation-values and the constraint solver.

Note, the IJRelationSolver::Solve( ) method for the constraint relation will be called by the Relation Manager first. The input to this function includes an enumerator of the values that participate in the system to be solved. In this example, the values will be the three pipes with the interface being IID_IJPipeEndPoint 1300, 1310, and 1320, and the tee object with the interface being IID_IJTeeConnector 1330. Furthermore, the two modified pipes 1210 and 1220 will be tagged as being modified. An enumerator of semantics that participates in the system is also an input argument to the Solve method. In this example, the compute semantics for the constraint relation will be the only semantic in the enumerator, Note additionally, input to the Solve method is the mode which can be set to either RELATION_FULL_CONSTRAINT or RELATION_PARTIAL_CONSTRAINT. The mode for full constraint indicates that a full set of values and constraints acting between them has been searched. The mode for partial constraints indicates that some of the values passed to the solver can be frozen because the Relation Manager was set up for incremental solving. In this case it is the responsibility of the solver to determine if the required values are present and writable to solve the system. If a frozen value is required to be modified in order to solve the system, the solver will return a status code of RELATION_S_INCREMENTAL_SEARCH and return the values that need to be modified in the ppAddedvalues enumerator. The solve method will need to ensure that any of the values that need to be modified are not frozen. This means that none of the pipes 1210, 1220, and 1230 or tee 1240 can be frozen, if any one of them has been modified. Any values that are frozen will need to be added to the ppAddedvalues enumerator.

If the pipes and tee objects are not frozen, the solver for the tee relation compute semantics will compute the new location using the location of the modified pipes as a basis for the new values.

10. After the constraint system has been solved, the dependency relation between the tee object 1240 and the callout text 1250 will be evaluated. Using the relative location of the callout text with respect to the tee that was determined when the relation was established, the new text location will be computed when the IJCompute::Evaluate method is called. Once the new location is computed, the callout text's geometry will be updated, after calling pNotify->Modify passing in the text's LPUNKNOWN pointer and the IJGeometry as arguments.

4.3. Copy Operation

The copy machine is used by commands to copy objects. The initial set of objects to be copied is provided by the command. The copy machine will then determine which related objects will also need to be copied.

Figure 22:
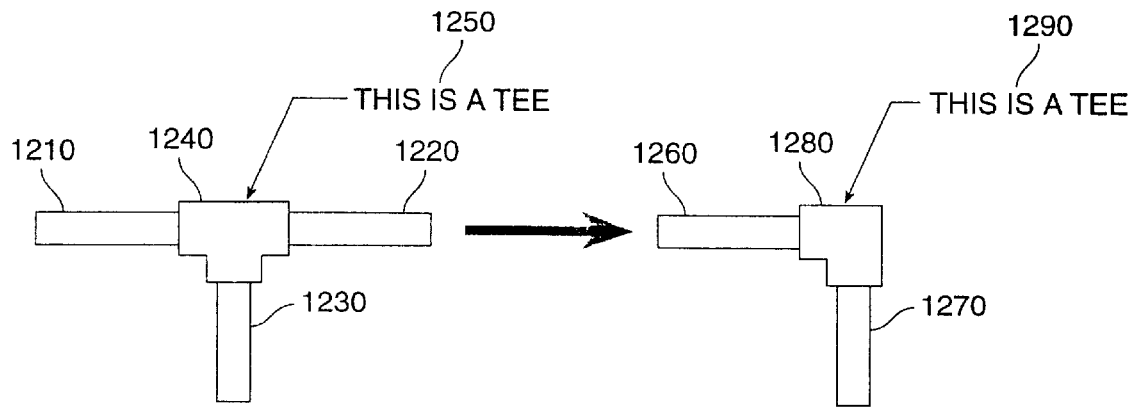
FIG. 22 illustrates three pipes connected to a tee connector in a constraint relationship where two pipes are selected for being copied.

FIG. 22 illustrates three pipes connected to a tee connector in a constraint relationship where two pipes are selected for being copied. Pipes 1210, 1220, and 1230, tee connector 1240, and call out text 1250 are similar to FIG. 19, and pipes 1210 and 1230 are selected for being copied.

The Relation machine provides a global function, ::Copyjobjects( ), that copies the selected objects. The following steps are taken to ensure that all related objects that should be copied are included in the copy operation.

Figure 23:
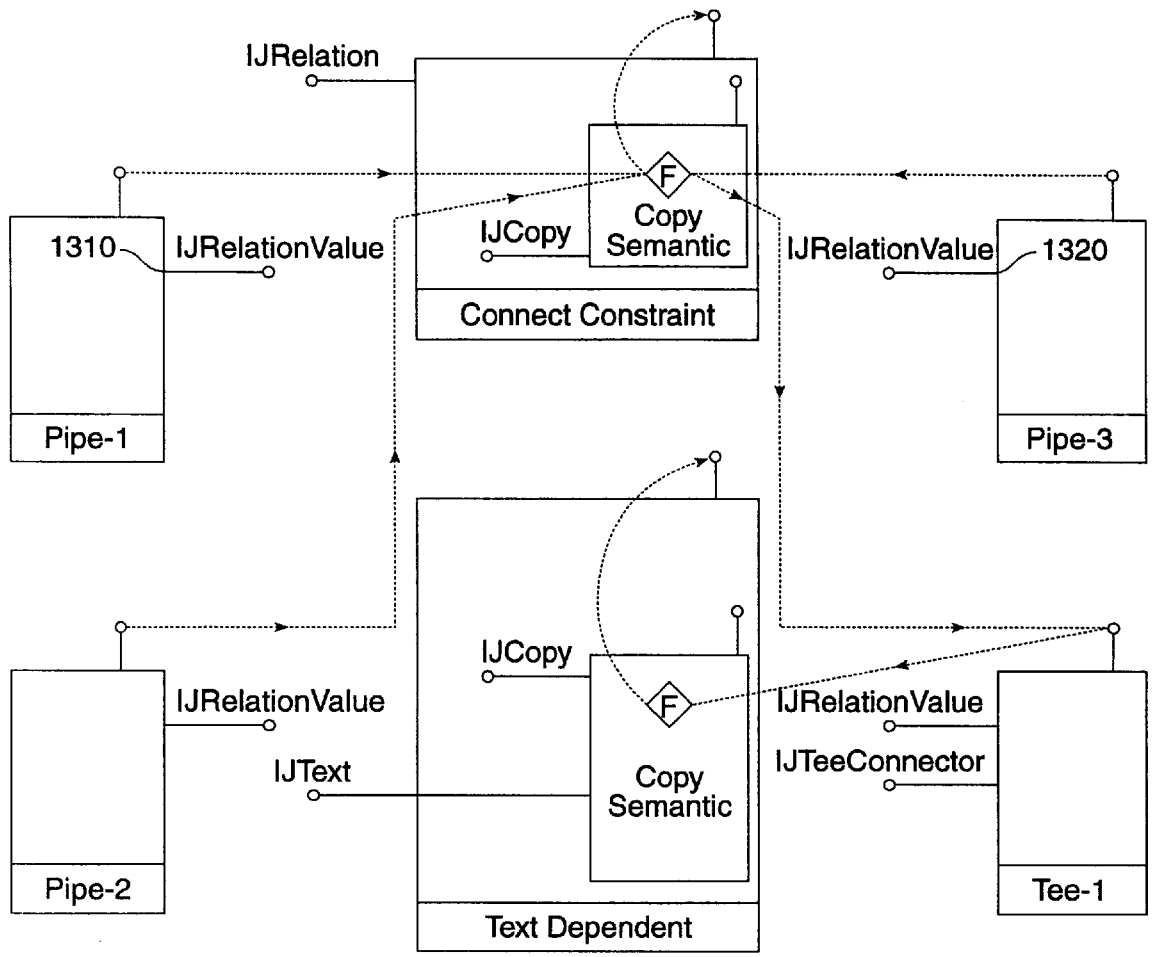
FIG. 23 illustrates a graphic representation of the COM relations of FIG. 22 before the copy process.

FIG. 23 illustrates a graphic representation of the COM relations of FIG. 22 before the copy process. Note that only the copy semantics are shown for the relation objects. The Copy Operation is performed by the following steps.

1. The Copy Machine is provided with a set of objects that are to be copied (Pipes 1210 and 1230). Note, the command calls ::CopyJObjects passing in the objects to be copied in an array and the copy map.

2. The Copy Machine builds an initial graph using the objects selected for copy in pObjectsArray by for each value in the list:

obtain a pointer to the IJRelationValue interfaces 1310 and 1320.

enumerate relations that the value is connected to by calling IJRelationValue::EnumRelations.

for each IJRelation interface in the enumerator, enumerate semantics by calling IJRelation::EnumSemantics; obtaining copy semantics (IJCopy).

3. Recursively ask each object in the graph for additional objects that must be copied. This is done by sending a IJCopy::PreValueCopy( ) message to each of the selected objects. The IJCopy::PreValueCopy will add additional objects (that it depends on) to the copy operation. Note, in this case the connector relation will not add any other values to the copy set so nothing is done in this method.

4. The copy machine then obtains transitive closure by sending each of the relation objects in the graph an IJCopy::EnumValues( ) message to obtain transitive closure. Note, the tee relation object would typically enumerate the pipes as input values and the tee as an output value for the copy operation, but in this case however, only the output Tee is enumerated (outputs are mandatory) and the RELATION_S_IMPLICIT_INPUTS code is returned. The inputs are not enumerated by the relation here because the Copy Engine will guarantee clones of all inputs in the graph and the copy semantic implementation wants the flexibility to maintain relations between objects marked RELATION_COPIED, without having to copy extraneous objects.

5. The Copy Machine will sort the graph

6. The Copy machine will copy any objects that are input-only using the objects IJPersist::Clone method.

7. The Copy machine will send all other objects in the graph an IJCopy::CreateClones message. The copy semantic that declares the output (outputs such as members or dependent values) creates the clone. Note, it is at this stage that the tee relation will determine that only two of the pipes were copied, and that the tee must be converted to a elbow. An elbow object 1280 will be created and added to the clone map in place of the tee object.

8. The relation manager then assigns persist IDs to all objects in the clone map (if the original object had a persist ID).

9. Send each original object in the clone map an IJCopy-::ReconnectClones message. This method will establish a connection between the copied values and the copied relation. This process will be similar to the steps taken when the relation was created.

obtain the IJRelationValue interface of the two pipes 1260 and 1270 and elbow object 1280 give the relation values 1260, 1270, and 1280 a pointer to the relation object by calling their ConnectRelation methods.

release each IJRelationValue interface.

4.4. Delete Operation

The delete machine is used by commands to delete objects from a document. The initial set of objects to be deleted is provided by the command. The delete machine will then determine which related objects will also need to be deleted.

Figure 24:
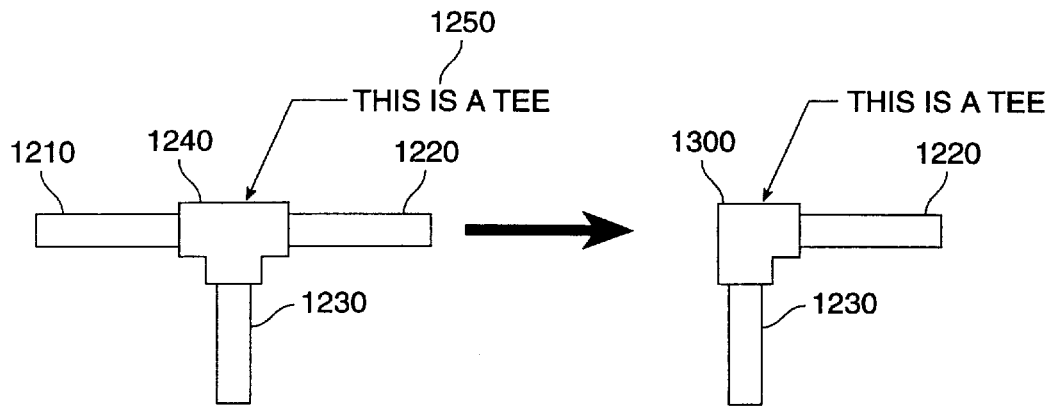
FIG. 24 illustrates three pipes connected to a tee connector in a constraint relationship where one pipe is selected for deletion.

FIG. 24 illustrates three pipes connected to a tee connector in a constraint relationship where one pipe is selected for deletion. If Pipe 1210 is deleted, the behavior that is desired is that Pipe 1220 and Pipe 1230 remain and Tee 1240 is changed to Elbow 10.

Figure 25:
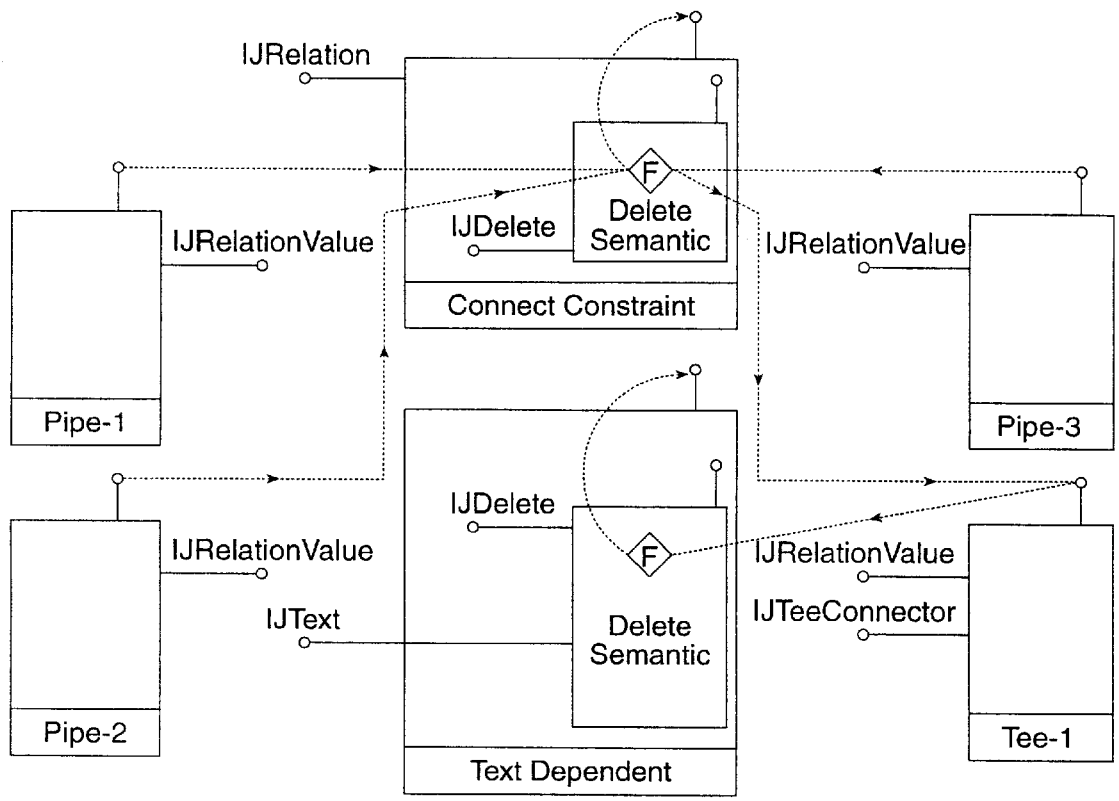
FIG. 25 illustrates a graphic representation of the COM relations of FIG. 24 before the deletion process is started.

FIG. 25 illustrates a graphic representation of the COM relations of FIG. 24 before the deletion process is started.

In order to provide this behavior, the delete machine implements the following procedure which allows the relation objects to provide their desired delete semantics. The Delete Operation is performed by the following steps.

1. The Relation Manager is provided with a set of objects that are to be deleted when the command calls ::BatchDelete and pass in the IUnknown pointer for all objects that it selected to be deleted.

2. The Delete Machine will send a PreValueDelete message to each relation object directly connected to the values that are passed into ::BatchDelete. For our example, nothing is done by the Tee relation on this method.

3. The Relation Manager is informed that all pending delete requests by the command are completed when the command calls ::BatchFlush( )

4. The Relation Manager gets transitive closure on the delete graph by getting from each relation's delete semantics its enumerator, making sure all outputs have been checked for possible dependencies. It obtains the enumerator from each relation by calling the IJDelete::EnumValues( ) method. Note, the IJDelete::EnumValues( ) method for the Tee would enumerate the three pipes 1210, 1220, and 1230 as inputs and the Tee 1240 as its output.

5. Upon closure, each relation in the select set (including those who where IJRelationNotify::Deleted) is sent an IJDelete::Disconnect message, and expected to disconnect from the values it is dependent on (so that they may be deleted and have no outstanding reference count).

In the example, since the tee relation is given only one of its dependencies pipe 1210 for disconnect, it determines that it must convert the output tee 1240 into an elbow 1300.

Figure 26:
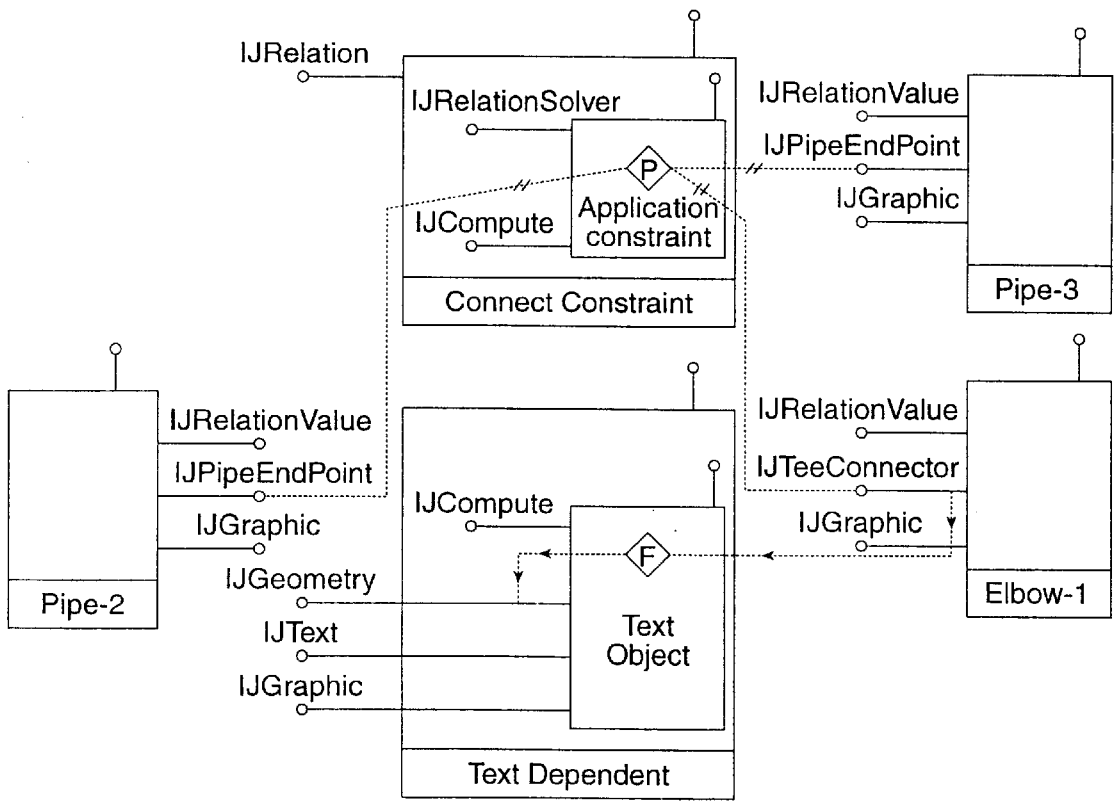
FIG. 26 illustrates a graphic representation of the COM relations of FIG. 24 after the pipe has been deleted.

FIG. 26 illustrates a graphic representation of the COM relations of FIG. 24 after the pipe has been deleted. The delete semantic performs the conversion as follows:

Creates an elbow object 1300.

Connect the input values not marked RELATION_DELETED pipes 1220 and 1230 to the elbow, Notify the batch that the elbow was created (pNotify->Insert)

Notify the batch that the tee 1240 must be deleted (pNotify->Delete) and that it is replaced by elbow 1300

Restart the batch—As in IJCompute::Evaluate, IJDelete-::Disconnect will return the RELATION_S_SEARCH code to tell the relation manager to accumulate additional objects for delete.

6. At this point the Text Dependent object will receive a IJDelete::PreValueDelete( ) message. It will not do anything at this point.

7. At the IJDelete::EnumValues( ) method, the text dependent delete semantic will enumerate the Tee as input and the Text object as output 8. The second time that the Tee's delete semantic receives the IJDelete::DisConnect ( ) message, the delete semantic will disconnect from the Tee.

9. The Tee will have one remaining connection, the Text Dependent 1250, which will receive an IJDelete::Disconnect message with the Tee in the enumerator passed in.

10. The Text dependent will look at the structure identifying the Tee for disconnect and test the flag field of the JIDREF structure for (RELATION_DELETED|RELATION_REPLACED).

If true, the relation will QueryInterface the enumerator object for an interface of type EnumJIDCHANGED, which will indicated any replacement object IUnknown pointers for objects that were deleted. The Text relation will then disconnect from the Tee and connect to the object(s) identified in the EnumJIDCHANGED object.

If not true, the text relation may pNotify->deleted the text object and return the RELATION_S_SEARCH code OR return and error code indicating that the relation was not disconnected (an implementation detail).

5. Detailed Description of the Undo Feature

Figure 27:
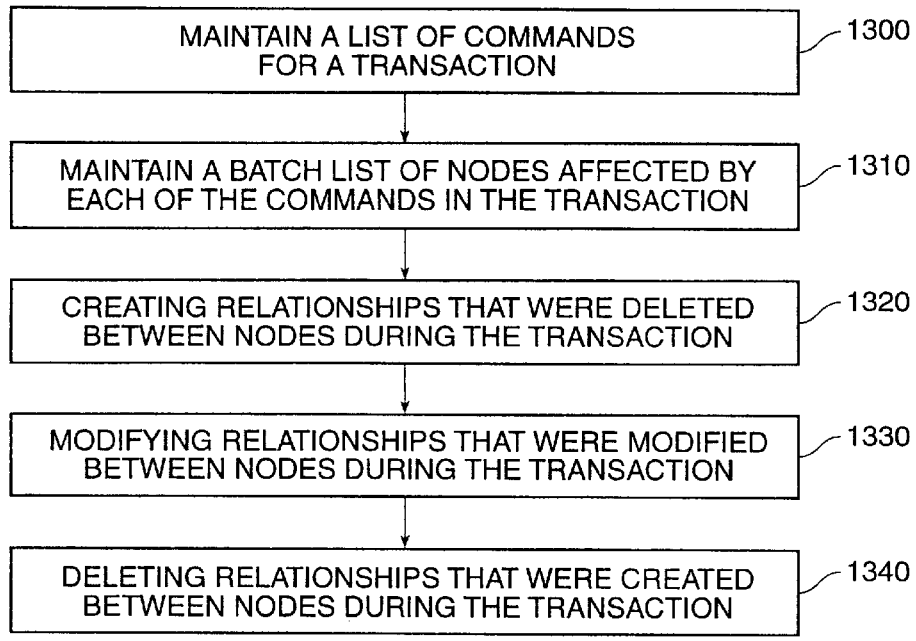
FIG. 27 illustrates a flow diagram of one embodiment of the process of the Undo feature.

The following section provides a detailed walkthrough of the mechanics of the Undo facility. It lays out the steps that must be taken by all objects to achieve the desired undo effect. The Undo API argument specifics are found in section II. FIG. 27 illustrates a flow diagram of one embodiment of the process of the Undo feature.

In this document it is assumed that each document object that will support an undo feature will aggregate an undo manager (supporting the IJUndoManager interface) for the logging and processing of recovery and undo information.

The Undo Manager maintains a log (the undo log) of document modifications by logging the identity of modified objects (or entities) with the data associated with object state before modification.

5.1. Undo Checkpoints and Commands

For Undo to be usable, commands or the command manager/dispatcher must be involved in identifying and naming distinct points in a document's change history. This is done via the Undo Manager's IJUndoManager::Checkpoint( ) method. When a command is selected by the user a wide character string identifying the command is passes to the undo manager to indicated the beginning of a transaction. All subsequent modification logs will be associated with the checkpoint until another call to the IJUndoManager::Checkpoint( ) method is made. This is illustrated in FIG. 27, step 1300.

The checkpoint that is maintained is not a complete copy of the document, but a point in the undo log for which to revert all changes to the document (the collection of all persistent objects associated with the document object.)

5.2. The Batch/Relation Manager's Role

Undo is tightly integrated into the Relations subsystem Batch. (See the Relation Subsystem API document in the appendix for a detailed description of the Batch and other relation interfaces). Every time that a command intends to modify, create, or delete an object or relation, it will go through that Batch and call BatchModify( ), BatchInsert, or BatchDelete respectively. This is illustrated in FIG. 27, step 1310. These APIs will consequently inform the Relation Manager of the pending modification. At this level, and the RelationNotify interface, that undo logging is initiated by the Relation Manager.

BatchInserto and RelationNotify::Insert( ) are called after an object (entity) is created and relationships have been established with it. It is also called when a non-aggregated relation object is created.

BatchModify( ) and RelationNotify::Modify( ) are called before an object (entity) to be modified is modified. (RelationNotify::ModifyRelation( ) is called before a relation (or semantic) has a static value to be modified or the identify of a connected value is being changed.)

BatchDelete( ) and RelationNotify::Delete( ) are called to asked the relation subsystem to remove (or delete) the selected objects).

During the processing of these functions, the relation manager will call LogInsert( ), LogModify( ), or LogDelete( ), which will:

Determine what document the object is associated with by looking for a Persist Manager associated with the object. If no Persist Manager found then no logging will be performed for the object (return(NOERROR).

Determine if the document associated with the object has aggregated an Undo Manager by calling QueryInerface (IID_IJUndoManager, &pUndoMgr). If NO Undo Manager then no logging will be performed for the object (return(NOERROR).

Tell the Undo Manager to log the creation of the object by calling the interface member function IJRelationManager::Log( ).

For creation (or Insert), arguments to Log are:

| | |
|---|---|
| RELATION_INSERTED -- | This is a new object |
| pObjectUnknown -- | the address of the Iunknown interface of the object |
| NULL -- | Associated interface is N/A |

The IJRelationManager::Log( ) method writes information to the undo log indicating the type of action (Insert or Create) and the persistent identity of the object.

For modification, arguments to Log are:

| | |
|---|---|
| RELATION_MODIFIED -- | This object is about to change |
| pObjectUnknown -- | the address of the Iunknown interface of the object |
| iid -- | Associated interface ID to be modified |

The IJRelationManager::Log( ) method writes information to the undo log indicating the type of action (Modify) and the persistent identity of the object. It then asks the object for a pointer to its IJUndo interface.

If the IJUndo Interface is supported, it calls IJUndo::Log (iid, pStream) asking the object to save the data associated with the given interface to the specified Istream interface pointer (the Undo Log).

If the IJUndo Interface is not supported, the Ijpersist interface is requested from the Object (all persistent objects will support IJPersist to save their contents to a file). Subsequently, the IJPersist::Save method will be called telling the object to save its data to the undo log.

For deletion, arguments to Log are:

| | |
|---|---|
| RELATION_DELETED -- | This object is to be deleted |
| pObjectUnknown -- | the address of the Iunknown interface of the object |
| NULL -- | Associated interface is N/A |

The IJRelationManager::Log( ) method writes information to the undo log indicating the type of action (Delete) and the persistent identity of the object. It then asks the object for a pointer to its IjPersist interface.

The object is then told to save itself to the undo log by calling IJPersist::Save( );

5.3 The Undo Command and Undo Processing

Using the Undo Manager, an Undo Command can be written as follows:

Obtain a list of checkpoints from the Undo Manager— This is done by calling IJUndoManager::GetUndoCheckpoints( )

Present a list of checkpoint names (from the returned enumerator) to the user

Call IJUndoManager::Undo with the checkpoint structure associated with the name selected by the user. There may be more than one checkpoint with the same name, therefore the corresponding structure will provide the user with the desired result.

For each of the checkpoints that were logged between the selected checkpoint and the current document state, a redo checkpoint will be created and a discrete set of objects will be modified. Therefore, for each of the checkpoints the following will be performed:

If a redo log stream does not exist, create one

Hold the Undo Log pointer in local storage and set the redo log as the undo log checkpoint the transaction by calling IJUndoManager::Checkpoint( ) with the name of the undo checkpoint.

read the Undo Stream and record the identity, modification type and stream location of modified data process the recorded information as follows:

---

"RELATION_DELETED"
   Create the object that was deleted restoring its
   original persistent identifier.
   Call the object's IJPersist::Load method with a pointer
   to the Undo Stream (Stream set to the location recorded
   in step 4)
   Call BatchInsert(pObjectUnknown) - this writes a log to
   the Redo Stream.
"RELATION_MODIFIED"
   Determine if the object was saved via IJUndo of
   IJPersist:
      if IJUndo -- Call BatchModify(pObjectUnknown, iid)
      then Call IJUndo::Revert(pStream) (Stream set to
      the location recorded in step 4).
      else -- Call BatchModify(pObjectUnknow, TBDiid)
      indicating all interfaces will change and then
      call IJPersist::Load(pStream). (Stream set to the
      location recorded in step 4)
"RELATION_INSERTED"
   Call BatchDelete(pObjectUnknown)

---

In each case, all batch operations and subsequent RelationNotify:: . . . calls are logged to the Redo Stream.

Call BatchFlusho for each of the checkpoints. This will guarantee a closed set of elements changed for each checkpoint and the ability to use the redo log for undoing an undo operation (redo).

Upon completion of the last checkpoint (the one selected by the user),set the Undo Log pointer back to the address stored in step 2 and set the stream to point to the location of the user selected checkpoint.

5.4. The Redo Command and Redo Processing

Using the Undo Manager, a Redo Command can be written as follows:

Obtain a list of checkpoints from the Undo Manager— This is done by calling IJUndoManager::GetRedoCheckpoints( )

If the last command issued by the user for the given document is not an Undo Command, no checkpoints will be returned and the HRESULT code returned by the call will be E_FAILED.

The Redo Log will always be deleted after the first non-Undo command is issued.

Present a list of checkpoint names (from the returned enumerator) to the user

Call IJUndoManager::Redo with the checkpoint structure associated with the name selected by the user. There may be more than one checkpoint with the same name, therefore the corresponding structure will provide the user with the desired result.

For each of the checkpoints that were logged between the selected checkpoint and the current document state, an undo checkpoint will be created and a discrete set of objects will be modified. Therefore, for each of the checkpoints the following will be performed.

checkpoint the transaction by calling IJUndoManager::Checkpoint( ) with the name of the redo checkpoint.

read the Redo Stream and record the identity, modification type and stream location of modified data process the recorded information as follows:

"RELATION_DELETED"

Create the object that was deleted restoring its original persistent identifier. This is illustrated in FIG. 27, step 1320

Call the object's IJPersist::Load method with a pointer to the Undo Stream (Stream set to the location recorded in step 4)

Call BatchInsert(pObjectUnknown)—this writes a log to the Redo Stream.

"RELATION_MODIFIED"

Determine if the object was saved via IJUndo of IJPersist. This is illustrated in FIG. 27, step 1330 if IJUndo—Call BatchModify(Pobjectunknown, iid) then Call IJUndo::Revert(Pstream) (Stream set to the location recorded in step 4).

else—Call BatchModify(Pobjectunknow, TBDiid) indicating all interfaces will change and then call IjPersist::Load(Pstream). (Stream set to the location recorded in step 4)

"RELATION_INSERTED"

Call BatchDelete(Pobjectunknown). This is illustrated in FIG. 27, step 1350.

In each case, all batch operations and subsequent RelationNotify:: . . . calls are logged to the Undo Stream.

Call BatchFlush( ) for each of the checkpoints. This will guarantee a closed set of elements changed for each checkpoint and the ability to use the redo log for undoing an undo operation (redo).

5.5. Object Implementation Considerations

Objects that do not support IJUndo must take special care in the implementation of IJPersist::Load( ) method in the area of aggregated COM objects. When an aggregator is created, its persist manager simply creates the Iunknown that will serve a the Punkouter to the aggregates. pUnkOuter is responsible for creating its aggregates and this is typically done during the IJPersist::Load( ) call made by the persist manager. If IjPersist::Load( ) is called by the Undo Manager, the aggregator (pUnkOuter) will have been newly created in most cases and the aggregate creation is correct behavior. But if the IJPersist::Load( ) is called because of a modify undo (or the delete operation left a support-only object), reloading of the aggregates will be necessary without creating them. And further more, creating them in the latter case will cause multiple redundant aggregates that will consume memory and be lost in the system.

An TBA API for informing the Relation Manager that a relation or semantic has been modified is needed to maintain referential integrity and allow the recovery and undo of changes directed at relationships rather than values.

Persistent objects that do not inform the relation manager that their state will be changed, such as a Rigid Owner's Proxy, should incorporate a special TBD API that would allow for their capture in an undo log without incurring the overhead of relation management. When a proxy's reference count reaches a threshold value, the proxy deletes itself because it knows its outstanding reference count is due to its owner. If that member is requested by a command or other object and the proxy does not exist, the owner will create another proxy. The fact that the Proxy deletes itself without using BatchDelete( ) or RelationNotify::Delete( ) means that when an object that was previously dependent upon an interface on the proxy is restored by an Undo-Delete, the relation will not find the dependency and Undo will fail. Restoring of all previous data is essential for a robust undo capability.

Conclusion

Figure 28:
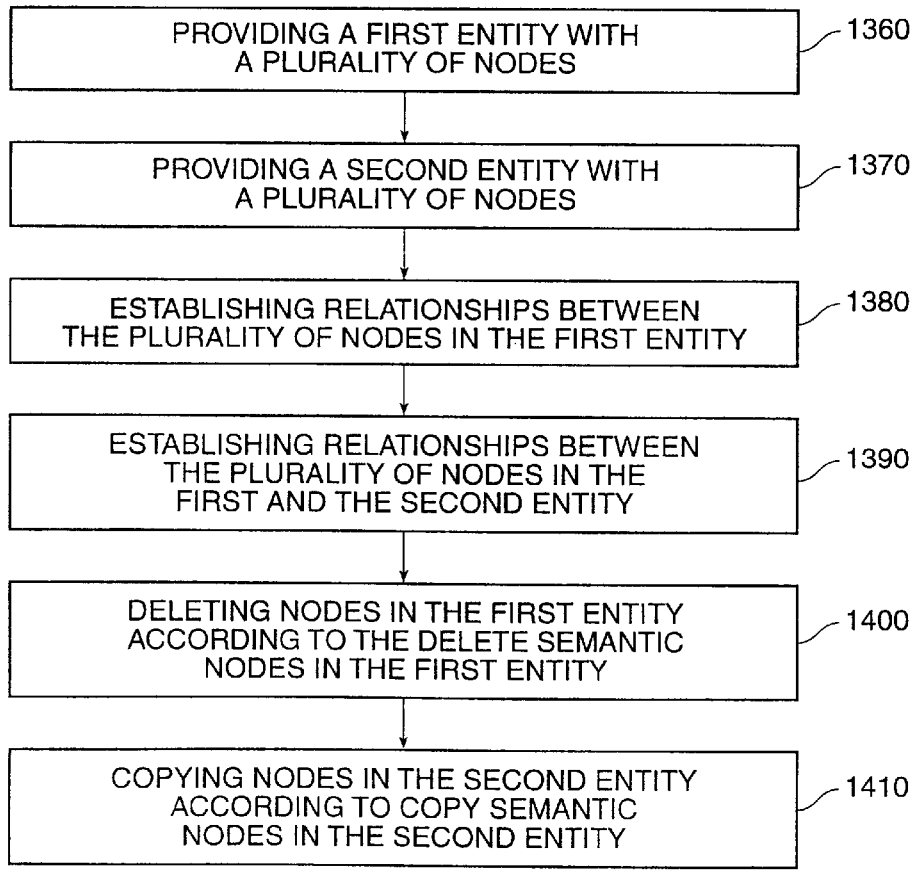
FIG. 28. illustrates a flow diagram of one embodiment of the application of the Relations subsystem described above.

In the foregoing specification, the invention has been described with reference to a specific exemplary embodiments thereof. In sum, FIG. 28. illustrates a flow diagram of one embodiment of the application of the Relations subsystem described above. As illustrated in FIG. 28, a first and a second entity are provided in the Relations subsystem, steps 1360 and 1370. Each entity contains a plurality of nodes including value nodes, function nodes, predicate nodes, delete semantic nodes, and copy semantic nodes, as previously described. The granularity of the Relations subsystem is controlled by allowing each entity to have a plurality of nodes and to establish relationships among the plurality of nodes. Step 1380, illustrates that with the plurality of nodes, in an entity, relationships can be established between nodes in the first entity, as previously described. Step 1390, illustrates that relationships can also be established across entity boundaries, and between entities, as previously described. By providing each entity with delete semantic nodes, each entity knows how to modify the relationships of its own nodes upon a delete call, as previously described, step 1400. Further, by providing each entity with copy semantic nodes, each entity knows how to copy the relationships of its own nodes upon a copy call, as previously described, step 1410.

Many changes, modifications, and additional extensions to COM facilitating the Relations information between objects are readily envisioned and are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed:

1. A method for maintaining relationships between entities in a computer system, each entity having a plurality of nodes, the method comprising:

modifying one of the plurality of nodes;

searching for a plurality of dependent nodes from the plurality of nodes coupled to the one node;

ordering the plurality of dependent nodes into an order; and evaluating the plurality of dependent nodes in the order.

2. The method of claim 1, wherein the plurality of nodes comprises a plurality of value nodes and a plurality of function nodes, each of the plurality of function nodes having an evaluation function; and wherein the evaluating step comprises:

identifying a second plurality of function nodes in the plurality of dependent nodes; and evaluating the evaluation functions of the second plurality of function nodes.

3. The method of claim 1, wherein the plurality of nodes comprises a plurality of value nodes and a plurality of predicate nodes, each of the plurality of predicate nodes having value nodes associated therewith;

wherein the evaluating step comprises:

identifying a second plurality of predicate nodes in the plurality of dependent nodes;

identifying each of the second plurality of predicate nodes and associated value nodes;

passing each predicate node and the associated value nodes to a solver; and solving the predicate.

4. The method of claim 3, wherein the solving step comprises:

manipulating the associated value nodes until each predicate node is satisfied.

5. The method of claim 1, wherein the plurality of nodes comprises a plurality of value nodes and a plurality of function nodes; and wherein the modifying step comprises modifying one of the plurality of value nodes.

6. The method of claim 1, wherein the plurality of nodes comprises a plurality of value nodes and a plurality of function nodes, each of the plurality of function nodes having an evaluation function; and wherein the modifying step comprises modifying the evaluation function of one of the plurality of function nodes.

7. The method of claim 1, wherein the plurality of nodes comprises a plurality of value nodes, a plurality of function nodes, and a plurality of predicate nodes, each of the plurality of function nodes having value nodes in a parent and child dependency relation, each of the plurality of predicate nodes having value nodes in an equivalence relation; and wherein the searching step comprises:

identifying nodes of the plurality of nodes directly coupled to the one node;

identifying nodes of the plurality of nodes indirectly coupled to the one node as children of dependency relations; and identifying nodes of the plurality of nodes indirectly coupled to the one node in equivalence relations.

8. The method of claim 1, wherein the plurality of nodes comprises a plurality of value nodes, a plurality of function nodes, and a plurality of predicate nodes, each of the plurality of function nodes having value nodes in a parent and child dependency relation, each of the plurality of predicate nodes having value nodes in an equivalence relation; and wherein the ordering step further comprises ordering parent value nodes before children value nodes.

9. A method for copying an entity from a plurality of entities in a computer system, and maintaining relationships of the entity, each of the plurality of entities having relationships with other entities, the method comprising:

determining an entity of the plurality of entities to copy, the entity having a set of relationships;

determining a domain of interest from the plurality of entities for the entity based upon the set of relationships;

duplicating each entity in the domain of interest to form a set of entities; and establishing the set of relationships among each of the set of entities.

10. The method of claim 9, wherein the plurality of entities comprises a plurality of nodes, and a plurality of copy semantic nodes, each of the plurality of nodes having value nodes in a parent and child dependency relation with a copy semantic node; and wherein determining a domain comprises:

identifying entities of the plurality of entities having nodes directly coupled to the entity; and identifying entities of the plurality of entities having nodes indirectly coupled to the entity as children of a copy semantic node.

11. The method of claim 10, wherein the step of identifying entities having nodes indirectly coupled to the entity is repeated for entities having transitive nodes.

12. The method of claim 9, wherein the duplicating step further comprises:

determining whether each entity in the domain of interest must be duplicated;

duplicating entities in the domain of interest that must be duplicated; and duplicating entities in the domain of interest that have no replacement in the plurality of entities.

13. The method of claim 9, further comprising establishing relationships between the set of entities and the plurality of entities.

14. A method for deleting an entity from a plurality of entities in a computer system, each of the plurality of entities having relationships with other entities, the method comprising:

determining an entity of the plurality of entities to delete, the entity having a set of relationships;

determining a domain of interest from the plurality of entities for the entity based upon the set of relationships; and disconnecting each entity in the domain of interest from entities in the plurality of entities.

15. The method of claim 14, wherein the plurality of entities comprises a plurality of value nodes, and a plurality of delete semantic nodes, each of the plurality of delete semantic nodes having value nodes in a parent and child dependency relation; and wherein determining a domain comprises:

identifying entities of the plurality of entities having nodes directly coupled to the entity; and identifying entities of the plurality of entities having nodes indirectly coupled to the entity as children of dependency relations.

16. The method of claim 15, wherein the step of identifying entities having nodes indirectly coupled to the entity recurses for entities having transitive nodes.

17. A method for reestablishing relationships between entities in a computer system, each entity having a plurality of nodes, the method comprising:

maintaining a list of commands for a transaction;

maintaining a batch list of nodes affected by each of the list of commands;

creating relationships that were deleted between nodes;

modifying relationships that were modified between nodes; and deleting relationships that were created between nodes.

18. A method for creating, maintaining, and deleting relationships among a plurality of nodes of entities in a computer system, the plurality of nodes including value nodes, function nodes, predicate nodes, delete semantic nodes, and copy semantic nodes, the method comprising:

providing a first entity;

providing a second entity;

establishing relationships between a plurality of nodes in the first entity;

establishing relationships between the plurality of nodes in the first entity and a plurality of nodes in the second entity;

deleting nodes in the first entity according to delete semantic nodes in the first entity; and copying nodes in the second entity according to copy semantic nodes in the second entity.

* * * * *